US011516543B2

(12) United States Patent
Mowrer et al.

(10) Patent No.: US 11,516,543 B2
(45) Date of Patent: Nov. 29, 2022

(54) METHODS AND APPARATUS TO ASSIGN VIEWERS TO MEDIA METER DATA

(71) Applicant: The Nielsen Company (US), LLC, New York, NY (US)

(72) Inventors: Samantha M. Mowrer, Chicago, IL (US); Molly Poppie, Arlington Heights, IL (US); Balachander Shankar, Tampa, FL (US); Ieok Hou Wong, Bronx, NY (US); Choongkoo Lee, Schaumburg, IL (US); Xiaoqi Cui, Darien, IL (US); David J. Kurzynski, South Elgin, IL (US); Richard Peters, New York, NY (US); Remy Spoentgen, Tampa, IL (US)

(73) Assignee: The Nielsen Company (US), LLC, New York, NY (US)

( * ) Notice: Subject to any disclaimer, the term of this patent is extended or adjusted under 35 U.S.C. 154(b) by 160 days.

(21) Appl. No.: 16/998,596

(22) Filed: Aug. 20, 2020

(65) Prior Publication Data
US 2020/0382837 A1 Dec. 3, 2020

Related U.S. Application Data

(63) Continuation of application No. 16/261,035, filed on Jan. 29, 2019, now Pat. No. 10,757,480, which is a (Continued)

(51) Int. Cl.
H04N 21/466 (2011.01)
H04N 21/442 (2011.01)
(Continued)

(52) U.S. Cl.
CPC ..... *H04N 21/4663* (2013.01); *H04N 21/42203* (2013.01); *H04N 21/44222* (2013.01); *H04N 21/4524* (2013.01); *H04N 21/4667* (2013.01)

(58) Field of Classification Search
CPC ......... H04N 21/4663; H04N 21/42203; H04N 21/44222; H04N 21/4524; H04N 21/4667
See application file for complete search history.

(56) References Cited

U.S. PATENT DOCUMENTS 3,540,003 A 11/1970 Murphy
3,696,297 A 10/1972 Otero
(Continued)

FOREIGN PATENT DOCUMENTS

CN 101980174 2/2011
EP 0228242 7/1987
(Continued)

OTHER PUBLICATIONS

US 9,998,779 B2, 06/2018, Shah et al. (withdrawn)
(Continued)

*Primary Examiner* — Nathan J Flynn
*Assistant Examiner* — Christine A Kurien
(74) *Attorney, Agent, or Firm* — Hanley, Flight & Zimmerman, LLC

(57) ABSTRACT

Methods, apparatus, systems and articles of manufacture to assign viewers to media meter data are disclosed. An apparatus includes memory, and a processor to execute instructions to: determine first probabilities for first panelists in a first household based on a first number of minutes of first media presented by a first media presentation device monitored by a first meter, determine second probabilities for second panelists in a plurality of second households based on a second number of minutes of second media presented by second media presentation devices monitored by a plurality of second meters, compare the first probabilities and the second probabilities to identify a candidate household from the plurality of second households to associated with the first household, and impute respective portions of the
(Continued)

first number of minutes to corresponding ones of the first panelists when monitored behavior of the candidate household matches monitored behavior of the first household.

21 Claims, 25 Drawing Sheets

Related U.S. Application Data continuation of application No. 14/866,158, filed on Sep. 25, 2015, now Pat. No. 10,219,039.

(60) Provisional application No. 62/130,286, filed on Mar. 9, 2015.

(51) Int. Cl.
*H04N 21/45* (2011.01)
*H04N 21/422* (2011.01)

(56) References Cited

U.S. PATENT DOCUMENTS

| | | |
|---|---|---|
| 3,818,458 A | 6/1974 | Deese |
| 3,906,454 A | 9/1975 | Martin |
| 4,058,829 A | 11/1977 | Thompson |
| 4,125,892 A | 11/1978 | Fukuda et al. |
| 4,166,290 A | 8/1979 | Furtman et al. |
| 4,236,209 A | 11/1980 | Lombardo, Jr. et al. |
| 4,258,386 A | 3/1981 | Cheung |
| 4,283,709 A | 8/1981 | Lucero et al. |
| 4,355,372 A | 10/1982 | Johnson et al. |
| 4,356,545 A | 10/1982 | West |
| 4,473,824 A | 9/1984 | Claytor |
| 4,516,216 A | 5/1985 | Armstrong |
| 4,546,382 A | 10/1985 | McKenna et al. |
| 4,566,030 A | 1/1986 | Nickerson et al. |
| 4,602,279 A | 7/1986 | Freeman |
| 4,603,232 A | 7/1986 | Kurland et al. |
| 4,658,290 A | 4/1987 | McKenna et al. |
| 4,677,552 A | 6/1987 | Sibley, Jr. |
| 4,695,880 A | 9/1987 | Johnson et al. |
| 4,700,378 A | 10/1987 | Brown |
| 4,706,121 A | 11/1987 | Young |
| 4,713,791 A | 12/1987 | Saluski |
| 4,718,025 A | 1/1988 | Minor et al. |
| 4,725,886 A | 2/1988 | Galumbeck et al. |
| 4,740,912 A | 4/1988 | Whitaker |
| 4,745,549 A | 5/1988 | Hashimoto |
| 4,745,559 A | 5/1988 | Willis et al. |
| 4,751,578 A | 6/1988 | Reiter et al. |
| 4,757,456 A | 7/1988 | Benghait |
| 4,774,658 A | 9/1988 | Lewin |
| 4,783,648 A | 11/1988 | Homma et al. |
| 4,792,921 A | 12/1988 | Corwin |
| 4,817,080 A | 3/1989 | Soha |
| 4,823,290 A | 4/1989 | Fasack et al. |
| 4,831,582 A | 5/1989 | Miller et al. |
| 4,845,658 A | 7/1989 | Gifford |
| 4,849,879 A | 7/1989 | Chinnaswamy et al. |
| 4,868,116 A | 9/1989 | Morgan et al. |
| 4,868,866 A | 9/1989 | Williams, Jr. |
| 4,887,308 A | 12/1989 | Dutton |
| 4,907,188 A | 3/1990 | Suzuki et al. |
| 4,912,466 A | 3/1990 | Call |
| 4,912,522 A | 3/1990 | Oates et al. |
| 4,924,488 A | 5/1990 | Kosich |
| 4,930,011 A | 5/1990 | Kiewit |
| 4,935,870 A | 6/1990 | Burk, Jr. et al. |
| 4,954,699 A | 9/1990 | Coffey et al. |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,062,147 A | 10/1991 | Pickett et al. |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood et al. |
| 5,140,419 A | 8/1992 | Galumbeck et al. |
| 5,148,365 A | 9/1992 | Dembo |
| 5,150,116 A | 9/1992 | West |
| 5,150,414 A | 9/1992 | Ng |
| 5,155,591 A | 10/1992 | Wachob |
| 5,159,685 A | 10/1992 | Kung |
| 5,161,109 A | 11/1992 | Keating et al. |
| 5,166,866 A | 11/1992 | Kim et al. |
| 5,181,113 A | 1/1993 | Chang |
| 5,204,947 A | 4/1993 | Bernstein et al. |
| 5,208,588 A | 5/1993 | Nishiyama |
| 5,210,530 A | 5/1993 | Kammerer et al. |
| 5,212,684 A | 5/1993 | Macnamee et al. |
| 5,214,792 A | 5/1993 | Alwadish |
| 5,220,522 A | 6/1993 | Wilson et al. |
| 5,220,655 A | 6/1993 | Tsutsui |
| 5,223,827 A | 6/1993 | Bell et al. |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,681 A | 8/1993 | Kagan et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,251,324 A | 10/1993 | McMullan, Jr. |
| 5,253,346 A | 10/1993 | Okabayashi et al. |
| 5,260,878 A | 11/1993 | Luppy |
| 5,262,860 A | 11/1993 | Fitzpatrick et al. |
| 5,267,314 A | 11/1993 | Stambler |
| 5,267,351 A | 11/1993 | Reber et al. |
| 5,276,458 A | 1/1994 | Sawdon |
| 5,276,789 A | 1/1994 | Besaw et al. |
| 5,281,962 A | 1/1994 | Vanden Heuvel et al. |
| 5,283,639 A | 2/1994 | Esch et al. |
| 5,287,363 A | 2/1994 | Wolf et al. |
| 5,297,249 A | 3/1994 | Bernstein et al. |
| 5,299,115 A | 3/1994 | Fields et al. |
| 5,301,350 A | 4/1994 | Rogan et al. |
| 5,309,243 A | 5/1994 | Tsai |
| 5,315,093 A | 5/1994 | Stewart |
| 5,315,580 A | 5/1994 | Phaal |
| 5,317,140 A | 5/1994 | Dunthorn |
| 5,321,831 A | 6/1994 | Hirose |
| 5,321,838 A | 6/1994 | Hensley et al. |
| 5,327,237 A | 7/1994 | Gerdes et al. |
| 5,327,554 A | 7/1994 | Palazzi, III et al. |
| 5,331,544 A | 7/1994 | Lu et al. |
| 5,333,302 A | 7/1994 | Hensley et al. |
| 5,339,239 A | 8/1994 | Manabe et al. |
| 5,339,412 A | 8/1994 | Fueki |
| 5,347,632 A | 9/1994 | Filepp et al. |
| 5,349,662 A | 9/1994 | Johnson et al. |
| 5,351,278 A | 9/1994 | Koshishiba et al. |

(56) References Cited

U.S. PATENT DOCUMENTS

| | | |
|---|---|---|
| 5,351,293 A | 9/1994 | Michener et al. |
| 5,355,327 A | 10/1994 | Stent et al. |
| 5,355,484 A | 10/1994 | Record et al. |
| 5,359,367 A | 10/1994 | Stockill |
| 5,361,359 A | 11/1994 | Tajalli et al. |
| 5,367,677 A | 11/1994 | Stanfill |
| 5,371,846 A | 12/1994 | Bates |
| 5,374,951 A | 12/1994 | Welsh |
| 5,375,070 A | 12/1994 | Hershey et al. |
| 5,379,380 A | 1/1995 | Mori et al. |
| 5,382,970 A | 1/1995 | Kiefl |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,398,336 A | 3/1995 | Tantry et al. |
| 5,406,569 A | 4/1995 | Isozaki |
| 5,408,607 A | 4/1995 | Nishikawa et al. |
| 5,410,598 A | 4/1995 | Shear |
| 5,412,778 A | 5/1995 | Andres |
| 5,414,809 A | 5/1995 | Hogan et al. |
| 5,418,728 A | 5/1995 | Yada |
| 5,461,708 A | 10/1995 | Kahn |
| 5,481,294 A | 1/1996 | Thomas et al. |
| 5,483,658 A | 1/1996 | Grube et al. |
| 5,485,897 A | 1/1996 | Matsumoto et al. |
| 5,491,820 A | 2/1996 | Belove et al. |
| 5,495,282 A | 2/1996 | Mostafa et al. |
| 5,495,581 A | 2/1996 | Tsai |
| 5,499,340 A | 3/1996 | Barritz |
| 5,524,073 A | 6/1996 | Stambler |
| 5,550,928 A | 8/1996 | Lu et al. |
| 5,555,303 A | 9/1996 | Stambler |
| 5,557,333 A | 9/1996 | Jungo et al. |
| 5,560,038 A | 9/1996 | Haddock |
| 5,568,471 A | 10/1996 | Hershey et al. |
| 5,572,643 A | 11/1996 | Judson |
| 5,594,911 A | 1/1997 | Cruz et al. |
| 5,594,934 A | 1/1997 | Lu et al. |
| 5,600,364 A | 2/1997 | Hendricks et al. |
| 5,604,867 A | 2/1997 | Harwood |
| 5,608,445 A | 3/1997 | Mischler |
| 5,615,264 A | 3/1997 | Kazmierczak et al. |
| 5,623,652 A | 4/1997 | Vora et al. |
| 5,634,100 A | 5/1997 | Capps |
| 5,646,998 A | 7/1997 | Stambler |
| 5,648,965 A | 7/1997 | Thadani et al. |
| 5,671,283 A | 9/1997 | Michener et al. |
| 5,673,382 A | 9/1997 | Cannon et al. |
| 5,696,702 A | 12/1997 | Skinner et al. |
| 5,706,502 A | 1/1998 | Foley et al. |
| 5,708,709 A | 1/1998 | Rose |
| 5,708,780 A | 1/1998 | Levergood et al. |
| 5,710,915 A | 1/1998 | McElhiney |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,732,218 A | 3/1998 | Bland et al. |
| 5,737,619 A | 4/1998 | Judson |
| 5,740,549 A | 4/1998 | Reilly et al. |
| 5,781,893 A | 7/1998 | Felthauser et al. |
| 5,787,253 A | 7/1998 | McCreery et al. |
| 5,793,302 A | 8/1998 | Stambler |
| 5,796,952 A | 8/1998 | Davis et al. |
| 5,799,292 A | 8/1998 | Hekmatpour |
| 5,801,747 A | 9/1998 | Bedard |
| 5,819,156 A | 10/1998 | Belmont |
| 5,819,285 A | 10/1998 | Damico et al. |
| 5,823,879 A | 10/1998 | Goldberg et al. |
| 5,829,001 A | 10/1998 | Li et al. |
| 5,835,923 A | 11/1998 | Shibata et al. |
| 5,838,919 A | 11/1998 | Schwaller et al. |
| 5,841,433 A | 11/1998 | Chaney |
| 5,848,396 A | 12/1998 | Gerace |
| 5,857,190 A | 1/1999 | Brown |
| 5,870,546 A | 2/1999 | Kirsch |
| 5,872,588 A | 2/1999 | Aras et al. |
| 5,878,224 A | 3/1999 | Smith |
| 5,878,384 A | 3/1999 | Johnson et al. |
| 5,881,360 A | 3/1999 | Fong |
| 5,892,917 A | 4/1999 | Myerson |
| 5,926,168 A | 7/1999 | Fan |
| 5,931,912 A | 8/1999 | Wu et al. |
| 5,933,811 A | 8/1999 | Angles et al. |
| 5,935,207 A | 8/1999 | Logue et al. |
| 5,936,541 A | 8/1999 | Stambler |
| 5,948,061 A | 9/1999 | Merriman et al. |
| 5,951,643 A | 9/1999 | Shelton et al. |
| 5,956,483 A | 9/1999 | Grate et al. |
| 5,958,010 A | 9/1999 | Agarwal et al. |
| 5,963,914 A | 10/1999 | Skinner et al. |
| 5,964,839 A | 10/1999 | Johnson et al. |
| 5,974,148 A | 10/1999 | Stambler |
| 5,974,299 A | 10/1999 | Massetti |
| 5,977,964 A | 11/1999 | Williams et al. |
| 5,982,917 A | 11/1999 | Clarke et al. |
| 5,986,653 A | 11/1999 | Phathayakorn et al. |
| 5,991,735 A | 11/1999 | Gerace |
| 5,999,178 A | 12/1999 | Hwang et al. |
| 6,005,597 A | 12/1999 | Barrett et al. |
| 6,006,260 A | 12/1999 | Barrick, Jr. et al. |
| 6,014,638 A | 1/2000 | Burge et al. |
| 6,018,619 A | 1/2000 | Allard et al. |
| 6,049,695 A | 4/2000 | Cottam |
| 6,052,730 A | 4/2000 | Felciano et al. |
| 6,067,440 A | 5/2000 | Diefes |
| 6,070,145 A | 5/2000 | Pinsley et al. |
| 6,078,324 A | 6/2000 | Phathayakorn et al. |
| 6,108,637 A | 8/2000 | Blumenau |
| 6,112,238 A | 8/2000 | Boyd et al. |
| 6,112,240 A | 8/2000 | Pogue et al. |
| 6,115,608 A | 9/2000 | Duran et al. |
| 6,115,742 A | 9/2000 | Franklin et al. |
| 6,119,098 A | 9/2000 | Guyot et al. |
| 6,138,155 A | 10/2000 | Davis et al. |
| 6,167,358 A | 12/2000 | Othmer et al. |
| 6,173,311 B1 | 1/2001 | Hassett et al. |
| 6,185,586 B1 | 2/2001 | Judson |
| 6,216,129 B1 | 4/2001 | Eldering |
| 6,219,786 B1 | 4/2001 | Cunningham et al. |
| 6,226,677 B1 | 5/2001 | Slemmer |
| 6,237,033 B1 | 5/2001 | Doeberl et al. |
| 6,250,930 B1 | 6/2001 | Mintz |
| 6,256,739 B1 | 7/2001 | Skopp et al. |
| 6,264,560 B1 | 7/2001 | Goldberg et al. |
| 6,275,854 B1 | 8/2001 | Himmel et al. |
| 6,278,966 B1 | 8/2001 | Howard et al. |
| 6,279,036 B1 | 8/2001 | Himmel et al. |
| 6,279,112 B1 | 8/2001 | O'Toole, Jr. et al. |
| 6,286,036 B1 | 9/2001 | Rhoads |
| 6,298,348 B1 | 10/2001 | Eldering |
| 6,317,787 B1 | 11/2001 | Boyd et al. |
| 6,324,546 B1 | 11/2001 | Ka et al. |
| 6,360,261 B1 | 3/2002 | Boyd et al. |
| 6,381,632 B1 | 4/2002 | Lowell |
| 6,393,479 B1 | 5/2002 | Glommen et al. |
| 6,397,359 B1 | 5/2002 | Chandra et al. |
| 6,408,335 B1 | 6/2002 | Schwaller et al. |
| 6,418,470 B2 | 7/2002 | Blumenau |
| 6,434,532 B2 | 8/2002 | Goldband et al. |
| 6,446,261 B1 | 9/2002 | Rosser |
| 6,449,604 B1 | 9/2002 | Hansen et al. |
| 6,457,025 B2 | 9/2002 | Judson |
| 6,466,970 B1 | 10/2002 | Lee et al. |
| 6,473,407 B1 | 10/2002 | Ditmer et al. |
| 6,483,813 B1 | 11/2002 | Blencowe |
| 6,484,316 B1 | 11/2002 | Lindberg |
| 6,569,095 B2 | 5/2003 | Eggers |
| 6,601,100 B2 | 7/2003 | Lee et al. |
| 6,606,745 B2 | 8/2003 | Maggio |
| 6,609,239 B1 | 8/2003 | Xavier |

(56) References Cited

U.S. PATENT DOCUMENTS

| | | |
|---|---|---|
| 6,621,881 B2 | 9/2003 | Srinivasan |
| 6,625,648 B1 | 9/2003 | Schwaller et al. |
| 6,662,195 B1 | 12/2003 | Langseth et al. |
| 6,662,227 B2 | 12/2003 | Boyd et al. |
| 6,671,715 B1 | 12/2003 | Langseth et al. |
| 6,712,702 B2 | 3/2004 | Goldberg et al. |
| 6,719,660 B2 | 4/2004 | Palazzolo |
| 6,735,775 B1 | 5/2004 | Massetti |
| 6,766,370 B2 | 7/2004 | Glommen et al. |
| 6,807,558 B1 | 10/2004 | Hassett et al. |
| 6,810,368 B1 | 10/2004 | Pednault |
| 6,842,782 B1 | 1/2005 | Malik et al. |
| 6,859,833 B2 | 2/2005 | Kirsch et al. |
| 6,993,590 B1 | 1/2006 | Gauthier et al. |
| 7,017,143 B1 | 3/2006 | Andrew et al. |
| 7,117,518 B1 | 10/2006 | Takahashi et al. |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,181,412 B1 | 2/2007 | Fulgoni et al. |
| 7,216,149 B1 | 5/2007 | Briscoe et al. |
| 7,222,071 B2 | 5/2007 | Neuhauser et al. |
| 7,236,941 B2 | 6/2007 | Conkwright et al. |
| 7,260,823 B2 | 8/2007 | Schlack et al. |
| 7,260,837 B2 | 8/2007 | Abraham et al. |
| 7,343,616 B1 | 3/2008 | Takahashi et al. |
| 7,376,722 B1 | 5/2008 | Sim et al. |
| 7,451,151 B2 | 11/2008 | Horvitz et al. |
| 7,483,835 B2 | 1/2009 | Neuhauser et al. |
| 7,493,655 B2 | 2/2009 | Brown |
| 7,757,250 B1 | 7/2010 | Horvitz et al. |
| 7,827,227 B2 | 11/2010 | Iijima et al. |
| 7,953,791 B2 | 5/2011 | Or Sim et al. |
| 7,953,839 B2 | 5/2011 | Sim et al. |
| 7,962,935 B2 | 6/2011 | Kurosaki et al. |
| 8,046,797 B2 | 10/2011 | Bentolila et al. |
| 8,112,511 B2 | 2/2012 | Sim et al. |
| 8,311,888 B2 | 11/2012 | Ramer et al. |
| 8,484,677 B1 | 7/2013 | Eldering |
| 8,510,770 B1 | 8/2013 | Oztaskent et al. |
| 8,514,907 B2 | 8/2013 | Wright et al. |
| 8,531,606 B2 | 9/2013 | Pyo |
| 8,739,197 B1 | 5/2014 | Pecjak et al. |
| 8,898,689 B2 | 11/2014 | Georgakis |
| 8,930,989 B2 | 1/2015 | Knoller et al. |
| 8,984,547 B2 | 3/2015 | Lambert et al. |
| 9,185,435 B2 | 11/2015 | Shankar et al. |
| 9,219,928 B2 | 12/2015 | Shankar et al. |
| 9,247,273 B2 | 1/2016 | Shankar et al. |
| 9,277,265 B2 | 3/2016 | Wood et al. |
| 9,544,632 B2 | 1/2017 | Wood et al. |
| 9,578,357 B2 | 2/2017 | Wolf et al. |
| 9,584,858 B2 | 2/2017 | Vinson et al. |
| 9,743,141 B2 | 8/2017 | Sheppard et al. |
| 9,774,900 B2 | 9/2017 | Wood et al. |
| 9,953,330 B2 | 4/2018 | Rao et al. |
| 10,075,756 B1 | 9/2018 | Karunanithi et al. |
| 10,219,039 B2 | 2/2019 | Mowrer et al. |
| 10,248,811 B2 | 4/2019 | Sullivan et al. |
| 10,430,816 B1 | 10/2019 | Janardhan et al. |
| 10,757,480 B2 | 8/2020 | Mowrer et al. |
| 10,791,355 B2 | 9/2020 | Sheppard et al. |
| 2001/0049620 A1 | 12/2001 | Blasko |
| 2002/0040394 A1 | 4/2002 | Shapira |
| 2002/0040395 A1 | 4/2002 | Davis et al. |
| 2002/0049762 A1 | 4/2002 | Shah et al. |
| 2002/0056087 A1 | 5/2002 | Berezowski et al. |
| 2002/0072966 A1 | 6/2002 | Eldering et al. |
| 2002/0077787 A1 | 6/2002 | Rappaport et al. |
| 2002/0078191 A1 | 6/2002 | Lorenz |
| 2002/0099812 A1 | 7/2002 | Davis et al. |
| 2002/0099818 A1 | 7/2002 | Russell et al. |
| 2002/0099819 A1 | 7/2002 | Hattori et al. |
| 2002/0103664 A1 | 8/2002 | Olsson et al. |
| 2002/0112048 A1 | 8/2002 | Gruyer et al. |
| 2002/0124074 A1 | 9/2002 | Levy et al. |
| 2002/0150054 A1 | 10/2002 | Sohraby et al. |
| 2002/0161673 A1 | 10/2002 | Lee et al. |
| 2003/0018969 A1 | 1/2003 | Humpleman et al. |
| 2003/0046303 A1 | 3/2003 | Chen et al. |
| 2003/0046385 A1 | 3/2003 | Vincent |
| 2003/0062223 A1 | 4/2003 | Coyle et al. |
| 2003/0067554 A1 | 4/2003 | Klarfeld et al. |
| 2003/0110485 A1* | 6/2003 | Lu .................... H04M 15/00 725/9 |
| 2003/0144868 A1 | 7/2003 | MacIntyre et al. |
| 2003/0145319 A1 | 7/2003 | Sato |
| 2003/0149975 A1 | 8/2003 | Eldering et al. |
| 2003/0163563 A1 | 8/2003 | Bean |
| 2003/0182387 A1 | 9/2003 | Geshwind |
| 2003/0187677 A1 | 10/2003 | Malireddy et al. |
| 2003/0208578 A1 | 11/2003 | Taraborelli |
| 2003/0231203 A1 | 12/2003 | Gallella |
| 2003/0233197 A1 | 12/2003 | Padilla et al. |
| 2004/0003391 A1 | 1/2004 | Gutta et al. |
| 2004/0024717 A1 | 2/2004 | Sneeringer |
| 2004/0221033 A1 | 11/2004 | Davis et al. |
| 2005/0114511 A1 | 5/2005 | Davis et al. |
| 2005/0149964 A1 | 7/2005 | Thomas et al. |
| 2006/0074769 A1 | 4/2006 | Looney et al. |
| 2006/0075421 A1* | 4/2006 | Roberts ............. H04H 60/32 725/9 |
| 2006/0136965 A1 | 6/2006 | Ellis et al. |
| 2007/0011039 A1 | 1/2007 | Oddo |
| 2007/0022032 A1* | 1/2007 | Anderson ........... H04H 60/375 348/E7.071 |
| 2007/0136753 A1 | 6/2007 | Bovenschulte et al. |
| 2007/0143778 A1 | 6/2007 | Covell et al. |
| 2007/0174295 A1 | 7/2007 | Abraham et al. |
| 2007/0276940 A1 | 11/2007 | Abraham et al. |
| 2007/0294729 A1 | 12/2007 | Ramaswamy |
| 2007/0294740 A1 | 12/2007 | Drake et al. |
| 2008/0077951 A1 | 3/2008 | Maggio et al. |
| 2008/0120650 A1 | 5/2008 | Orihara et al. |
| 2008/0140479 A1 | 6/2008 | Mello et al. |
| 2008/0235733 A1 | 9/2008 | Heie et al. |
| 2008/0256235 A1 | 10/2008 | Or Sim et al. |
| 2008/0263200 A1 | 10/2008 | Or Sim et al. |
| 2008/0300965 A1* | 12/2008 | Doe ................ G06Q 30/0204 705/7.33 |
| 2008/0313017 A1 | 12/2008 | Totten |
| 2009/0055854 A1 | 2/2009 | Wright et al. |
| 2009/0112703 A1 | 4/2009 | Brown |
| 2009/0147786 A1 | 6/2009 | Li et al. |
| 2009/0259525 A1 | 10/2009 | Harrington |
| 2010/0036884 A1 | 2/2010 | Brown |
| 2010/0114527 A1 | 5/2010 | Lee |
| 2010/0146533 A1 | 6/2010 | Matsunaga et al. |
| 2010/0205628 A1 | 8/2010 | Davis et al. |
| 2010/0228855 A1 | 9/2010 | Sim et al. |
| 2011/0004682 A1 | 1/2011 | Honnold et al. |
| 2011/0029636 A1 | 2/2011 | Smyth et al. |
| 2011/0161997 A1 | 6/2011 | Rourk |
| 2011/0208860 A1 | 8/2011 | Sim et al. |
| 2011/0258049 A1 | 10/2011 | Ramer et al. |
| 2012/0124620 A1 | 5/2012 | Nishizawa et al. |
| 2012/0254911 A1* | 10/2012 | Doe .................. H04H 60/31 725/14 |
| 2012/0260278 A1 | 10/2012 | Lambert et al. |
| 2013/0160042 A1 | 6/2013 | Stokes et al. |
| 2013/0163658 A1 | 6/2013 | Luff et al. |
| 2013/0179914 A1 | 7/2013 | Falcon |
| 2013/0198125 A1 | 8/2013 | Oliver et al. |
| 2013/0227595 A1 | 8/2013 | Nielsen et al. |
| 2014/0150003 A1* | 5/2014 | Doe ............. H04N 21/44224 725/9 |
| 2014/0379421 A1 | 12/2014 | Shankar et al. |
| 2014/0380348 A1 | 12/2014 | Shankar et al. |
| 2014/0380350 A1 | 12/2014 | Shankar et al. |
| 2015/0067075 A1 | 3/2015 | Sheppard et al. |
| 2015/0189378 A1 | 7/2015 | Soundararajan et al. |
| 2015/0229979 A1 | 8/2015 | Wood et al. |
| 2015/0245105 A1 | 8/2015 | Wickenkamp |
| 2016/0037201 A1 | 2/2016 | Kitts et al. |

(56) References Cited

U.S. PATENT DOCUMENTS

| | | |
|---|---|---|
| 2016/0092267 A1 | 3/2016 | Boyacigiller et al. |
| 2016/0165277 A1 | 6/2016 | Kirillov et al. |
| 2016/0165287 A1 | 6/2016 | Wood et al. |
| 2016/0269766 A1 | 9/2016 | Levande et al. |
| 2016/0269783 A1 | 9/2016 | Mowrer et al. |
| 2017/0078727 A1 | 3/2017 | Wood et al. |
| 2017/0083580 A1 | 3/2017 | Sheppard et al. |
| 2018/0005128 A1 | 1/2018 | Sheppard et al. |
| 2018/0131996 A1 | 5/2018 | Pecjak et al. |
| 2018/0205980 A1 | 7/2018 | Sullivan et al. |
| 2019/0370860 A1 | 12/2019 | Morovati Lopez et al. |
| 2020/0413116 A1 | 12/2020 | Sheppard et al. |

FOREIGN PATENT DOCUMENTS

| | | |
|---|---|---|
| EP | 0388658 | 9/1990 |
| EP | 0228458 | 10/1991 |
| EP | 0451384 | 10/1991 |
| EP | 0632382 | 1/1995 |
| EP | 0747841 | 12/1996 |
| JP | 2004357311 | 12/2004 |
| JP | 20080011365 | 1/2008 |
| KR | 20130008978 | 1/2013 |
| WO | 8700201 | 1/1987 |
| WO | 9826529 | 6/1998 |
| WO | 0111606 | 2/2001 |
| WO | 2006096177 | 9/2006 |
| WO | 2007022250 | 2/2007 |

OTHER PUBLICATIONS

Screen Shot of ftp.ist.utl.pt, 1999, 3 pages.
Pestana et al., "A Visual History of Web Measurement: Vendor Emergence, Technology Deployment and Seminal Events," 2005, 1 page.
"Third International World-Wide Web Conference-Technology, Tools and Applications," Apr. 10-14, 1995, retrieved from <http://www.igd.fhg.de/archive/1995_www95/>, retrieved on May 24, 2006, 1 page.
Sanders, "Plexus Log File Summaries," email message from sanders@bsdi.com, Jun. 18, 1993, retrieved from <http://ksi.cpsc.ucalgary.ca/archives/WWW-TALK/www-talk-1993q2.messages/563.html> retrieved from May 24, 2006, 4 pages.
"2.4—Windows Based Only Internet BBS Software—The Official BBS FAQ," retrieved from <http://www.sysopworld.com/bbsfaq/ch02.2.4.htm>, retrieved on May 24, 2006, 23 pages.
Java@mt.e-technik.uni-kassel.de, "Counter," retrieved from <http://we.archive.org/web/19970802020140/www.uni-kassel.de/fb16/ipm/mt/java/counteru.html>, retrieved on May 24, 2006, 1 page.
"Linear IP Advertising Infrastmcture," retrieved from <http://blackarrow.tv/wp-content/uploads/2015/04/Linear-IP-Advertising_Infrastructure_CED-Wallchart.jpg>, retrieved on Dec. 9, 2015, 1 page.
McGrew, "Web Authoring FAQ," 2005, 59 pages.
wwwTalk 1991 Archives, "Messages from Monday Oct. 28, 1991 to Friday, Dec. 13, 1991," retrieved from <http://ksi.cpsc.ucalgary.ca/archives/www-talk/www-talk-1991.index.html>, retrieved on May 24, 2006, 1 page.
Applet Demos, 1995-1996, 2 pages.
Wendt, "Applet Collection," retrieved from <http://www.thew.de/t/collection/readme.html>, retrieved on Dec. 9, 2015, 5 pages.
Applets at Kassel, "Applets and Applications," Department of Engineering Measurement, Dec. 12, 1996, retrieved from <http://web.archive.org/ web/19970802020436/http://www..uni-kassel.de/fb16Iipm/mUjavae/html>, retrieved on May 24, 2006, 5 pages.
Arbitron Inc., "Smartplus 8.0: Keeps Getting Smarter So You Can Too," 2007, 13 pages.
Arbitron Inc., "Respondent-Level Data: Your Key to Reaching the Hispanic Listener," retrieved from <http://arbitronratings.com/ad_agencies/rld_vs_hispsumm.htm?inframe>, retrieved on Sep. 21, 2007, 1 page.

Abrams et al., "Multimedia Traffic Analysis Using CHITRA95," ACM Multimedia 95—Electronic Proceedings, Nov. 5-9, 1995, retrieved from <http://ei.cs.vt.edu/~succeed/95multimediaAWAFPR/95multimediaAWAFPR.html>, retrieved on Jun. 9, 2006, 17 pages.
Abrams, "A Tool to Aid in Model Development and Validation," NCR Corporation, Annual Simulation Symposium, 1986, 10 pages.
Anderson et al., "Next Generation Intrusion Detection Expert System (NIDES)—Software Users Manual Beta—Update Release," SRI International, Dec. 1, 1994, 316 pages.
Arlitt et al., "Internet Web Servers: Workload Characterization and Performance Implications," IEEE/ACM Transactions on Networking, vol. 5, No. 5, Oct. 1997, 15 pages.
Bank, "Java Security," MIT, Dec. 8, 1995, retrieved from <http://groups.csail.mit.edu/mac/users/jbank/javapaper/javapaper.html,> retrieved on Apr. 30, 2015, 11 pages.
Barber, e-mail dated May 3, 1996, 2 pages.
Baskaran, "Gamelan Who's Who More Info," Earth Web, Inc., 1996, 2 pages.
Becker, "Department of Engineering Measurement," UNI Kassel, Sep. 20, 1996, 1 page.
Beckett, "Combined Log System," Computing Laboratory, University of Kent, retrieved from <http://www.igd.fhg.de/archive/1995_www95/papers/46/comblog.html>, retrieved on May 24, 2006, 8 pages.
Bates, "The Design of Browsing and Berrypicking Techniques for the Online Search Interface," Graduate School of Library and Information Science, University of California at Los Angeles, 1989, retrieved from <file://P:Drive Files\CLIENTS\Nielsen-NetRatings\SettledCases\Sane Solutions LLC\>, retrieved on Dec. 21, 2006, 19 pages.
Berners-Lee et al., "Uniform Resource Locators" Network Working Group, Dec. 1994, 23 pages.
Berners-Lee et al., "WorldWideWeb: Proposal for a HyperText Project," Nov. 12, 1990, 7 pages.
Berners-Lee, "Information Management: A Proposal," CERN, Mar. 1989, May 1990, retrieved from <http://www.w3org/History/1989/proposal.html>, retrieved on May 24, 2006, 14 pages.
Berners-Lee, "Presentation of WWW to Online Publishing 93," retrieved from <http://www.w3org/Talks/OnlinePublishing93/Overview.html>, retrieved on May 24, 2006, 1 pages.
Berners-Lee et al., "Hypertext Transfer Protocol—HTTP/1.0," Network Working Group, May 1996, retrieved from <http://www.3.org/Protocols/rfc1945/rfc1945>, retrieved on Mar. 22, 2007, 57 pages.
Berners-Lee, "The World Wide Web Browser," retrieved from <http://www.w3.org/People/Berners-Lee/WorldWideWeb.html>, retrieved on May 24, 2006, 4 pages.
Bernstein et al., "Architectures for Volatile Hypertext," Hypertext '91 Proceedings, Dec. 1991, 18 pages.
Bertot et al., "Web Usage Statistics: Measurement Issues and Analytical Techniques," Government Information Quarterly, vol. 14, No. 4, 1997, 23 pages.
Bestavros et al., "Application-Level Document Caching in the Internet," Proceeding of the Second International Workshop on Services in Distributed and Networked Environments (SDNE '95), Jun. 5-6, 1995, 8 pages.
Bieber et al., "Backtracking in a Multiple-window Hypertext Environment," ECHT '94 Proceedings, Sep. 1994, 9 pages.
Berners-Lee, "Plenary Talk at WWW Geneva 94," retrieved from <http://www.w3.org/Talks/WWW94Tim/> retrieved on May 24, 2006, 4 pages.
BL et al., "W3 Project—Assorted Design Notes," W3.org, retrieved from <http://w3.org/History/1994/WWW/WorkingNotes/Overview.html>, retrieved on May 24, 2006, 2 pages.
Blackarrow, Inc., "Meeting the Challenges of Video Advertising in an IP ABR Environment," 2012, 10 pages.
Blythe et al., "Lynx Users Guide Version 2.3," retrieved from <http://www.cse.unsw.edu.au/help/doc/lynx/lynx_help/Lynx_users_guide.html>, retrieved on Jun. 12, 2006, 12 pages.
Boyan, "Anonymous Surfing, The Anonymizer Homepage," Anonymizer, Sep. 1, 1995, retrieved from <http://web.archive.org/web/19990208003332m/_1/anonymizer.cs.cmu.edu:8080/>, retrieved on May 24, 2006, 1 page.

(56) References Cited

OTHER PUBLICATIONS

Boyns, "Crazy Counter," modified Mar. 8, 1996, 2 pages.
Boyns, "Crazy Counter (GIF89a)," modified Mar. 8, 1996, 1 page.
Boyns, "CrazyCounter.java," 1996, 5 pages.
Braun et al., "Applied Network Research: 1994 Annual Status Report," Applied Network Research, San Diego Supercomputer Center and University of California, San Diego, Apr. 19, 1995, 15 pages.
Brueggeman, "Monitoring CDROM Usage," UCSD Scripps Institution of Oceanography Library, retrieved from <http://www.peterbmeggeman.com/cv/usage.txt>, retrieved on Oct. 1, 2015, 5 pages.
Carmel et al., "Browsing in Hypertext: A Cognitive Study," IEEE Transactions on Systems, Man, and Cybernetics, vol. 22, No. 5, Sep./Oct. 1992, 23 pages.
Catledge et al., "Characterizing Browsing Strategies in the World-Wide Web," Proceedings of the Third International World-Wide Web Conference on Technology, Tools and Applications, Apr. 1995, 9 pages.
Cern, "Computer News Letter Oct.-Dec. 1991," Ref. CERN-CNL-1991-204, vol. 26, Issue No. 3, retrieved from <http://ref.web.cern.ch/ref/CERN/CNL/1991/204>, retrieved on May 24, 2006, 2 pages.
Chankhunthod et al., "A Hierarchical Internet Object Cache," ATEC 96 Proceedings of the 1996 Annual Conference on USENIX Annual Technical Conference, 1996, 11 pages.
Chen, "Supporting Advertisement on Electronic Publications," IBM Technical Disclosure Bulletin, Aug. 1996, 2 pages.
Claffy et al., "Traffic Characteristics of the T1 NSFNET Backbone," INFOCOM '93 Proceedings, Twelfth Annual Joint Conference of the IEEE Computer and Communications Societies, Networking: Foundation for the Future, IEEE, 1993, 11 pages.
Cooley et al., "Data Preparation for Mining World Wide Web Browsing Patterns," Knowledge and Information Systems, vol. 1, 1999, 27 pages.
Cooley et al., "Web Mining: Information and Pattern Discovery on the World Wide Web," Department of Computer Science, University of Minnesota, Jul. 16, 1997, 2 pages.
Cooper, "Design Considerations in Instrumenting and Monitoring Web-Based Information Retrieval Systems," Journal of the American Society for Information Science, vol. 49, No. 10, 1998, 17 pages.
Cove et al., "Online Text Retrieval via Browsing," Information Processing and Management, vol. 24, No. 1, 1988, 10 pages.
Crovella et al., "Explaining World Wide Web Traffic Self-Similarity," Computer Science Department, Boston University, Technical Report TR-95-15, Oct. 12, 1995, 19 pages.
Crovella et al., "Self-Similarity in World Wide Web Traffic: Evidence and Possible Causes," IEEE/ACM Transactions on Networking, Volumber 5, No. 6, Dec. 1997, 25 pages.
Cunha et al., "Characteristics of WWW Client-Based Traces," Computer Science Department, Boston University, Jul. 18, 1995, 19 pages.
Davis et al., "Instant Java Applets," Macmillan Computer Publishing USA, 1996, 234 pages.
Dean et al. (1995) "Security Flaws in the HotJava Web Browser," Department of Computer Science, Princeton University, Nov. 3, 1995. Proceedings 1996 IEEE Symposium on Security and Privacy, 1996, 8 pages.
December et al., "HTML and CGI Unleashed," 1995, 841 pages.
Dellecave Jr., "The 'Net Effect," Sales & Marketing Management: An Excutive's Guide to Sales and Marketing Technology, Mar. 1996, 9 pages.
Desjardins, "Activity Monitor 1.1 User's Guide" 1994, 5 pages.
Digital Envoy, "NetAcuity IP Intelligence Whitepaper," Digital Envoy, Inc., 2002-2003, 10 pages.
Email Counter Logs, 1996, 33 pages.
Earth Station 9, "Computers and the Internet," <http://www.earthstation9.com/counters.htm>, retrieved from May 24, 2006, 2 pages.

Earthweb, Inc., "Java-Enhanced Communication Tools," Gamelan, The Official Directory for Java, 1996, 7 pages.
Engagement Marketing Group, "Advanced Advertising Media Project—Phase One: Summary Report—Remaking Video-on-Demand to Deliver Media Value," May 11, 2011, 50 pages.
European Patent Office, "Supplementary Search Report," issued in connection with European Patent Application No. 00949006,1, dated Jul. 12, 2006, 5 pages.
European Patent Office, "Extended Search Report," issued in connection with European Patent Application No. 10012280.3, dated Mar. 17, 2014, 6 pages.
European Patent Office, "Supplementary Partial Search Report," issued in connection with European Patent Application No. 00949006.1, dated Apr. 19, 2006, 4 pages.
European Patent Office, "Office Action," issued in connection with European Patent Application No. 00949006.1, dated Apr. 18, 2008, 7 pages.
European Patent Office, "Office Action," issued in connection with European Patent Application No. 00949006.1, dated Oct. 7, 2014, 6 pages.
Feliciano et al., "Lamprey: Tracking Users on the World Wide Web," Section on Medical Informatics, Stanford University, 1996, 5 pages.
Fielding, "wwwstat manual," retrieved from <http://ftp.ics.uci.edu/pub/websoft/wwwstat/wwwstat.html>, retrieved on Jun. 12, 2006, 11 pages.
Fielding, "wwwstat: HTTPd Logfile Analysis Software," Department of Information and Computer Science, University of California, Irvine, retrieved from <http://ftp.ics.uci.edu/pub/websoft/wwwstat/>, retrieved on May 24, 2006, 3 pages.
Finke, "Monitoring Usage of Workstations with a Relational Database," 1994 LISA—San Diego, California, Sep. 19-23, 1994, 10 pages.
Fleishman, "Web Log Analysis: Who's Doing What, When? Part 2," retrieved from <http://www,webdeveloper.com/management/management_log_analysis_2.html> retrieved on Dec. 21, 2006, 4 pages.
Fuller, "Measuring User Motivation From Server Log Files," Usability Research, retrieved from <http://www.microsoft.com/usability/webconf/fuller/fuller.htm>, Oct. 30, 2000, 15 pages.
Gellman, "They Could be Monitoring Your Every Move," GCN, retrieved from <http:www.gcn.com/print/15 9/31672-1.html>, retrieved on Apr. 29, 2006, 3 pages.
Girdley et al., "Web Programming with Java," 1996, pp. 365-370, 5 pages.
Girdley et al., "Web Programming with Java," 1996, 499 pages.
Gile, "Reporting Application Usage in a LAN Environment," ACM SIGUCCS, vol. 18, 1990, 13 pages.
Gilula et al., "A Direct Approach to Data Fusion," journal of Marketing Research, vol. 43, Feb. 2006, 22 pages.
Goldmail, "GoldMail Thinks Consumers Should Get Paid for Reading Advertising!" Google Groups, Jul. 7, 1996, 4 pages.
Goldmail, "GoldMail Revolutionizes Internet Advertising!" Google Groups, Jul. 7, 1996, 4 pages.
Glassman, "A Caching Relay for the World Wide Web," Systems Research Center, Digital Euipment Corporation, 1994, 10 pages.
Google Groups, "java project" "I am volunteering my time," retrieved from <http://groups.google.com/group/comp.lang.java.programmer/browse_thread/thread/5430a3 . . . >, retrieved on Apr. 12, 2006, 3 pages.
Google Groups, "xferstats," retrieved from <http://groups.google.com/group/alt.sources/browse_thread/thread/c9360d434be3ad86/0a180fb213f27e2b?q=xferstats&mum=199&hl=en>, retrieved on May 24, 2006, 6 pages.
Google Groups, "Counter," retrieved from <http://groups-beta.google.com/group/comp.lang.javascript/browse_thread/thread/4874a9f9c . . . >, retrieved on Jun. 8, 2005, 10 pages.
Google Groups, "Can U Make a Hit Counter in a Java Applet?," retrieved from <http://groups.google.com/group/comp.lang.java/browse_thread/thread/f2a41d0cb5c8eee4/c8 . . . >, retrieved on May 2, 2006, 10 pages.

(56) References Cited

OTHER PUBLICATIONS

Google Groups, "xferstats," retrieved from <http://groups.google.com/group/comp.unix.xenix/browse_thread/thread/cb3dlaed21bc0e3e/8d9ce54693af9e98?q=xferstats&mum=200 . . . >, retrieved on May 24, 2006, 3 pages.
Google Groups, "wwwstat," retrieved from <http://groups.google.com/group/comp.infosystems.www/browse_thread/thread/784aa9c20470d342/fc0cde0742990875?q-wwwstat&mum-43 . . . >, retrieved on May 24, 2006, 8 pages.
Google Groups, "fwgstat," retrieved from <http://groups.google.com/group/comp.infosystems.gopher/browse_thread/thread/cl5dcl6c0284c02d0/953bf38f2cee15ea?q-fwgstat&mum-34>, retrieved on May 24, 2006, 3 pages.
Google Groups, "fwgstat," retrieved from <http://groups.google.com/group/comp.infosystems.gopher/browse_thread/thread/4790232128a9157/dl534978ddddf998?q-fwgstat&mum-33>, retrieved on May 24, 2006, 10 pages.
Google Groups, "getsites," retrieved from <http://groups.google.com/group/comp.infosystems.www/browse_thread/threada36eeb6daea735d8/0fa7adf53e51b894?q=getsites&mum=19&h . . . >, retrieved on May 24, 2006, 2 pages.
Google Groups "javascript counter script," retrieved from <http://groups.google.com/group/comp.database.oraclelbrowse_thread/thread/97671e385dlbac94n77a82875e328555?q=javascript+counter+sc . . . >, retrieved on May 24, 2006, 2 pages.
Google Groups "javascript exploit," retrieved from <http://groups.google.com/group/comp.sys.mac.misclbrowse_thread/thread/f9285c7d4e4354cd/eb94d50669810159?q=javascript+exp;oit&mum>, retrieved on May 24, 2006, 2 pages.
Google Groups, "hit counter" retrieved from <http://groups.google.com/group/comp.infosystems.www.authoring.html/browse_thread/e515dad2e5dle8cc/0ebdc329e9ec00cc?q=hit . . . > retrieved on May 24, 2006, 7 pages.
Google Groups, "access counters," retrieved from <http://groups.google.com/group/comp.infosystems.www.authoring.html/browse_thread/dfbla837f29el65e/a0e0e6al31c6102d?q=access . . . > retrieved on May 24, 2006, 3 pages.
Google Groups, "cgi hit counter," retrieved from <http://groups.google.com/group/comp.lang.perl/browse_thread/thread/b4ef428d8c96d525/3e 18b779bldad79e?q=cgi+hit+counter & mum=74 & . . . > retrieved on May 24, 2006, 2 pages.
Google Groups, "cgi hit counter," retrieved from <http://groups.google.com/group/comp.infosystems.www.users/browse_thread/thread/390de231bb3f0097/64bddc80086f124b?q=cgi+hit+counter> retrieved on May 24, 2006, 2 pages.
Google Groups, "Garrett Casey," retrieved from <Google Groups: comp.infosystems.www.authoring.cgi>, 2007, 2 pages.
Google Groups, "Garrett Casey counter," Jul. 2, 1996, retrieved from <Google Groups: comp.infosystems.www.misc.entrepreneurs>, 2007, 3 pages.
Google Groups, "javascript," retrieved from <http://groups.google.com/group/comp.society.privacr/browse_thread/thread/9b12496aeda7fd78/dd2ebe5f8966fd05?q=javascript&mum=1&hl>, retrieved on May 24, 2006, 3 pages.
Google Groups, "wusage 1.0," retrieved from <http://groups.google.com/group/comp.infosystems.www/browse_thread/thread/a07834d8b38dbc4f/f05bfldf25d47fd3?q-wusage+1.0&mum=1 . . . >, retrieved on May 24, 2006, 2 pages.
Google Groups, "getstats," retrieved from <http://groups.google.com/group/comp.infosystems.www/browse_thread/thread/1009129delaaf6aa/ed924b219923cc7d?q=getstats&mum=l & hl..>, retrieved on May 24, 2006, 3 pages.
Gotta et al., "Performance Evaluation of Web Applications," Proceeding of the Computer Measurement Group International Conference, 1998, 13 pages.
Greenberg, "Using Unix: Collected Traces of 168 Users," Advanced Technologies, The Alberta Research Council, 1988, 14 pages.
Grobe, "An Early History of Lynx: Multidimensional Collaboration," Academic Computing Services, University of Kansas, Apr. 10, 1997, retrieved from <http://people.cc.ku.edu/~grobe/early-lynx.html>, retrieved on May 24, 2006, 8 pages.
Gundavaram, "CGI Programming on the World Wide Web," 1996, 455 pages.
Hallam-Baker et al., "Extended Log File Format," W3C Working Draft WD-logfile-960323, retrieved from <http://www.w3.org/TRlWD-logfile.html>, retrieved on May 24, 2006, 6 pages.
Hansen et al., "Automated System Monitoring and Notification With Swatch," Seventh System Administration Conference (LISA '93), Monterey California, Nov. 1993, 9 pages.
Haran, "PC-Meter Tracks Computer Users," Advertising Age, Oct. 2, 1995, retrieved from <http://adage.com/print/85520>, retrieved on Jun. 2, 2015, 2 pages.
Hello Net! Counter, filed Aug. 21, 2007, 1 page.
Highbeam Research, "Harris Computer Systems and Webster Network Strategies Announce Alliance to Offer WWW Monitoring Capabilities Through Firewalls," Business Wire, Mar. 4, 1996, retrieved from http://www.highbeam.com, 5 pages.
Hilbert et al., "Agents for Collecting Application Usage Data Over the Internet," Department of Information and Computer Science, University of California, Irvine, retrieved from <http://www.ics.uci.edu/~redmiles/publications/C027-HR98.pdf>, retrieved on Oct. 1, 2015, 8 pages.
Holgermetzger, "A Netscape Timeline," Mar. 1993 through Mar. 17, 2006, retrieved from <http://www.holgermetzger.de/Netscape_History.html,> retrieved on May 24, 2006, 4 pages.
"Horace's Java—Page View Timer Demo—Form 1," Aug. 7, 1999, 2 pages.
Horak, "IOMON—Protected Mode I/O Port Monitor," Technical University of Prague, Faculty of Nuclear Science and Physical Engineering, Jan. 1992, 6 pages.
Houston, "A Vision of Advertising Technology—How It Will Work and Why Advertisers Must Involve Themselves in the Process," Modern Media, Aug. 1994, retrieved from <http://www.web.archive.org/web/19961111095749/www.modernmedia.com/clippings/articles/sm . . . >, retrieved on Jun. 8, 2005, 6 pages.
Ibiblio, "Ibiblio—Ten Years in the Making—Aligning the Sites," retrieved from <http://www.ibiblio.org/history/> , retrieved on May 24, 2006, 10 pages.
W3, "Logging Control in W3C httpd," retrieved from <http://www.w3.org/Daemon/User/Config/Logging.html,> retrieved on May 24, 2006, 3 pages.
Intellectual Property Office of the United Kingdom, "Examination Report," issued in connection with United Kingdom Patent Application No. GB0920943.8, dated Apr. 11, 2011, 5 pages.
Intellectual Property Office of the United Kingdom, "Examination Report," issued in connection with United Kingdom Patent Application No. GB0920943.8, dated Nov. 10, 2010, 6 pages.
International Searching Authority, "International Search Report," issued in connection with International Patent Application No. PCT/US2015/015219, dated May 22, 2015, 4 pages.
International Searching Authority, "Written Opinion," issued in connection with International Patent Application No. PCT/US2015/015219, dated May 22, 2015, 7 pages.
International Searching Authority, "International Preliminary Report on Patentability," issued in connection with International Patent Application No. PCT/US2015/015219, dated Aug. 25, 2016, 9 pages.
International Bureau, "International Preliminary Report on Patentability," issued in connection with International Patent Application No. PCT/US2008/059874, dated Dec. 10, 2009, 7 pages.
International Preliminary Examining Authority, "International Preliminary Examination Report," issued in connection with International Patent Application No. PCT/AU00/00937, dated Nov. 2, 2001, 3 pages.
International Searching Authority, "International Search Report," issued in connection with International Patent Application No. PCT/US2008/059874, dated Mar. 2, 2009, 3 pages.
International Searching Authority, "Written Opinion," issued in connection with International Patent Application No. PCT/US2008/059874, dated Mar. 2, 2009, 5 pages.

(56) References Cited

OTHER PUBLICATIONS

IP Australia, "Examiner's First Report," issued in connection with Australian Patent Application No. 2008260397, dated Nov. 17, 2010, 2 pages.
IP Australia, "Notice of Acceptance," issued in connection with Australian Patent Application No. 2008260397, dated Aug. 7, 2012, 2 pages.
Ivler, "Advertising Models and Associated Software . . . ," Google Groups, May 15, 1996, 5 pages.
Japan Patent Office, "Notice of Reasons for Rejection," issued in connection with Japanese Patent Application No. 2001-516087, dated Jan. 25, 2011, 8 pages.
Japan Patent Office, "Notice of Reasons for Rejection," issued in connection with Japanese Patent Application No. 2001-516087, dated May 18, 2010, 14 pages.
JavaPage, "Java," retrieved from <http://web.archive.org/web/20040712072256/http://www.groton.k12.ct.us/WWW/fsr/student/Spring02/W . . . >, retrieved on May 24, 2006, 4 pages.
JavaWorld, JavaWorld Editorial Calendar, Feb. 26, 1996, 1 page.
JavaWorld, JavaWorld: IDG's Magazine for the Java Community, vol. 1, Issue 1, retrieved from <www.javaworld.com>. Mar. 8, 1996, 1 page.
JavaWorld, JavaWorld: IDG's Magazine for the Java Community, vol. 1, Issue 2, retrieved from <www.javaworld.com>. Apr. 1, 1996, 1 page.
Johnson, "Automatic Touring in a Hypertext System," IEEE Twelfth Annual International Phoenix Conference on Computers and Communications, 1993, 7 pages.
Johnson, "Implementation Guide, HBX On-Demand Web Analytics," WebSideStory, Inc., 2006, 12 pages.
Kamba et al., "The Krakatoa Chronicle—An Interactive, Personalized, Newspaper on the Web," Georgia Institute of Technology, 1995, 15 pages.
Kamba, "Personalized Online Newspaper," NEC, vol. 49, No. 7, 1996, 6 pages.
Kent et al., "Official Netscape JavaScript Book," 1996, 508 pages.
Kiesler et al., "Homenet: A Field Trial of Residential Internet Services," Carnegie Mellon University, Apr. 1995, retrieved from http://homenet.hcii.cs.cmu.edu/progress/report1.html, 12 pages.
Kraut et al., "Homenet: A Field Trial of Residential Internet Services," Carnegie Mellon University, Apr. 1995, retrieved from http://www.acm.org/sigchi/chi96/proceedings/papers/Kraut/rek_txt.htm, 14 pages.
Kugel et al., "Decay Effects in Online Advertising: Quantifying the Impact of Time Since Last Exposure," Presented at the ARF 50th Annual Convention, New York City, Apr. 26-28, 2004, 19 pages.
Lamers, "WebThreads, LLC of Vienna, VA, USA is Pleased to Announce WebThreads™ 1.0.1 Website Interactivity and Visitor Tracking Solution," Oct. 8, 1996, 5 pages.
Lee et al., "Intelligent Agents for Matching Information Providers and Consumers on the World-Wide-Web," Proceedings of the Thirtieth Annual Hawaii International Conference on System Sciences, IEEE, 1997, 11 pages.
Levine, "Computer Privacy Digest V8#024" Computer Privacy Digest, vol. 8, Issue No. 024, Mar. 17, 1996, retrieved from <http://web.archive.org/web/20000829051834/itu.rdg.ac.uk/misc/Mailing_Lists/cpd/00000002.htm>, retrieved on May 24, 2006, 19 pages.
Lubow, "An Engineer's Guide to Autocad," Industrial Engineering, vol. 19, No. 8, Aug. 1987, 6 pages.
Long, "Gwstat v1.1—Generate Graphs of HTTPD Server Traffic," BUBL Administrator, Jul. 14, 1994, retrieved from <http://www.bubl.ac.uk//archive/internet/www/servers/gswtat6.htm>, retrieved on Jun. 12, 2006, 1 page.
Loverso, "Netscape Nav. 2.0 Exposes User's Browsing History," The Risks Digest, vol. 7, No. 79, Feb. 23, 1996, 2 pages.
Lynnworth, "Tracking Home Page Hits," Dr. Dobbs Journal, Dec. 1, 1995, retrieved from <http://www.drdobbs.com/article/print?articleId-184409739&siteSectionName-web-development>, retrieved on Apr. 30, 2015, 7 pages.

Marchionini, "Information-Seeking Strategies of Novices Using a Full-Text Electronic Encyclopedia," journal of the American Society for Information Science, vol. 40, No. 1, 1989, 16 pages.
Mayer-Schonberger, "The Internet and Privacy Legislation: Cookies for a Treat?" West Virginia University, retrieved from <http://web.archive.org/web/19990203034203/www.wvjolt.wvu.edu/wvjolt/current/issue1/articles/mayer/ . . . >, retrieved on May 24, 2006, 7 pages.
McCanne et al., "The BSD Packet Filter: A New Architecture for User-level Packet Capture," Lawrence Berkeley Laboratory, Berkeley, CA, Dec. 19, 1992, 11 pages.
McGee, "Web Pages: A Programmer's Perspective," Jun. 10, 1996, retrieved from <http://www.dfpug/loseblattsammlung/migration/whitepapers/webpages.htm>, retrieved on Mar. 22, 2007, 13 pages.
McGrath, "The Tail-Less Mouse," Computer Graphics World, vol. 11, Oct. 1988, 5 pages.
McGraw et al., "Untangling the Woven Web: Testing Web-based Software," Reliable Software Technologies Corporation, Apr. 1, 1996, 9 pages.
McKenzie et al., "An Empirical Analysis of Web Page Revisitation," Department of Computer Science, University of Canterbury, 2001, 7 pages.
MediaWeek, "Nielsen Unveils National TV/Internet Fusion," www.mediaweek.com, Nov. 1, 2006, 2 pages.
Microsoft Corporation, "Screen Shots of Windows NT 3:1," retrieved from <http://www.cs.umd.edu/hcil/muiseum/systems/winnt31src.html>, retrieved on Jun. 7, 2005, 4 pages.
Mobasher, "Data Cleaning: Next: Transaction Identification up: Preprocessing Tasks," retrieved from <http://maya.cs.edpaul.edu/~mobasher/webminer/survey/node11.html>, 1997, 1 page.
Mobasher, "Pattern Discovery from Web Transactions: Next:Preprocessing Tasks up: Web Mining: Information and Previous: Pattern Analysis Tools," retrieved from <http://maya.cs.edpaul.edu/~mobasher/webminer/survey/node9.html>, 1997, 1 page.
Mobasher, "Preprocessing Tasks: Next: Data Cleaning up: Pattern Discovery from Previous: Patten Discovery from . . . ," retrieved from <http://maya.cs.edpaul.edu/~mobasher/webminer/survey/node10.html>, 1997, 1 page.
Mobasher, "A Taxonomy of Web Mining: Next: Web Content Mining up: Web Mining: Information and Previous: Introduction," retrieved from <http://maya.cs.edpaul.edu/~mobasher/webminer/survey/node2.html>, 1997, 1 page.
Mobasher, "Agent-Based Approach: Next Database Approach up: Web Content Mining Previous: Web Content Mining," retrieved from <http://maya.cs.edpaul.edu/~mobasher/webminer/survey/node4.html>, 1997, 2 pages.
Mobasher, "Content Mining: Next: Agent-Based Approach up: A Taxonomy of Previous: A Taxonomy of," retrieved from <http://maya.cs.edpaul.edu/~mobasher/webminer/survey/node3.html>, 1997, 1 page.
Mobasher, "DataBase Approach: Next Web Usage Mining up: Web Content Mining Previous: Agent-Based Approach," retrieved from <http://maya.cs.edpaul.edu/~mobasher/webminer/survey/node5.html>, 1997, 2 pages.
Mobasher, "Introduction, Next: A Taxonomy of up: Web Mining: Information and Previous: Web Mining: Information and -," retrieved from <http://maya.cs.edpaul.edu/~mobasher/webminer/survey/nodel.html>, 1997, 2 pages.
Mobasher, "Pattern Analysis Tools: Next: Pattern Discovery from up: Web Usage Mining Previous: Pattern Discovery Tool," retrieved from <http://maya.cs.edpaul.edu/~mobasher/webminer/survey/node8.html>, 1997, 2 pages.
Mobasher, "Pattern Discovery Tools: Next: Pattern Analysis Tools up: Web Usage Mining Previous: Web Usage Mining," retrieved from <http://maya.cs.edpaul.edu/~mobasher/webminer/survey/node7.html>, 1997, 2 pages.
Mobasher, "Web Usage Mining: Next: Pattern Discovery Tools up: A Taxonomy of Previous: Database Approach," retrieved from <http://maya.cs.edpaul.edu/~mobasher/webminer/survey/node6.html>, 1997, 2 pages.
Mobasher, "Discovery Techniques in Web Transactions," retrieved from <http://maya.cs.edpaul.edu/~mobasher/webminer/survey/node13.html>, 1997, 1 page.

(56) References Cited

OTHER PUBLICATIONS

Mobasher, "Path Analysis," retrieved from <http://maya.cs.edpaul.edu/~mobasher/webminer/survey/node14.html>, 1997, 1 page.
Mobasher, "Transaction Identification," retrieved from <http://maya.cs.edpaul.edu/~mobasher/webminer/survey/node12.html>, 1997, 1 page.
Mobasher, "Association Rules," retrieved from <http://maya.cs.edpaul.edu/~mobasher/webminer/survey/node15.html>, 1997, 1 page.
Mobasher, "Sequential Patterns," retrieved from <http://maya.cs.edpaul.edu/~mobasher/webminer/survey/node16.html>, 1997, 1 page.
Mobasher, "Clustering and Classification," retrieved from <http://maya.cs.edpaul.edu/~mobasher/webminer/survey/node17.html>, 1997, 1 page.
Mobasher, "Analysis of Discovered Patterns," retrieved from <http://maya.cs.edpaul.edu/~mobasher/webminer/survey/node18.html>, 1997, 1 page.
Mobasher, "Visualization Techniques," retrieved from <http://maya.cs.edpaul.edu/~mobasher/webminer/survey/node19.html>, 1997, 1 page.
Mobasher, "OLAP Techniques," retrieved from <http://maya.cs.edpaul.edu/~mobasher/webminer/survey/node20.html>, 1997, 1 page.
Mobasher, "Data and Knowledge Querying," retrieved from <http://maya.cs.edpaul.edu/~mobasher/webminer/survey/node21.html>, 1997, 1 page.
Mobasher, "Usability Analysis," retrieved from <http://maya.cs.edpaul.edu/~mobasher/webminer/survey/node22.html>, 1997, 1 page.
Mobasher, "Web Usage Mining Architecture," retrieved from <http://maya.cs.edpaul.edu/~mobasher/webminer/survey/node23.html>, 1997, 1 page.
Mobasher, "Research Directions," retrieved from <http://maya.cs.edpaul.edu/~mobasher/webminer/survey/node24.html>, 1997, 1 page.
Mobasher, "Data Pre-Processing for Mining," retrieved from <http://maya.cs.edpaul.edu/~mobasher/webminer/survey/node25.html>, 1997, 1 page.
Mobasher, "The Mining Process," retrieved from <http://maya.cs.edpaul.edu/~mobasher/webminer/survey/node26.html>, 1997, 1 page.
Mobasher, "Analysis of Mined Knowledge," retrieved from <http://maya.cs.edpaul.edu/~mobasher/webminer/survey/node27.html>, 1997, 1 page.
Mobasher, "Conclusion," retrieved from <http://maya.cs.edpaul.edu/~mobasher/webminer/survey/node28.html>, 1997, 1 page.
Mobasher, "References," retrieved from <http://maya.cs.edpaul.edu/~mobasher/webminer/survey/node29.html>, 1997, 1 page.
Mobasher, "About This Document," retrieved from <http://maya.cs.edpaul.edu/~mobasher/webminer/survey/node30.html>, 1997, 1 page.
Mogul, "Efficient Use of Workstations for Passive Monitoring of Local Area Networks," WRL Research Report 90/5, Western Research Laboratory, Jul. 1990, 29 pages.
Mosaic Communications Corporation, "Welcome to Netscape," retrieved from <http://www.hnehosting.com/mirrors/Origin_of_a_Browser/mcom.10.1994/home/welcome.html>, retrieved on May 24, 2006, 2 pages.
Mulvenna et al., "The 'Soft-Push:' Mining Internet Data for Marketing Intelligence," Working Conference: Electronic Commerce in the Framework of Mediterranean Countries Development, Ioannina, Greece, 12 pages.
Montgomery, "Using Clickstream Data to Predict WWW Usage," Aug. 1999, 27 pages.
Mueller, "InfoTicker Java Applet," Google Groups, May 11, 1996, retrieved from <http://groups.google.com/group/comp.infosystems.www.announce/browse_thread/thread/cc . . . >, retrieved on May 2, 2006, 2 pages.
Muquit, "WWW Homepage Access Counter and Clock!" retrieved from <http://www.muquit.com/muquit/software/Count/Count.html>, retrieved on May 24, 2006, 32 pages.
Naor et al., "Secure Accounting and Auditing on the Web," Computer Networks and ISDN Systems, vol. 30, 1998, 10 pages.
Nardone, "The Modem Media Internet Reach and Involvement Scale (IRIS)," Modem Media, Febmary 1995, retrieved from <http://web.archive.org/web/19961111095728/www.modernmedia.com/clippings/articles/iris>, retrieved on Jun. 8, 2005, 3 pages.
National Defense University, "Information Operations Timeline," retrieved from <http://www.jfsc.ndu.edu/schools_programs/jciws/iw/io_timeline.asp>, retrieved on May 24, 2006, 9 pages.
Naughton, "The JAVA Handbook," 1996, uploaded in 2 parts, 446 pages.
NCSA, "In the Beginning There was NCSA Mosaic . . . " NCSA, retrieved from <http://www.ncsa.uiuc.edu/News/MosaicHistory/>, retrieved on Jun. 12, 2006, 15 pages.
Net.Genesis et al., "Build a Web Site: The Programmer's Guide to Creating, Building, and Maintaining Web Presence," 1995,, 721 pages.
Netscape, "Mosaic Communications Changes Name to "Netscape Communications Corporation,"" Netscape Communications Corporation, retrieved from <http://www.holgermetzger.de/netscape/NetscapeCommunicationsNewsRelease.htm>, retrieved on May 24, 2006, 2 pages.
Netscape Communication and Sun Microsystems, "Sun and Netscape Announce JavaScript," Dec. 4, 1995, 8 pages.
Neumann, "Forum on Risks to the Public in Computers and Related Systems," Risks-Forum Digest, vol. 17, Issue 83, Mar. 4, 1996, 11 pages.
Nielsen, "Classic HTTP Documents," 1995, retrieved from <http://www.w3.org/Protocols/Classic.html>, retrieved on May 24, 2006, 1 page.
O'Connell, "A New Pitch: Advertising on the World Wide Web is a Whole New Ball Game," Modern Media, May 1995, retrieved from <http://web.archive.org/web/19961111095738/www.modernmedia.com/clippings/articles/ne . . . >, retrieved on Jun. 8, 2005, 8 pages.
Older Counter.html history, "Older History of Changes," retrieved from <http://www.ualberta.ca/GEO/Counter.History.html>, retrieved on May 24, 2006, 8 pages.
Ostermann, "Tcptrace Homepage," tcptrace.org, retrieved from <http://www.tcptrace.org, retrieved on Jun. 12, 2006, 1 page.
Ousterhout et al., "A Trace-Driven Analysis of the UNIX 4.2 BSD File System," Computer Science Division, Electrical Engineering and Computer Sciences, University of California, Apr. 25, 1985, 30 pages.
Padmanabhan et al., "Analysis of Web Site Usage Data: How Much Can We Learn About the Consumer from Web Logfiles?," Working Paper IS-96-18, Dec. 1996, 33 pages.
Paul, "Marketing on the Internet," Journal of Consumer Marketing, vol. 13, No. 4, Aug. 1996, 17 pages.
Perlman, "Asynchronous Design/Evaluation Methods for Hypertext Technology Development," Hypertext '89 Proceedings, Nov. 1989, 21 pages.
Pew, "Instant Java," Sun Microsystems, Inc., 1996, 370 pages.
Philip Morris, "Teenage Attitudes and Behavior Study Methodology 2006", 9 pages.
Pierrakos et al., "Web Usage Mining as a Tool for Personalization: A Survey," User Modeling and User-Adapted Interaction, vol. 13, 2003, 62 pages.
Pitkow et al., "A Simple Yet Robust Caching Algorithm Based on Dynamic Access Patterns," Proceedings of the Second International WWW Conference, GVU Technical Report; VU-GIT-94-39, 8 pages.
Pitkow et al., "Results From the First World-Wide Web User Survey," Journal of Computer Networks and ISDN Systems, vol. 27, No. 2, 1994, 15 pages.
Pitkow et al., "Using the Web as a Survey Tool: Results From the Second WWW User Survey," Third International WWW Conference, GVU Technical Report: GVU-GIT-94-40, 12 pages.
Pitkow et al., "Results From the Third World-Wide Web User Survey," Graphics, Visualization, & Usability Center, Georgia Institute of Technology, 1995 10 pages.
Poler, "Improving WWW Marketing Through User Information and Non-Intrusive Communication," Internet Profiles Corporation (I/PRO), 4 pages.
Powell, "Tomorrow's Heavyweight?" Network World, vol. 15, No. 49, Dec. 7, 1998, 1 page.

(56) References Cited

OTHER PUBLICATIONS

Internet Profiles Corporation PR Newswire Accoc., Inc., "I/PRO is First to Develop a Solution for Measuring Java Applets," Apr. 1996, 2 pages.

Progressive Networks, Inc., "RealServer Administration and Content Creation Guide Version 4.0," Progressive Networks, Inc., 1995-1997, 366 pages.

Progressive Networks, Inc., "Realaudio Server Administration and Content Creation Guide Version 3.0," Progressive Networks, Inc., 1995-1996, 292 pages.

Raggett, "HTML 3.2 Reference Specification," W3C, 1997, retreived from <http://www.w3.org/TR/REC-html32>, retrieved from Mar. 22, 2007, 49 pages.

RealNetworks Inc., "RealServer Administration Guide Version 5.0," 1995-1997, 262 pages.

RealNetworks, "Real System 5.0 Security Features Whitepaper," 1997, 10 pages.

Regents of the University of California, "Changes to wwwstat: httpd Logfile Analysis Package," 1994,1996, retrieved from <http://ftp.ics.uci.edu/pub/websoft/wwwstat/Changes>, retrieved on Jun. 12, 2006, 4 pages.

Resonate, "Network Traffic Mangement, Database Traffic Management," Resonate, Inc. 2005, 2 pages.

Reuters, "Study Faults Online v, FTC Probes," Googel Groups, Mar. 28, 1996, 3 pages.

Rodley, "Writing JAVA Applets," 1996, 430 pages.

Rust et al., "An Audience Flow Model of Television Viewing Choice," Marketing Science, vol. 3, No. 2, Spring 1984, 12 pages.

Schmittlein, "Why Does the NBD Model Work?" Marketing Science, vol. 4, No. 3, Summer 1985, 1 page.

Seshan et al., "SPAND: Shared Passive Network Performance Discovery," Proceedings of the USENIX Symposium on Internet Techonoligies and Systems, Monterey, California, Dec. 1997, 13 pages.

Shahabi et al., "Knowledge Discovery from Users Web-Page Navigation," 1997 retrieved from http://www.ict.griffith.edu/au~vlad/teaching/kdd.d/readings_d/shahabi97knowledge.pdf, 11 pages.

Shepard, "TCP Packet Trace Analysis," MIT/LCS/TR-494, MIT Laboratory for Computer Science, Feb. 1991, 70 pages.

Siochi et al., "Computer Analysis of User Interfaces Based on Repetition in Transcripts of User Session," ACM Transactions on Information System, vol. 9, No. 4, 1991, 27 pages.

Staten, "Navigator Tricks Raise Concerns," MacWeek, vol. 10, No. 11, Mar. 1996, 2 pages.

Stengle, "Tying TV Advertising to Action: Leveraging the Second Screen to Raise the Effectiveness & Measurability of TV Advertising," BlackArrow USA, 2012, 8 pages.

Sukaviriya et al., "A Second Generation User Interface Design Environment: The Model and the Runtime Architecture," Graphics, Visualization & Usability Center, Georgia Institute of Technology, Sep. 1992, 10 pages.

SunSITE, "Hot Java README and Link to the Software on SunSITE," SunSITE Software Information and Technology Exchange, retrieved from http://www.ibiblio.org/hotjava/, retrieved on May 24, 2006, 1 page.

Symantec, "Using Norton pcANYWHERE for DOS," Symantec Corporation, 1994, 30 pages.

"tcpslice(8):—Linux Man Page," retrieved from <http://www.die.net/doc/linux/man/man8/tcpslice.8.html>, retrieved on Jun. 12, 2006, 3 pages.

Tapley et al., "The Official Gamelan Java Directory," Earth Web, 1996, 6 pages.

"tcpslice—Linux Command—Unix Command," 2006, retrieved from <http://linux.about.com/library/cmd/blcmd18_tcpslice.htm>, retrieved on Jun. 12, 2006, 3 pages.

The Nielsen Company (US), LLC, "Complaint for Patent Infringement," filed with the United States District Court for the Eastern District of Virginia Alexandra Division and transferred to the Norfolk Division on Mar. 15, 2011, 13 pages.

Thielman, "Comcast Pushes VOD Remns into the C3 Window," Adweek, Dec. 2, 2013, retrieved from <http://www.adweek.com/news/television/comcast-pushes-vod-reruns-c3 . . . >, retrieved on Feb. 10, 2014, 1 page.

Thomson Jr., "Creation of the NSFnet," Commercialization of the Internet, 2000, retrieved from <http://johnthomson.org/j561/NSFcreate-4.html>, retrieved on May 24, 2006, 2 pages.

Thomson Jr., "The Beginning of Commercialization of the NSFnet," Commercialization of the Internet, 2000, retrieved from <http://johnthomson.org/j561/NSFcomm-5.html>, retrieved on May 24, 2006, 1 page.

Thomson Jr., "Criticism of the NSF Grows," Commercialization of the Internet, 2000, retrieved from <http://johnthomson.org/j561/NSFcriticism-6.html>, retrieved on May 24, 2006, 1 page.

Thomson Jr., "The NSF Starts to Change Their Policy," Commercialization of the Internet, 2000, retrieved from <http://johnthomson.org/j561/NSFpolicy-7.html>, retrieved on May 24, 2006, 1 page.

Thomson Jr., "Changes in NSF Policy Becomes Law—The Internet is Commercialized," Commercialization of the Internet, 2000, retrieved from <http://johnthomson.org/j561/NSFpolicy-9.html>, retrieved on May 24, 2006, 1 page.

Tcpdump.org, "Tcpdump—dump traffic on a network," retrieved from <http://www.tcpdump.org/tcpdump_man.html>, retrieved on Jun. 12, 2006, 26 pages.

Tolle, "Performance Measurement and Evaluation of Online Information Systems," Proceedings of the 1985 ACM Computer Science Conference-Agenda for Computing Research:The Challenge for Creativity, Mar. 12-14, 1985, 8 pages.

"Tradewinds," Harvard Business School, vol. 2, No. 5, May 1995, 11 pages.

United States Patent and Trademark Office, "Non-Final Office Action," issued in connection with U.S. Appl. No. 14/866,158, dated Sep. 23, 2016, 8 pages.

United States Patent and Trademark Office, "Final Office Action," issued in connection with U.S. Appl. No. 12/100,685, dated Nov. 16, 2009, 69 pages.

United States Patent and Trademark Office, "Non-Final Office Action," issued in connection with U.S. Appl. No. 12/100,685, dated Feb. 12, 2009, 20 pages.

United States Patent and Trademark Office, "Final Office Action," issued in connection with U.S. Appl. No. 09/763,338, dated Jul. 12, 2007, 20 pages.

United States Patent and Trademark Office, "Non-Final Office Action," issued in connection with U.S. Appl. No. 12/100,698, dated Jan. 20, 2010, 18 pages.

United States Patent and Trademark Office, "Non-Final Office Action," issued in connection with U.S. Appl. No. 12/100,698, dated Sep. 25, 2009, 17 pages.

United States Patent and Trademark Office, "Non-Final Office Action," issued in connection with U.S. Appl. No. 12/780,890, dated Oct. 1, 2010, 9 pages.

United States Patent and Trademark Office, "Non-Final Office Action," issued in connection with U.S. Appl. No. 13/098,358, dated Jul. 27, 2011, 10 pages.

United States Patent and Trademark Office, "Non-Final Office Action," issued in connection with U.S. Appl. No. 09/763,338, dated Nov. 21, 2006, 18 pages.

United States Patent and Trademark Office, "Notice of Allowance," issued in connection with U.S. Appl. No. 12/100,698, dated Feb. 25, 2011, 12 pages.

United States Patent and Trademark Office, "Notice of Allowance," issued in connection with U.S. Appl. No. 12/100,698, dated Oct. 20, 2010, 11 pages.

United States Patent and Trademark Office, "Notice of Allowance," issued in connection with U.S. Appl. No. 12/780,890, dated Mar. 22, 2011, 12 pages.

United States Patent and Trademark Office, "Notice of Allowance," issued in connection with U.S. Appl. No. 13/098,358, dated Dec. 13, 2011, 12 pages.

United States Patent and Trademark Office, "Notice of Allowance," issued in connection with U.S. Appl. No. 09/763,338, dated Jan. 2, 2008, 7 pages.

(56) References Cited

OTHER PUBLICATIONS

United States Patent and Trademark Office, "Notice of Allowance," issued in connection with U.S. Appl. No. 14/313,390, dated Jul. 7, 2015, 8 pages.
United States Patent and Trademark Office, "Non-Final Office Action," issued in connection with U.S. Appl. No. 14/313,390, dated Jan. 22, 2015, 9 pages.
United States Patent and Trademark Office, "Requirement for Restriction/Election," issued in connection with U.S. Appl. No. 09/763,338, dated Aug. 1, 2006, 6 pages.
United States Patent and Trademark Office, "Notice of Allowance," issued in connection with U.S. Appl. No. 14/618,658, dated Oct. 26, 2015, 9 pages.
United States Patent and Trademark Office, "Non-Final Office Action," issued in connection with U.S. Appl. No. 15/044,939, dated Apr. 28, 2016, 9 pages.
User Society, "First International Conference on the World-Wide Web," May 1994, retrieved from <http://www.94.web.cem.ch/WWW94/>, retrieved on May 24, 2006, 2 pages.
w3.org, "CGI—Common Gateway Interface," W3C, retrieved from <http://www.w3.org/CGI/>, retrieved on May 24, 2006, 2 pages.
w3.org, "HTTP: A Protocol for Network Information: Basic HTTP as Defined in 1992," W3C, retrieved from <http://www.w3.org/Protocols/HTTP/HTTP2.html>, retrieved on May 24, 2006, 2 pages.
w3.org, "The World Wide Web Servers: W3 Servers," retrieved from <http://www.w3.org/History/19921103-hypertext/hypertext/www/htmltheprojecthtml>, retrieved on May 24, 2006, 2 pages.
w3.org, "The World Wide Web Project," retrieved from <http://www.w3.org/History/19921103-hypertext/hypertext/www/theprojecthtml>, retrieved on May 24, 2006, 1 page.
w3.org, "Demonstrations—/JENC92," retrieved from <http://www.w3.org/Conferences/JENC92/Demonstrations.html>, retrieved on May 24, 2006, 1 page.
w3.org, "An Updated Quick Look at Viola WWW," W3C, retrieved from <http://www.w3.org/History/19921103-hyptertext/Viola/Review.html>, retrieved on May 24, 2006, 2 pages.
w3.org, "HyperText Transfer Protocol Design Issues," W3C, retrieved from <http://www.w3.org/Protocols/DesignIssues.html>, retrieved on May 24, 2006, 3 pages.
w3.org, "WorldWideWeb for C5," Presentation, May 17, 1991, retrieved from <http://www.w3.org/Talks/C5_17_May_91.html>, retrieved on May 24, 2006, 1 page.
w3.org, "Change History for httpd," W3C, retrieved from <http://www.w3.org/Daemon/Features.html>, retrieved on May 24, 2006, 15 pages.
W3C, "A Little History of the Word Wide Web (1945-1995)," retrieved from <http://www.w3.org/History.html>, retrieved on May 24, 2006, 6 pages.
WandSchneider, "ActiveX Controls Framework: Sample Code for Authoring Non-MFC Controls," Microsoft Corporation, Apr. 1996, retrieved from <http://msdn.microsoft.com/archive/en-us/dnaractivex/html/msdn_ctrlfmk.asp?frame=true>, retrieved on Mar. 22, 2007, 15 pages.
Warren, "Audience Tracking System for Electronic Newspapers" Google Groups, May 3, 1995, 3 pages.
Watt, "Management Tools Get with the Web," Network World, vol. 14, No. 25, Jun. 23, 1997, 1 page.
Weber, "New Software Helps Advertisers Get Through Tangled Web Pages," The Wall Street Journal, Oct. 1996, 2 pages.
WebSideStory And AIG, "On Demand Analytics Presentation," Jun. 22, 2005, 10 pages.
Weiler et al., "Usability Lab Tools: One Year Later," CHI'94, Conference Companion, 1994, p. 330, 1 page.
Weston, "Netscape 2.0b2 allows for invasion of privacy," TBTF, Dec. 2, 1995, retrieved from <http://www.tbtf.com/resource/b2-privacy-bug.html>, retrieved on May 24, 2006, 2 pages.
Wilson, "Browser Timelines (Releases Important to HTML and CSS Development = Index DOT Html/Css," retrieved from <http://www.blooberry.com/indexdot/history/browsers6.htm> retrieved on May 24, 2006, 3 pages.

Wilson, "Opera (Opera Software) Index DOT Html/Css," retrieved from <http://www.blooberry.com/indexdot/history/opera.htm> retrieved on May 24, 2006, 3 pages.
Wright, "Matt's Script Archive: Book'emDano:Readme," 1996, 2 pages.
Wu et al., "Virtual Proxy Servers for WWW and Intelligent Agents on the Internet," Proceedings of the the Thirtieth Annual Hawaii International Conference on System Sciences, 1997, 10 pages.
Yahoo!, "Yahoo! Search Directory > Web Programming > Access Counters," retrieved from <http://dir.yahoo.com/Computers_and_Internet/Internet/World_Wide_Web/Programming/Access_Counters/>, retrieved from May 24, 2006, 5 pages.
Zaiane et al., "Discovering Web Access Patterns and Trends by Applying OLAP and Data Mining Technology on Web Logs," Research and Technology Advances in Digital Libraries, Apr. 1998, 12 pages.
Zeigler, "Startup Net Count Seeks to Tally How Many Web Surfers See Ads," The Wall Street Journal, Oct. 1996, 2 pages.
Zillmer, "How to Make Your Web Ads Pay Off," Marketing Magazine, vol. 101, No. 23, Jun. 10, 1996, 4 pages.
United States Patent and Trademark Office, "Non-final Office Action," issued in connection with U.S. Appl. No. 15/359,129, dated Apr. 5, 2017, 223 pages.
United States Patent and Trademark Office, "Non-Final Office Action," issued in connection with U.S. Appl. No. 14/866,158, dated May 19, 2017, 18 pages.
Australian Patent Office, "Patent Examination Report No. 1", issued in connection with Australian patent application No. 2014203758, dated May 12, 2015, 3 pages.
Australian Patent Office, "Notice of Acceptance", issued in connection with Australian patent application No. 2014203758, dated Apr. 29, 2016, 3 pages.
Australian Patent Office, "Certificate of Grant", issued in connection with Australian patent application No. 2014203758, dated Aug. 25, 2016, 3 pages.
Canadian Patent Office, "Office Action", issued in connection with Canadian patent application No. 2,856,246, dated Sep. 28, 2015, 5 pages.
Canadian Patent Office, "Office action", issued in connection with Canadian patent application No. 2,856,246, dated May 5, 2017, 3 pages.
The State Intellectual Property Office of China,"First Notification of Office action", issued in connection with Chinese patent application No. 201410341892.1, dated Aug. 17, 2016, 8 pages.
European Patent Office, "Extended European Search Report", issued in connection with European patent application No. 14002366.4, dated Nov. 27, 2014, 9 pages.
The State Intellectual Property Office of China,"Second Notification of Office action", issued in connection with Chinese patent application No. 201410341892.1, dated Jun. 5, 2017, 8 pages.
United States Patent and Trademark Office, "Notice of Allowance and Fee(s) Due," issued in connection with U.S. Appl. No. 15/359,129, dated Jun. 29, 2017, 21 pages.
Australian Patent Office, "Examination Report No. 1", issued in connection with Australian patent application No. 2016213749, dated Jul. 10, 2017, 2 pages.
United States Patent and Trademark Office, "Non-Final Office action", issued in connection with U.S. Appl. No. 14/313,457, dated Jul. 14, 2017, 13 pages.
Raghunathan et al. "A Unified Imputation Approach for the treatment and Analysis of Missing Data in Marketing Research" Feb. 1999, 43 pages.
Reiter "Simultaneous Use of Multiple Imputation for Missing Data and Disclosure Limitation" Sep. 29, 2011, 20 pages.
United States Patent and Trademark Office, "Final Office Action," issued in connection with U.S. Appl. No. 14/866,158, dated Nov. 30, 2017, 14 pages.
United States Patent and Trademark Office, "Non-Final Office Action," issued in connection with U.S. Appl. No. 15/385,508, dated Dec. 4, 2017, 65 pages.
Lane, Basic Concepts, available at http://www.onlinestatbook.com/2/probabilty/basic.html, retrieved Feb. 28, 2018 (6 pages).

(56) References Cited

OTHER PUBLICATIONS

United States Patent and Trademark Office, "Non-Final Office Action," issued in connection with U.S. Appl. No. 14/866,158, dated Mar. 30, 2018, 37 pages.

United States Patent and Trademark Office, "Final Office Action," issued in connection with U.S. Appl. No. 15/385,508, dated May 30, 2018, 30 pages.

United States Patent and Trademark Office, "Non-Final Office Action, " issued in connection with U.S. Appl. No. 15/385,508, dated Aug. 28, 2018, 70 pages.

Dempster et al., "Maximum Likelihood from Incomplete Data via the EM Algorithm," Journal of the Royal Statistical Society, Series B (Methodological), vol. 39, No. 1. (1977), pp. 1-38, http://links.jstor.org/sici?sici=00359246%281977%2939%3A1%3C1%3AMLFIDV%3E2.0.CO%3B2-Z.

United States Patent and Trademark Office, "Notice of Allowance," issued in connection with U.S. Appl. No. 15/044,939, dated Aug. 29, 2016, 8 pages.

United States Patent and Trademark Office, "Notice of Allowance," issued in connection with U.S. Appl. No. 14/866,158, dated Nov. 8, 2018, 7 pages.

United States Patent and Trademark Office, "Final Office Action," issued in connection with U.S. Appl. No. 15/385,508, dated Jan. 14, 2019, 37 pages.

United States Patent and Trademark Office, "Non-Final Office Action," issued in connection with U.S. Appl. No. 15/385,508, dated Sep. 16, 2019, 16 pages.

United States Patent and Trademark Office, "Notice of Allowance," issued in connection with U.S. Appl. No. 15/385,508, dated Apr. 21, 2020, 11 pages.

United States Patent and Trademark Office, "Notice of Allowance and Fee(s) Due," issued in connection with U.S. Appl. No. 16/261,035, dated Apr. 15, 2020, 53 pages.

United States Patent and Trademark Office, "Non Final Office Action," issued in connection with U.S. Appl. No. 17/021,629, dated Mar. 29, 2022, 26 pages.

United States Patent and Trademark Office, "Non Final Office Action," issued in connection with U.S. Appl. No. 17/021,629, dated Oct. 22, 2021, 26 pages.

United States Patent and Trademark Office, "Notice of allowance and Fee(s) Due," issued in connection with U.S. Appl. No. 16/261,035, dated Apr. 15, 2020, 7 pages.

David M Lane, http://onlinestatbook.com/2/probability/basic.html; captured via the Way Back Machine Jul. 16, 2014, 9 pages.

\* cited by examiner

| Daypart (30-way) – Weekday (EST/PT7) | Daypart (30-way) – Weekend (EST/PT7) | Daypart (5-way) |
|---|---|---|
| M-F 5:00 AM – 6:00 AM | Sa 5:00 AM – 1:00 PM | M-Su 7P-11P |
| M-F 6:00 AM – 7:00 AM | Sa 1:00 PM – 7:00 PM | M-Su 11P-8A |
| M-F 7:00 AM – 9:00 AM | Sa 7:00 PM – 8:00 PM | M-F 8A-3P |
| M-F 9:00 AM – 12:00 PM | Sa 8:00 PM – 10:00 PM | M-F 3P-7P |
| M-F 12:00 PM – 12:30 PM | Sa 10:00 PM – 11:00 PM | Sa,Su 8A-7P |
| M-F 12:30 PM – 2:00 PM | Sa 11:00 PM – 11:30 PM | |
| M-F 2:00 PM – 4:00 PM | Su 11:30 PM – 1:00 AM | |
| M-F 4:00 PM – 5:00 PM | Su 5:00 AM – 1:00 PM | |
| M-F 5:00 PM – 6:00 PM | Su 1:00 PM – 7:00 PM | |
| M-F 6:00 PM – 7:00 PM | Su 7:00 PM – 8:00 PM | |
| M-F 7:00 PM – 8:00 PM | Su 8:00 PM – 10:00 PM | |
| M-F 8:00 PM – 10:00 PM | Su 10:00 PM – 11:00 PM | |
| M-F 10:00 PM – 11:00 PM | Su 11:00 PM – 11:30 PM | |
| M-F 11:00 PM – 11:30 PM | Su 11:30 PM – 1:00 AM | |
| M-F 11:30 PM – 1:00 AM | | |
| M-Su 1:00 AM – 5 AM | | |

FIG. 6B

| Household Size |
|---|
| 2 |
| 3 |
| 4 |
| 5+ |

616

| Number of Adults |
|---|
| ≤2 |
| 3+ |

618

| Number of Kids |
|---|
| 0 |
| 1 |
| 2 |
| 3+ |

620

| Person Type (3-way) |
|---|
| Male Adult |
| Female Adult |
| Kid |

622

| Room Location |
|---|
| Master Bedroom |
| Other Bedroom |
| Living Room/Family Room/Other |

624

| Number of Sets Tuned on Current Date |
|---|
| ≤2 |
| 3+ |

626

| Person Type (Relative) |
|---|
| Oldest/Only Female Adult |
| Not Oldest Female Adult |
| Oldest/Only Male Adult |
| Not Oldest Male Adult |
| Oldest/Only Child |
| Not Oldest Child |

628

| Spanish Dominant | Spanish Language Use |
|---|---|
| Hispanic | All |
| No | Spanish Only |
| | Mostly Spanish |
| Yes | English Only |
| | Mostly English |
| | Spanish/English Equal |

| HH x TV Set | Cell (HH size, #Kids, #Adults, Room, Genre, Daypart, #Sets, Tuning Level) | Person ID | Avg. Probability | MLV Rank |
|---|---|---|---|---|
| Smith HH, Set1 | Cell Combination 1 | 1 | 0.62 | 1 |
| Smith HH, Set1 | Cell Combination 1 | 2 | 0.47 | 2 |
| Smith HH, Set1 | Cell Combination 1 | 3 | 0.09 | 3 |
| Smith HH, Set1 | Cell Combination 2 | 2 | 0.78 | 1 |
| Smith HH, Set1 | Cell Combination 2 | 3 | 0.65 | 2 |
| Smith HH, Set1 | Cell Combination 2 | 1 | 0.22 | 3 |

FIG. 11

METHODS AND APPARATUS TO ASSIGN VIEWERS TO MEDIA METER DATA

RELATED APPLICATION

This patent arises from a continuation of U.S. patent application Ser. No. 16/261,035, which is titled "Methods and Apparatus to Assign Viewers to Media Meter Data," and which was filed on Jan. 29, 2019, which is a continuation of U.S. patent application Ser. No. 14/866,158 (now U.S. Pat. No. 10,219,039), which is titled "Methods and Apparatus to Assign Viewers to Media Meter Data," and which was filed on Sep. 25, 2015, which claims the benefit of U.S. Provisional Patent Application No. 62/130,286, which is titled "Viewer Assignment of Household Viewers Without a People Meter," and which was filed on Mar. 9, 2015. Priority to U.S. patent application Ser. No. 16/261,035, U.S. patent application Ser. No. 14/866,158, and U.S. Provisional Patent Application No. 62/130,286 is claimed. U.S. patent application Ser. No. 16/261,035, U.S. patent application Ser. No. 14/866,158, and U.S. Patent Application No. 62/130,286 are hereby incorporated herein by reference in their respective entireties.

FIELD OF THE DISCLOSURE

This disclosure relates generally to market research, and, more particularly, to methods and apparatus to assign viewers to media meter data.

BACKGROUND

In recent years, panelist research efforts included installing metering hardware in qualified households that fit one or more demographics of interest. In some cases, the metering hardware is capable of determining whether a media presentation device (such as a television set) is powered on and tuned to a particular station via a hardwired connection from the media presentation device to the meter. In other cases, the metering hardware is capable of determining which household member is exposed to a particular portion of media via one or more button presses on a People Meter by the household member near the television.

BRIEF DESCRIPTION OF THE DRAWINGS

FIGS. 6A-6C illustrate example combinations of dimensions.

FIG. 11 is an example most likely viewer table to associate average probability values and rank values for persons of interest.

DETAILED DESCRIPTION

Figure 1:
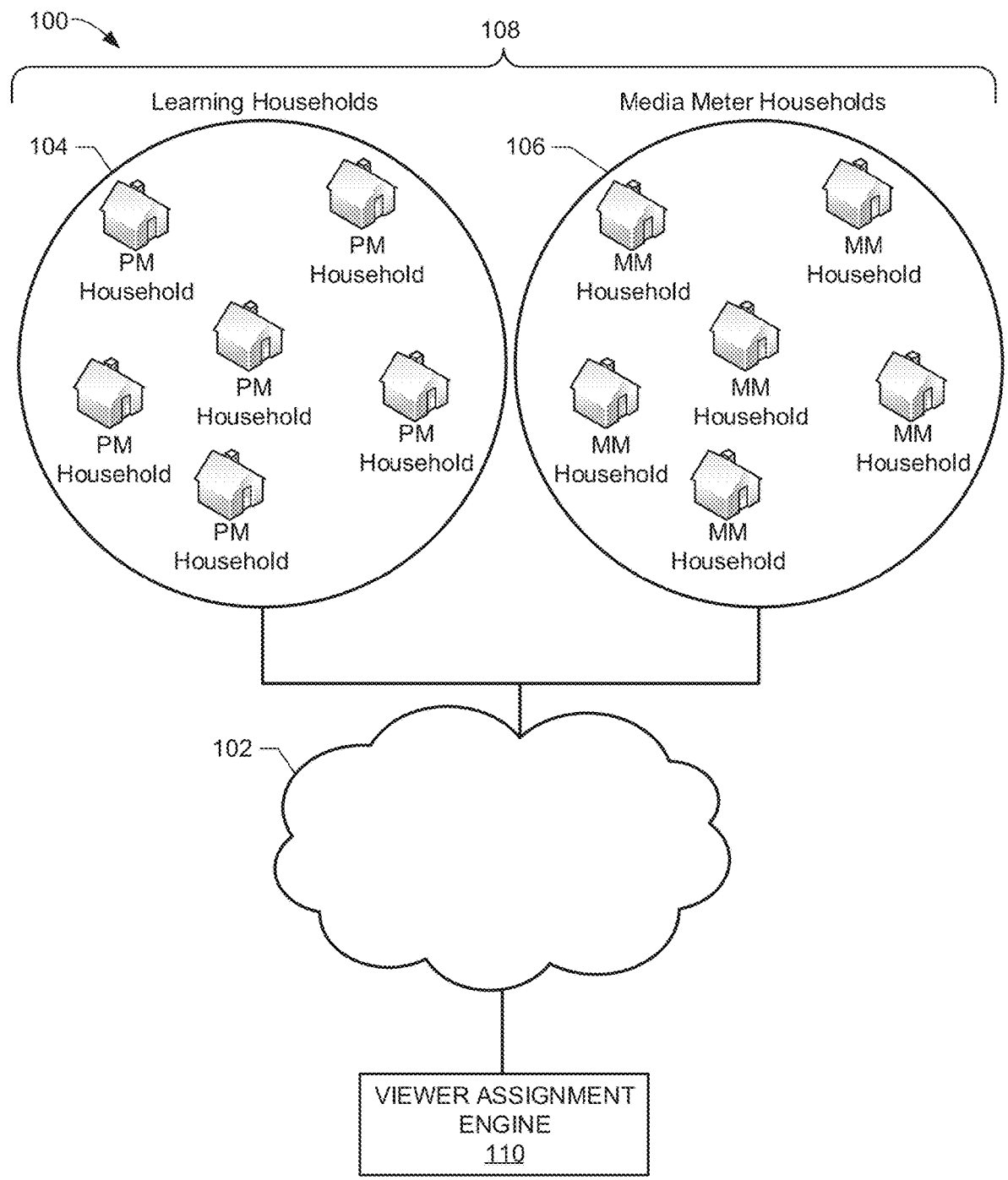
FIG. 1 illustrates an example media distribution environment in which household viewers may be assigned to media meter data.

Market researchers seek to understand the audience composition and size of media, such as radio programming, television programming and/or Internet media so that advertising prices can be established that are commensurate with audience exposure and demographic makeup (referred to herein collectively as "audience configuration"). As used herein, "media" refers to any sort of content and/or advertisement which is presented or capable of being presented by an information presentation device, such as a television, radio, computer, smart phone or tablet. To determine aspects of audience configuration (e.g., which household member is currently watching a particular portion of media and the corresponding demographics of that household member), the market researchers may perform audience measurement by enlisting any number of consumers as panelists. Panelists are audience members (household members) enlisted to be monitored, who divulge and/or otherwise share their media exposure habits and demographic data to facilitate a market research study. An audience measurement entity typically monitors media exposure habits (e.g., viewing, listening, etc.) of the enlisted audience members via audience measurement system(s), such as a metering device and a People Meter. Audience measurement typically involves determining the identity of the media being displayed on a media presentation device, such as a television.

Some audience measurement systems physically connect to the media presentation device, such as the television, to identify which channel is currently tuned by capturing a channel number, audio signatures and/or codes identifying (directly or indirectly) the programming being displayed. Physical connections between the media presentation device and the audience measurement system may be employed via an audio cable coupling the output of the media presentation device to an audio input of the audience measurement system. Additionally, audience measurement systems prompt and/or accept audience member input to reveal which household member is currently exposed to the media presented by the media presentation device.

As described above, audience measurement entities may employ the audience measurement systems to include a device, such as the People Meter (PM), having a set of inputs (e.g., input buttons) that are each assigned to a corresponding member of a household. The PM is an electronic device that is typically disposed in a media exposure (e.g., viewing) area of a monitored household and is proximate to one or more of the audience members. The PM captures information about the household audience by prompting the audience members to indicate that they are present in the media exposure area (e.g., a living room in which a television set is present) by, for example, pressing their assigned input key on the PM. When a member of the household selects their corresponding input, the PM identifies which household member is present, which includes other demographic information associated with the household member, such as a name, a gender, an age, an income category, etc. As such, any time/date information associated with the media presented is deemed "viewing data" or "exposure data" (e.g., "viewing minutes") because it is uniquely associated with one of the household panelist members. As used herein, "viewing data" is distinguished from "tuning data" (e.g., "tuning minutes") in which media is presented within the household without a unique association with one of the household panelist members. In the event a visitor is present in the household, the PM includes at least one input (e.g., an input button) for the visitor to select. When the visitor input button is selected, the PM prompts the visitor to enter an age and a gender (e.g., via keyboard, via an interface on the PM, etc.).

The PM may be accompanied by a base metering device (e.g., a base meter) to measure one or more signals associated with the media presentation device. For example, the base meter may monitor a television set to determine an operational status (e.g., whether the television is powered on or powered off, a media device power sensor), and/or to identify media displayed and/or otherwise emitted by the media device (e.g., identify a program being presented by a television set). The PM and the base meter may be separate devices and/or may be integrated into a single unit. The base meter may capture audience measurement data via a cable as described above and/or wirelessly by monitoring audio and/or video output by the monitored media presentation device. Audience measurement data captured by the base meter may include tuning information, signatures, codes (e.g., embedded into or otherwise broadcast with broadcast media), and/or a number of and/or identification of corresponding household members exposed to the media output by the media presentation device (e.g., the television).

Data collected by the PM and/or the base meter may be stored in a memory and transmitted via one or more networks, such as the Internet, to a data store managed by a market research entity such as The Nielsen Company (US), LLC. Typically, such data is aggregated with data collected from a large number of PMs and/or base meters monitoring a large number of panelist households. Such collected and/or aggregated data may be further processed to determine statistics associated with household behavior in one or more geographic regions of interest. Household behavior statistics may include, but are not limited to, a number of minutes a household media device was tuned to a particular station (tuning minutes), a number of minutes a household media device was used (e.g., viewed) by a uniquely identified household panelist member (viewing minutes) and/or one or more visitors, demographics of an audience (which may be statistically projected based on the panelist data) and instances when the media device is on or off. While examples described herein employ the term "minutes," such as "tuning minutes," "exposure minutes," etc., any other time measurement of interest may be employed without limitation.

To ensure audience measurement systems are properly installed in panelist households, field service personnel have traditionally visited each panelist household, assessed the household media components, physically installed (e.g., connected) the PM and/or base meter to monitor a media presentation device(s) of the household (e.g., a television), and trained the household members how to interact with the PM so that accurate audience information is captured. In the event one or more aspects of the PM and/or base meter installation are inadvertently disrupted (e.g., an audio cable connection from the media device to the base meter is disconnected), then subsequent field service personnel visit(s) may be necessary. In an effort to allow collected household data to be used in a reliable manner (e.g., a manner conforming to accepted statistical sample sizes), a relatively large number of PMs and/or base meters are needed. Each such PM and/or base meter involves one or more installation efforts and installation costs. As such, efforts to increase statistical validity (e.g., by increasing panel size and/or diversity) for a population of interest result in a corresponding increase in money spent to implement panelist households with PMs and/or base meters.

In an effort to increase a sample size of household behavior data and/or reduce a cost associated with configuring panelist households with PMs and/or base meters, example methods, apparatus, systems and/or articles of manufacture disclosed herein employ a media meter (MM) to collect household panelist behavior data. Example MMs disclosed herein are distinguished from traditional PMs and/or base meters that include a physical input to be selected by a panelist household member actively consuming the media. In examples disclosed herein, the MM captures audio with or without a physical connection to the media device. In some examples, the MM without the physical connection to the media device includes one or more microphones to capture ambient audio in a room shared by the media device. In some such examples, the MM captures codes embedded by one or more entities (e.g., final distributor audio codes (FDAC)), and does not include one or more inputs that are to be selected by one or more household panelists to identify which panelist is currently viewing the media device. Rather than collecting audience composition data directly from panelists, example methods, apparatus, systems and/or articles of manufacture disclosed herein impute which household members are viewers of media programming in households with the MM. In other words, examples disclosed herein facilitate a manner of determining which panelist household members are viewing media in a manner that avoids the expense of additional PM device installation in panelist households.

Turning to FIG. 1, an example media distribution environment 100 includes a network 102 (e.g., the Internet) communicatively connected to learning households 104 and media meter (MM) households 106 within a region of interest 108 (e.g., a target research geography). While the illustrated example of FIG. 1 includes a single region of interest 108, examples disclosed herein are not limited thereto, as any number of additional and/or alternate region(s) of interest may be considered. In the illustrated example of FIG. 1, the learning households 104 include People Meters (PMs) to capture media exposure information and identify a corresponding panelist household member(s) consuming the media, and the MM households 106 include media meters to capture media exposure information without identification of which household panelist member(s) is/are responsible for consuming the media. Behavior information collected by the example learning households 104 and the example MM households 106 are sent via the example network 102 to an example viewer assignment engine 110 for analysis. As described above, because MM households 106 do not include PMs, they do not include physical button inputs to be selected by household members (and/or visitors) to identify which household member is currently watching particular media. Additionally, such MM households 106 do not include physical button inputs to be selected by household visitors to identify age and/or gender information. Accordingly, examples disclosed herein reduce errors, reduce data fluctuations, and improve stability of predictions of which household members in the example MM households 106 are deemed to be viewers of (exposed to) media (e.g., viewers of media during a particular daypart).

Example households that include a PM (i.e., the learning households 104) collect panelist audience data. As used herein, "PM panelist audience data," "learning minutes" or "PM panelists" includes both (a) media identification data (e.g., code(s) embedded in or otherwise transmitted with media, signatures, channel tuning data, etc.) and (b) person information identifying the corresponding household member(s) and/or visitor(s) that are currently watching/viewing/listening to and/or otherwise accessing the identified media. On the other hand, MM households 106 include only a MM to collect media data. As used herein, "media data," "MM household minutes" and/or "media identifier information" are used interchangeably and refer to information associated with media identification (e.g., codes, signatures, etc.), but does not include person information identifying which household member(s) and/or visitors are currently watching/viewing/listening to and/or otherwise accessing the identified media. However, both the example learning households 104 and the example MM households 106 include panelists, which are demographically identified members of their respective households. As described above, at least one distinguishing factor between PM panelists and MM panelists is that the former also includes information that identifies which particular household member is responsible for consuming media.

Although examples disclosed herein refer to code readers and collecting codes, techniques disclosed herein could also be applied to systems that collect signatures and/or channel tuning data to identify media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be transmitted with, inserted in, or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In still other examples, techniques disclosed herein could also be applied to systems that collect and/or otherwise acquire online data. Online data may include, but is not limited to online tags having a string of letters and/or numbers that are associated with media content so that the media content can be identified. In some examples, the tag includes attribute data and/or identifying information that has been extracted from the media content. Example tag(s) can be associated with media content prior to distribution (e.g., before Internet media content is streamed to presentation locations (e.g., households)). For example, the tag(s) may be associated with the media content in a webpage distributing the media content, inserted in metadata of the media content (e.g., in a file containing the media content or a file associated with the file containing the media content), inserted in metadata of a stream, etc. The example tag(s) can later be extracted at presentation location(s) and analyzed to identify the media content and increment records for exposure to the media content.

Figure 2:
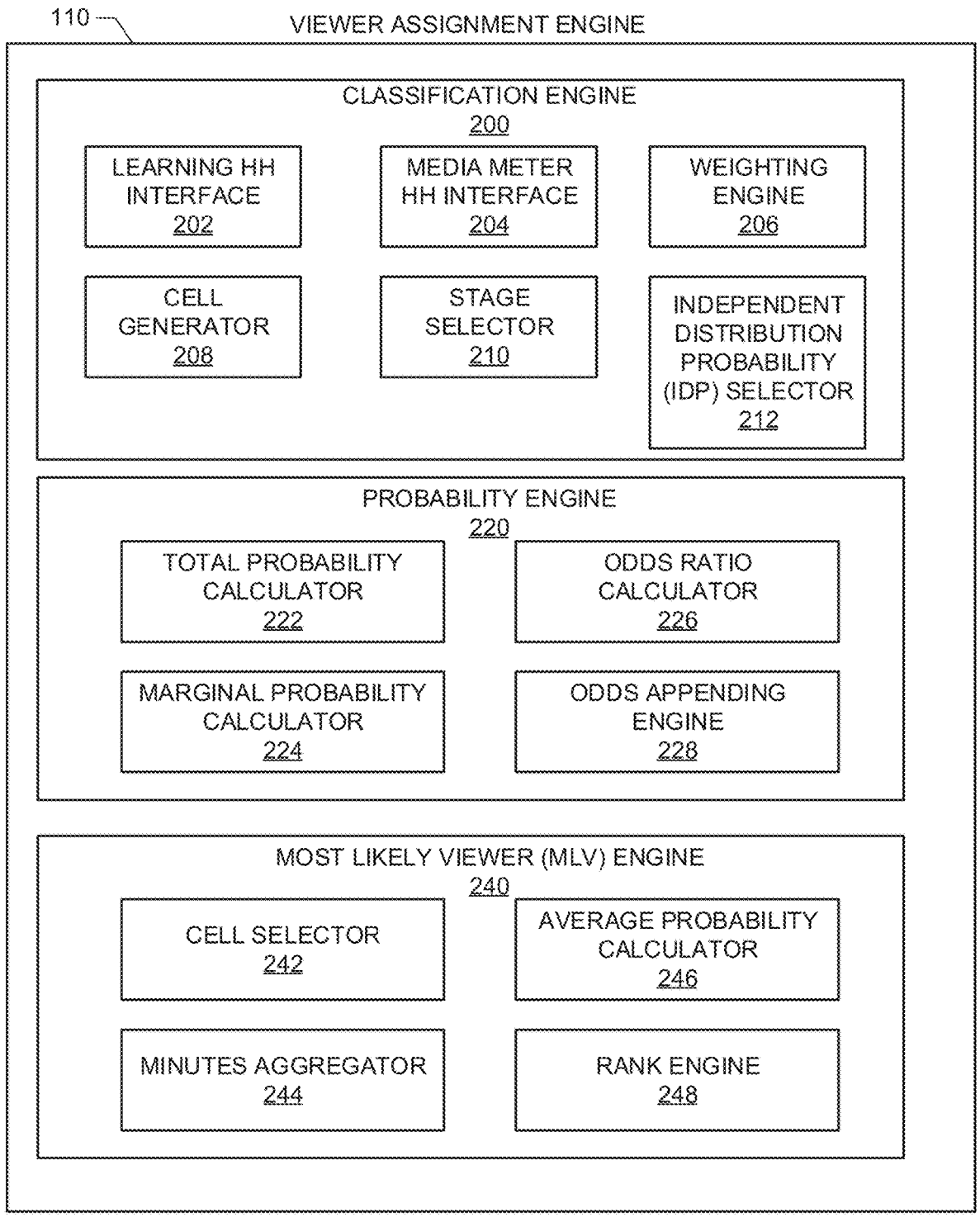
FIG. 2 is a schematic illustration of an example viewer assignment engine constructed in accordance with the teachings of this disclosure.

FIG. 2 is a schematic illustration of an example implementation of the viewer assignment engine 110 of FIG. 1. In the illustrated example of FIG. 2, the viewer assignment engine 110 includes a classification engine 200, a probability engine 220, and a most likely viewer (MLV) engine 240. The example classification engine 200 of FIG. 2 includes an example learning household interface 202, an example MM interface 204, an example weighting engine 206, an example cell generator 208, an example stage selector 210, and an example independent distribution probability (IDP) selector 212. The example probability engine 220 of FIG. 2 includes an example total probability calculator 222, an example marginal probability calculator 224, an example odds ratio calculator 226, and an odds appending engine 228. The example MLV engine 240 of FIG. 2 includes an example cell selector 242, an example minutes aggregator 244, an example average probability calculator 246, and an example rank engine 248.

In operation, the example viewer assignment engine 110 identifies corresponding household members within the example MM households 106 that are most likely viewers of media via three phases. In a first phase, the example classification engine 200 classifies data from the example learning households 104 and the example MM households 106 into model dimensions. In a second phase, the example probability engine 220 identifies viewing probabilities for the example learning households 104 with the aid of IDP dimensions. In a third phase, the example MLV engine 240 uses those viewing probabilities to identify which example MM households 106 best match with corresponding example learning households 104, and imputes the viewing behaviors of the matched example learning household(s) 104 to the corresponding members of the example MM household(s) 106.

First Phase—Classifying Data

In the example first phase, the example learning household interface 202 acquires panelist (e.g., PM panelists) exposure minutes associated with learning households 104 within a geography of interest (e.g., a designated market area (DMA)), such as the example region of interest 108 of FIG. 1. In some examples, data collected from households is associated with a particular geographic area of focus, such as nationwide (sometimes referred to as a "National People Meter" (NPM)), while in other examples, household data is associated with a subset of a particular geographic area of focus, such as a localized geography of interest (e.g., a city within a nation (e.g., Chicago), and sometimes referred to as "Local People Meter" (LPM)).

As used herein, "exposure minutes" (also known as "viewing minutes") refer to media data captured by a meter (e.g., a People Meter, a base meter with panelist input identification capabilities, etc.) within learning households 104, in which the identified media is uniquely associated with a particular panelist member of the household (e.g., via a People Meter button press). As used herein, "tuning minutes" distinguishes from exposure minutes and/or viewing minutes in that the former refers to media data captured by a meter within MM households 106, in which the identified media is not associated with a particular household member. The example MM interface 204 acquires panelist tuning minutes associated with MM households 106 within the geography of interest.

When collecting behavior data from households, different degrees of accuracy result based on the age of the collected data. On a relative scale, when dealing with, for example, television exposure, an exposure index may be computed. The example exposure index provides an indication of how well PM data imputes exposure minutes, and may be calculated in a manner consistent with Equation (1).

$$\text{Exposure Index} = \frac{No. \text{ of imputed } PM \text{ exposure minutes}}{No. \text{ of actual exposure minutes}} \quad \text{Equation (1)}$$

In the illustrated example of Equation (1), the exposure index is calculated as the ratio of the number of imputed PM exposure minutes (e.g., "viewing minutes") and the number of actual PM exposure minutes. While the example described above refers to minutes obtained from learning households 104, similar expectations of accuracy occur with data (minutes) obtained from MM households 106.

Figure 3:
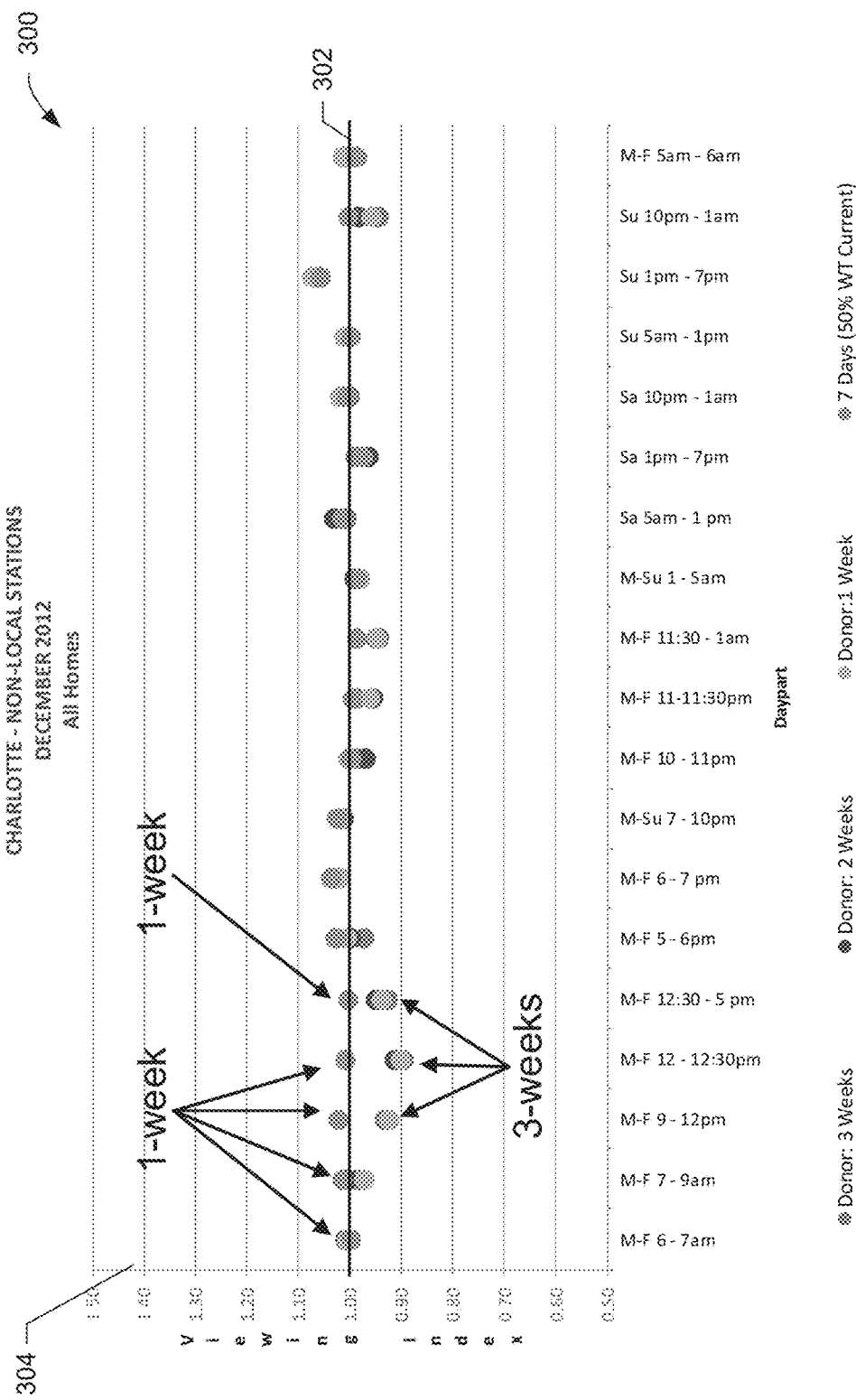
FIG. 3 is a plot illustrating an example viewing index effect based on an age of collected data.

The example exposure index of Equation (1) may be calculated on a manual, automatic, periodic, aperiodic and/or scheduled basis to empirically validate the success and/or accuracy of viewing behavior imputation efforts disclosed herein. Index values closer to one (1) are indicative of a greater degree of accuracy when compared to index values that deviate from one (1). Depending on the type of category associated with the collected exposure minutes, corresponding exposure index values may be affected to a greater or lesser degree based on the age of the collected data. FIG. 3 is an example plot 300 of exposure index values by daypart. In the illustrated example of FIG. 3, the plot 300 includes an x-axis of daypart values 302 and a y-axis of corresponding exposure index values 304. Index value data points labeled "1-week" appear to generally reside closer to index values of 1.00, while index value data points labeled "3-weeks" appear to generally reside further away from index values of 1.00. In other words, panelist audience data that has been collected more recently results in index values closer to 1.00 and, thus, reflects an accuracy better than panelist audience data that has been collected from longer than 1-week ago.

As described above, collected data that is more recent exhibits an accuracy that is better than an accuracy that can be achieved with relatively older collected data. Nonetheless, some data that is relatively older will still be useful, but such older data is weighted less than data that is more recent to reflect its lower accuracy. The example weighting engine 206 applies a temporal weight, and applies corresponding weight values by a number of days since the date of collection. Relatively greater weight values are applied to data that is relatively more recently collected. In some examples, weight values applied to collected tuning minutes and collected exposure minutes are based on a proportion of a timestamp associated therewith. For instance, a proportionally lower weight may be applied to a portion of collected minutes (e.g., tuning minutes, exposure minutes) when an associated timestamp is relatively older than a more recently collection portion of minutes.

Figure 4:
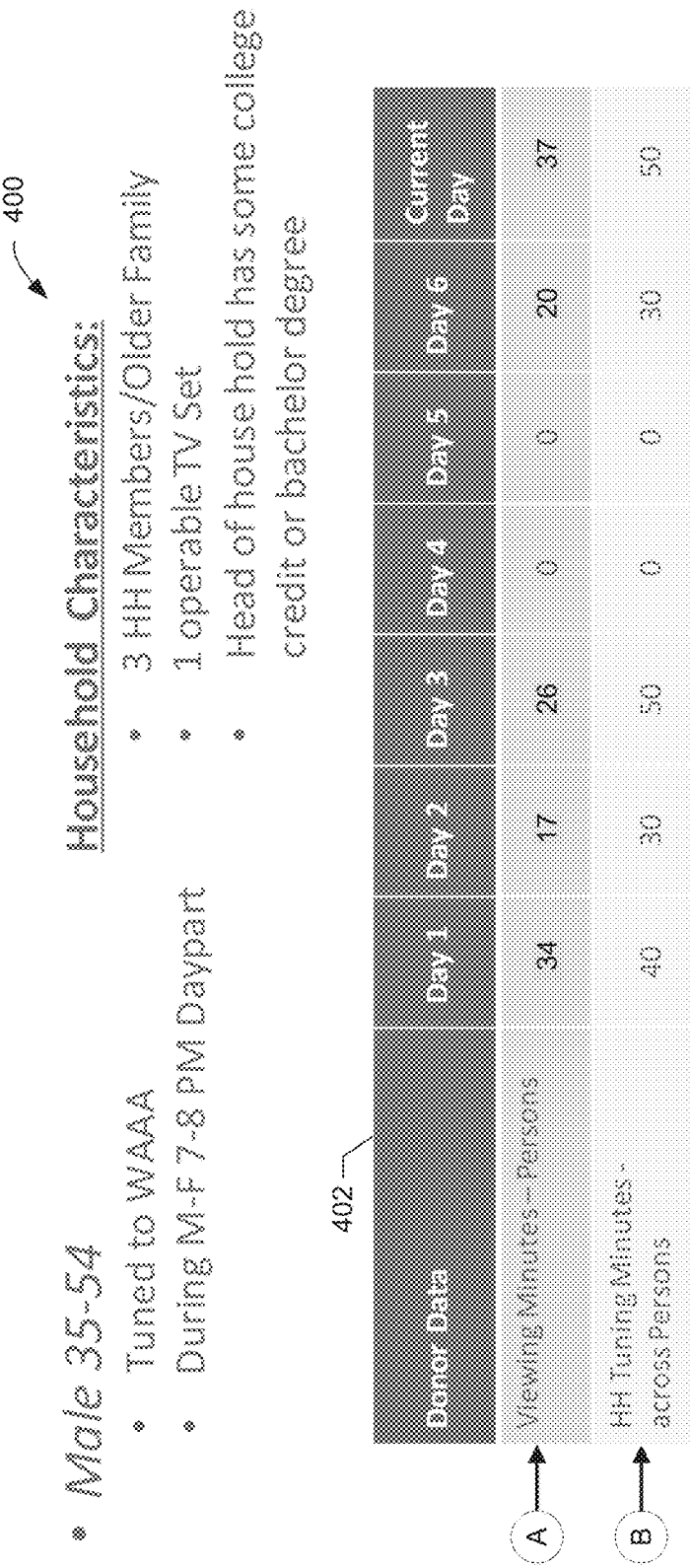
FIG. 4 is an example weighting allocation table to apply a temporal weight to collected minutes.

FIG. 4 illustrates an example weighting allocation table 400 generated and/or otherwise configured by the example weighting engine 206. In the illustrated example of FIG. 4, exposure minutes were acquired from a learning household 104 (i.e., individualized panelist audience data) via a PM device (row "A"), and household tuning minutes (i.e., minutes tuned in a household without individualizing to a specific person within that household) were acquired from a MM household 106 via a MM device (row "B"). The example individualized panelist audience and household tuning minutes are collected over a seven (7) day period. In that way, the most recent day (current day 402) is associated with a weight greater than any individualized panelist audience and/or household tuning minutes from prior day(s). The example individualized panelist minutes of row "A" may be further segmented in view of a desired category combination for a given household. Categories that characterize a household may include a particular age/gender, size of household, viewed station, daypart, number of televisions, life stage, education level and/or other demographic attribute(s). For purposes of illustration, examples described below include the household age/gender category for the household being male, age 35-54, the tuned station is associated with "WAAA" during the daypart associated with Monday through Friday between 7:00 PM and 8:00 PM.

In the illustrated example of FIG. 4, the weighting engine 206 applies a weight value of 0.0017 to the first six (6) days of individualized panelist minutes and household tuning minutes, and applies a weight value of 0.99 to the most current day. While a value of 0.99 is disclosed above, like the other values used herein, such value is used for example purposes and is not a limitation. In operation, the example weighting engine 206 of FIG. 2 may employ any weighting value in which the most current day value is relatively greater than values for one or more days older than the current day. In connection with example data shown in the illustrated example of FIG. 4 (e.g., days one through six having 34, 17, 26, 0, 0 and 20 exposure minutes, respectively, the current day having 37 exposure minutes, days one through six having 40, 30, 50, 0, 0 and 30 household tuning minutes and the current day having 50 household tuning minutes), a weighted exposure minutes value yields 36.79 and a weighted household tuning minutes value yields 49.75. In some examples, the probability engine 220 calculates an imputation probability that a MM panelist (e.g., a panelist household with only a MM device and no associated PM device) with the aforementioned category combination of interest (e.g., male, age 35-54 tuned to channel WAAA during Monday through Friday between the daypart of 7:00 PM and 8:00 PM) is actually viewing this tuning session. The probability is calculated by the example probability engine 220 by dividing the weighted exposure minutes (e.g., 36.79 minutes) by the weighted household tuning minutes (e.g., 49.75 minutes) to yield a 74% chance that the MM panelist with this same household category combination is associated with this tuning behavior. While examples disclosed herein refer to probability calculations, in some examples odds may be calculated to bound results between values of zero and one. For example, odds may be calculated as a ratio of a probability value divided by (1−Probability). If desired, the odds may be converted back to a probability representation.

Categories (sometimes referred to herein as "dimensions") within the example learning households 104 and the example MM households 106 may be different. A market researcher may have a particular dimension combination of interest when attempting to determine which household members of an example MM household 106 were actually consuming media (e.g., a household having males, age 35-54, etc.). When attempting to match one or more MM households 106 with one or more learning households 104, examples disclosed herein identify candidate households that have an appropriate (similar) match of dimensions. Sets of dimensions are categorized by the example cell generator 208, in which different sets represent requirements for particular ones of the learning households 104 and particular ones of the MM households 106, as described in further detail below.

Figure 5:
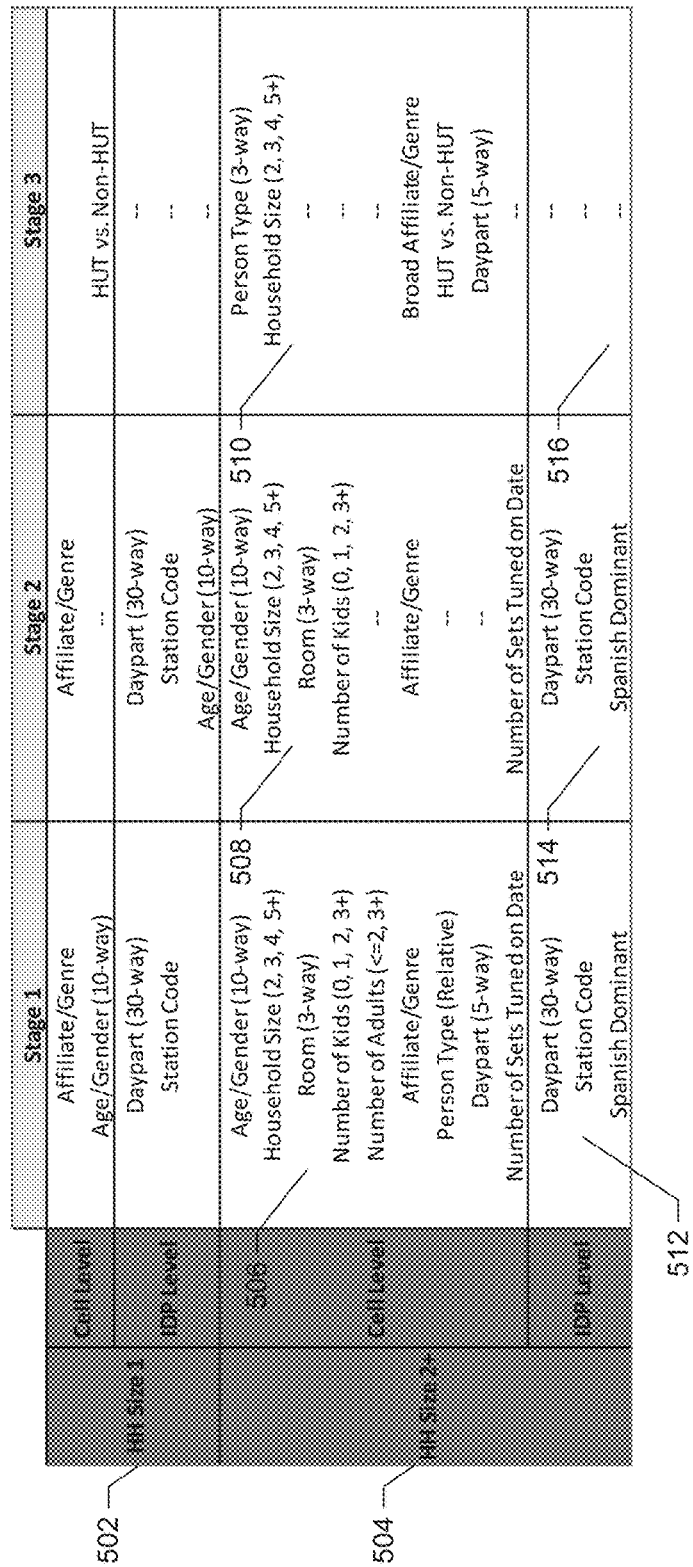
FIG. 5 is an example dimension table to illustrate cell dimensions and independent probability dimensions.

FIG. 5 illustrates an example dimension table 500 that identifies combinations of dimensions required for households (both learning households 104 and MM households 106) when computing probabilities. Different cell combinations may be required based on a household size of one 502, or a household size of two or more 504. Additionally, the example dimension table 500 describes dimension combinations at a cell level, which reflect a requirement that a particular household includes a combination of all listed dimensions within the cell. When an occurrence of all listed dimensions of a cell are present within a household, those dimensions are deemed to be "intersecting." For instance, if a candidate learning household includes each of the example dimensions in a first stage (Stage 1) 506, then that particular household is to be matched only with other learning households and MM households that also represent (intersect) all of those dimensions. In the illustrated example of FIG. 5, the first stage cell for a household of size 2+ includes the dimensions of age/gender, household size 2+, a room location type, a number of kids value, a number of adults 2+, an affiliate/genre type, a person type, a daypart and a number of sets (televisions).

Generally speaking, a number of households in a research geography of interest matching a single one of the dimensions of interest may be relatively high. However, as additional dimensional requirements are added for the study, the number of qualifying households having an inclusive match for all such dimensions decreases. In some circumstances, the number of matching households in a donor pool after performing a logical "AND" of all dimensions of interest eventually results in that donor pool having a population lower than a threshold value, which may not exhibit statistical confidence when applying probability techniques to determine which household members are actually viewing within the MM homes. In the event a particular cell does not contain enough households to satisfy the dimension requirements of the Stage 1 cell 506, a Stage 2 cell 508 is considered, which includes a relatively lower number of required dimensions to intersect. Additionally, the example dimension table 500 includes a Stage 3 cell 510 in the event a particular cell does not include the complete number of dimensional requirements of the Stage 2 cell 508. While the illustrated example of FIG. 5 includes three example stages, examples disclosed herein are not limited thereto.

As described above, dimensions within a cell reflect a logical "AND" condition of representation (e.g., they are intersecting dimensions). However, examples disclosed herein also consider dimensions independently in an effort to reduce imputation errors, reduce data fluctuations and improve data stability. Independent distribution probability (IDP) dimensions are associated with each example stage. Generally speaking, IDP dimensions enable an improvement on the statistical reliability when imputing potential viewing (tuning) in the MM households as actual viewing (exposure). The example IDP dimensions improve data granularity and predictive confidence of the imputation, and allows other dimensions deemed relevant to an analyst to be considered that might not otherwise be permitted (e.g., due to sample size restrictions). In some examples, one or more IDP dimensions are empirically determined to be valuable to different demographic characteristics of the household under consideration for imputation. In the illustrated example of FIG. 5, the dimension table 500 includes a Stage 1 IDP level 512, a Stage 2 IDP level 514 and a Stage 3 IDP level 516. In the illustrated example of FIG. 5, the IDP dimensions include a daypart dimension, a station code dimension, and a Spanish dominant dimension. Examples disclosed herein are not limited thereto and may include additional and/or alternate dimensions of interest such as an Asian dimension, an African American dimension, and/or a Black dimension. As described in further detail below, example IDP dimensions are used to generate probabilities from household tuning minutes and household exposure minutes independently from the cell dimensions. Stated differently, while the illustrated example of FIG. 5 includes three separate IDP dimensions of Stage 1 (512), those three IDP dimensions do not require a logical "AND" condition between during the analysis. Instead, each one may be evaluated independently of the others in view of the qualifying households associated with the Stage 1 cell dimensions 512.

Figure 6A:
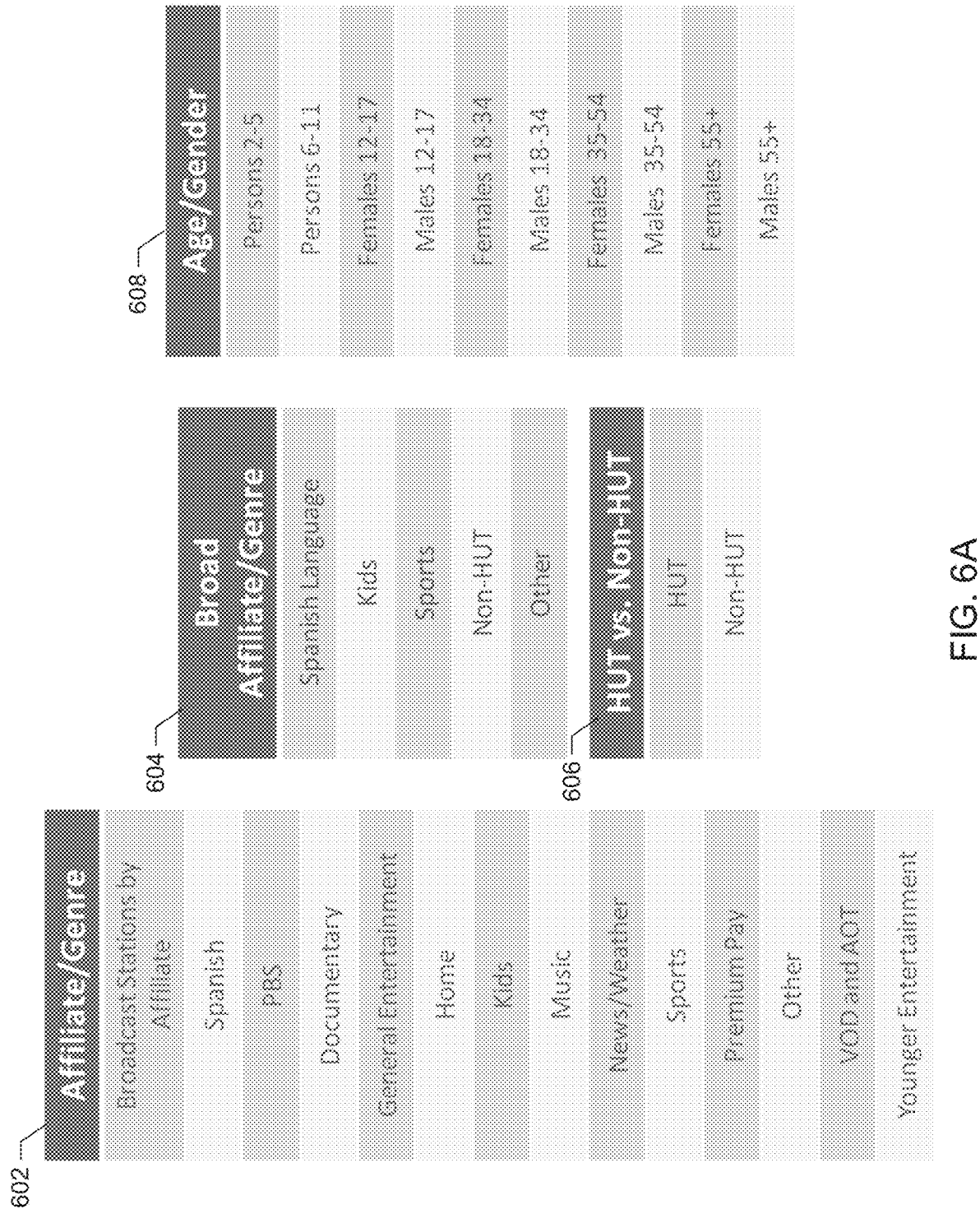

While the illustrated example of FIG. 5 lists example dimensions for cells and IDP levels, such examples are shown for purposes of explanation. Different combinations of dimensions are shown in the illustrated example of FIG. 6A for an example Affiliate/Genre dimension 602, an example Broad Affiliate/Genre dimension 604, an example household under test (HUT) dimension 606, and an example Age/Gender dimension 608. The illustrated example of FIG. 6B includes an example Daypart (30-way) Weekday dimension 610, an example Daypart (30-way) Weekend dimension 612, and an example Daypart (5-way) dimension 614. The illustrated example of FIG. 6C includes an example Household Size dimension 616, an example Number of Adults dimension 618, an example Number of Kids dimension 620, an example Person Type (3-way) dimension 622, an example Room Location dimension 624, an example Number of Sets dimension 626, an example Person Type (Relative) dimension 628 and an example Spanish Dominant dimension 630.

For a market study of interest, the market researcher may identify a target set of dimensions of interest with which to determine viewing behavior in MM households 106. For example, the market researcher may seek to learn about households in a Pacific territory with a membership size of three having (a) one male age 35-54, (b) one female age 35-54 and (c) one child age 2-11. In view of these desired dimensions of interest, examples disclosed herein identify matches of learning households 104 and MM households 106 (and their corresponding behavior data). As described above, the first phase classifies household data into model dimensions. While examples below refer to classifying learning households 104, such examples may also consider classification from the example MM households 106.

The example cell generator 208 retrieves the target set of dimensions of interest for the study, and the example stage selector 210 selects an initial candidate stage of intersecting dimensions, such as the example Stage 1 cell dimensions 506. The example stage selector 210 determines a number of households within the geography of interest that meet the dimensional requirements of the Stage 1 cell dimensions 506. For the sake of example, assume that sixty (60) households have at least three (3) household members, two (2) adults, one (1) child, are watching a news genre, a set in the living room, and during a daypart of Monday through Sunday between 7:00 to 11:00 PM. In view of each of the persons of interest (e.g., demographic dimensions of interest for the study), such as (a) the example male age 35-54, (b) the example female age 35-54, and (c) the example child age 2-11, the example stage selector 210 identifies, out of the total number of sixty (60) households, how many households containing each person are included. The example stage selector 210 compares the number of households with each person of interest to a threshold value to determine whether Stage 1 is appropriate. If so, then the person of interest is designated as associated with Stage 1 dimensions for the remainder of the market study, in which only data from Stage 1 qualifying households will be used for probability calculations.

Figure 7:
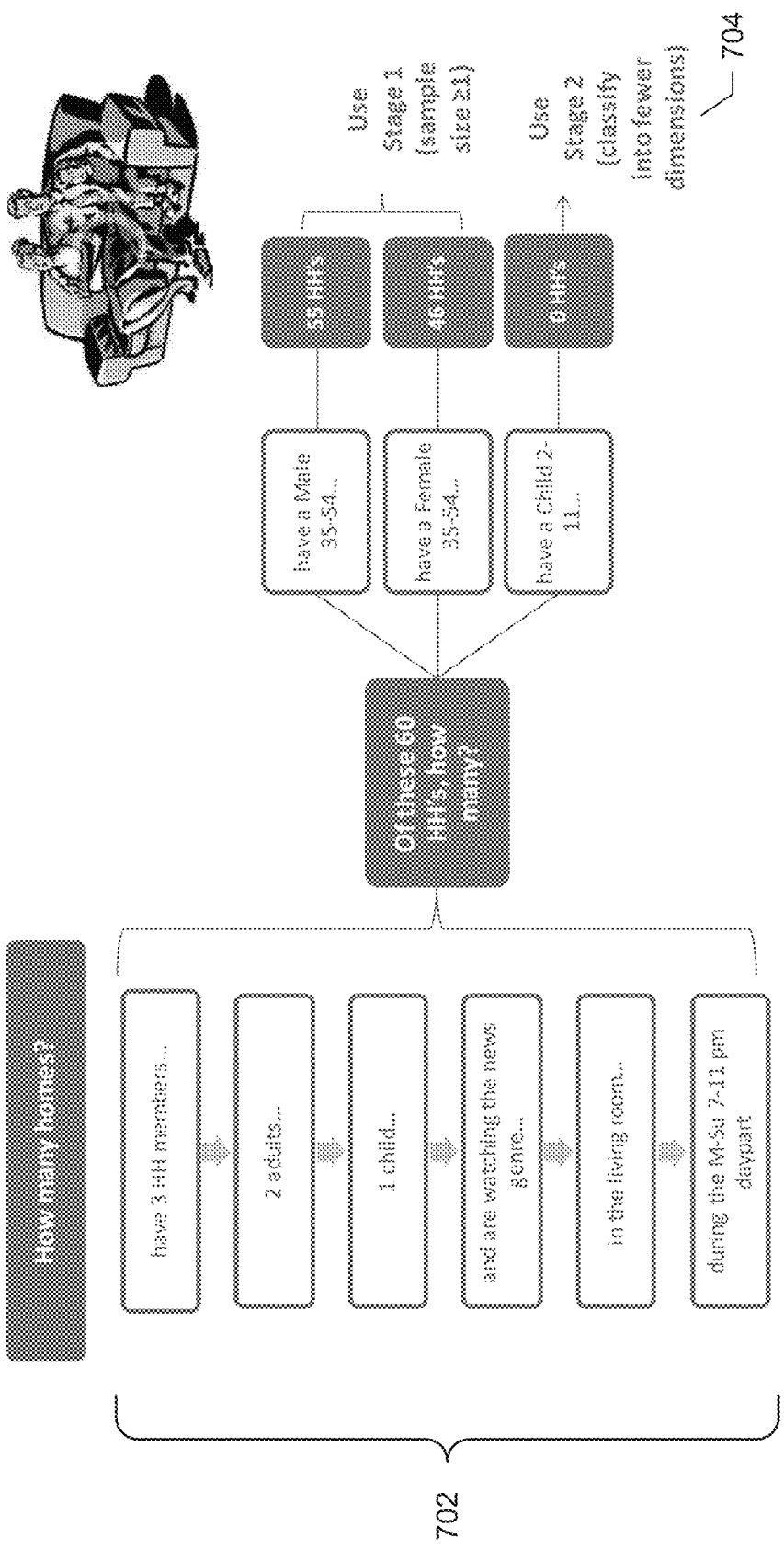
FIGS. 7-10 illustrate example evaluations of persons of interest in a market study.

However, in the event one or more households do not satisfy the threshold, then the example stage selector 210 evaluates a subsequent stage (e.g., Stage 2 (508)) to determine whether a threshold number of qualifying households is available. As described above, subsequent cell stages include a relatively lower number of intersecting dimensions, thereby increasing the possibility that a greater number of available households will qualify (e.g., contain all of the dimensions). FIG. 7 illustrates an example evaluation of each of the persons of interest. In the illustrated example of FIG. 7, the example stage selector 210 determines a number of homes that include all of the cell dimensions from Stage 1 (see reference 702). Therefore, the Stage 1 threshold is satisfied for both the adult male and the adult female in the example household. Because the example child age 2-11 is not represented in the potential households from cell Stage 1, the example stage selector 210 evaluates the child age 2-11 in view of a subsequent stage (i.e., Stage 2) (see reference 704).

Figure 8:
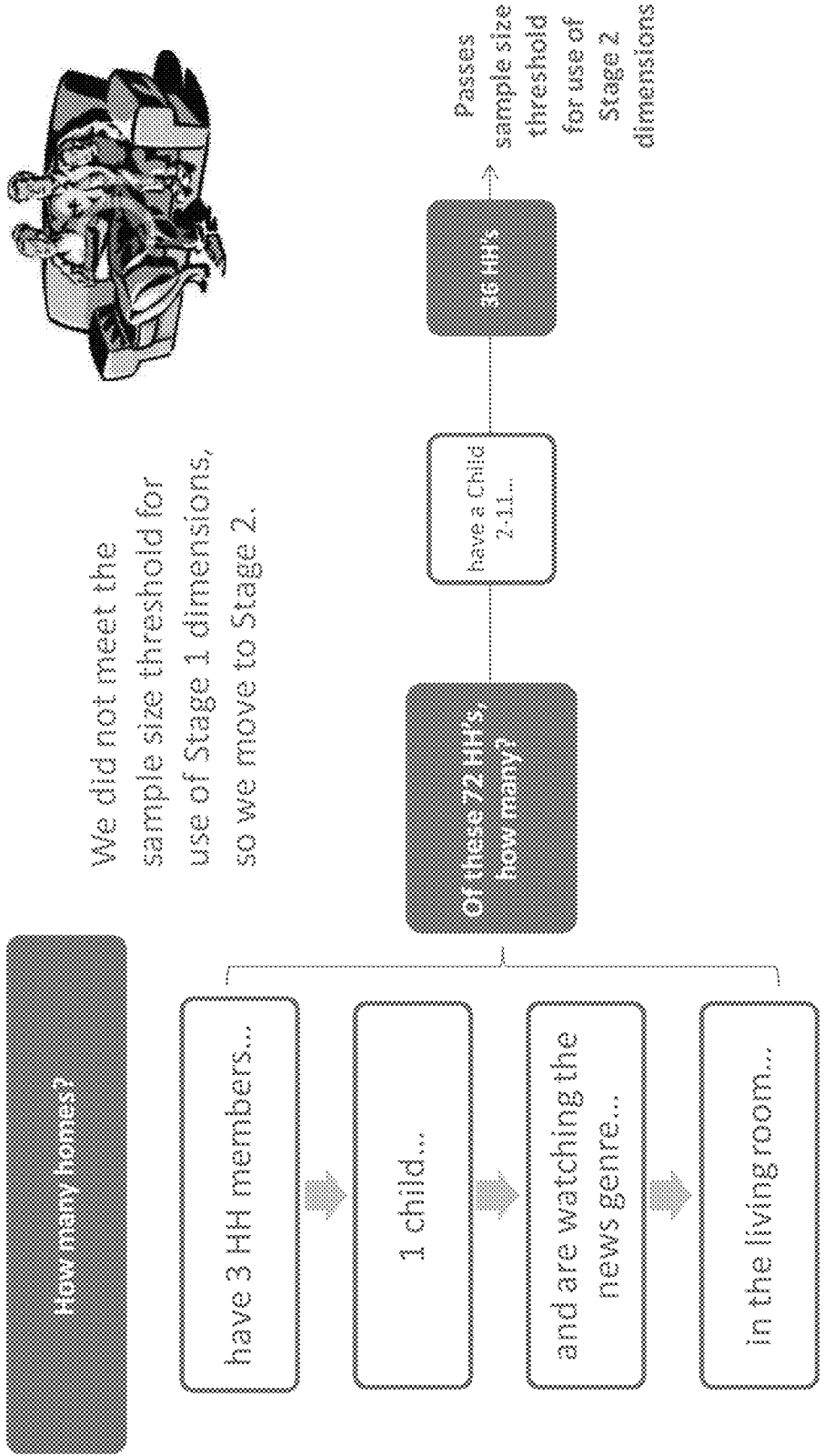

FIG. 8 illustrates an example evaluation of cell Stage 2 for the child age 2-11, in which Stage 2 utilizes less restrictive dimensional requirements than Stage 1. In the illustrated example of FIG. 8, the example stage selector 210 determines how many homes match the dimensional requirements of cell Stage 2 including a child age 2-11 (see 508 of FIG. 5). Because thirty-six (36) households include a child age 2-11, and because that value satisfies a sample size threshold value, the example stage selector 210 classifies the corresponding person of interest (i.e., child age 2-11) to use only those households that satisfy Stage 2 dimensional requirements. As described above, these examples classify both learning data households 104 and MM data households 106, though each sample is considered separately for purposes of determining if the number of homes passes the threshold for use of stage 1, 2 or 3.

Figure 9:
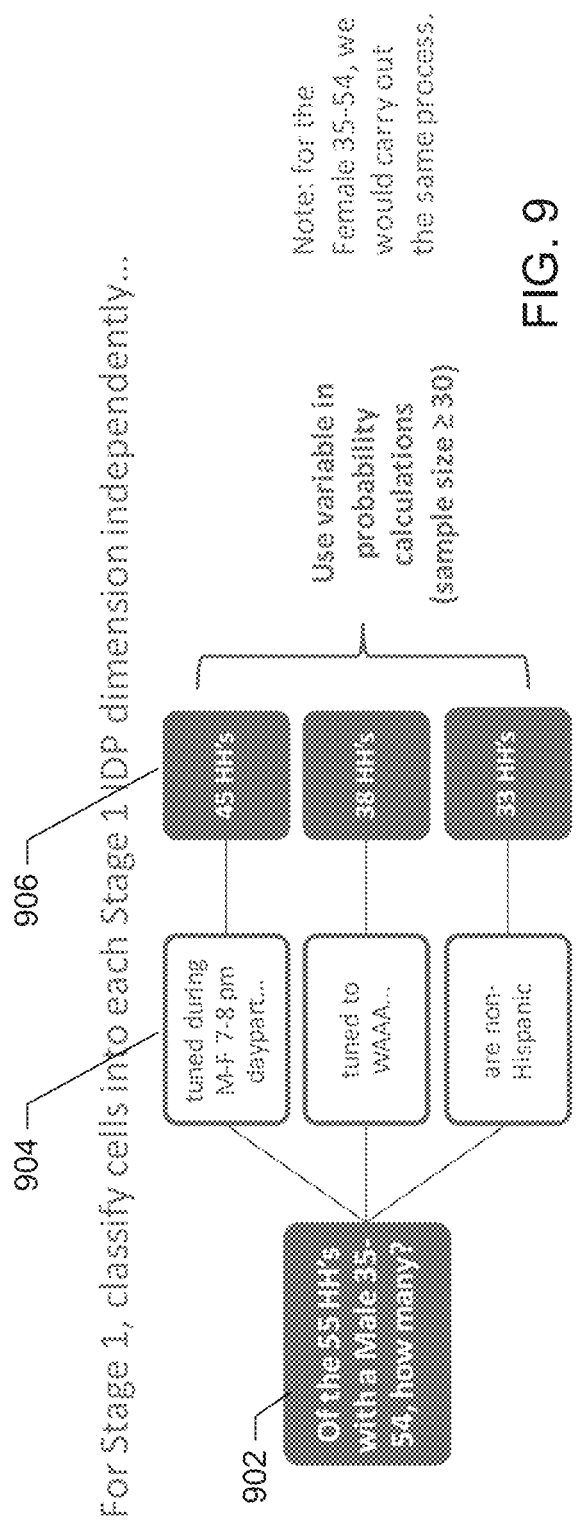

While the above examples classify in view of the cell dimensions, which require a logical "AND" condition to qualify, examples disclosed herein also classify IDP dimensions, which are evaluated independently within each cell. FIG. 9 illustrates an example evaluation of IDP dimensions associated with Stage 1, in which a first one of the persons of interest is considered (i.e., the male age 35-54) (902). Because the male age 35-54 was previously classified as belonging to Stage 1, corresponding IDP dimensions also associated with Stage 1 are evaluated to determine whether a threshold number of households are representative. In the illustrated example of FIG. 9, three example IDP dimensions are shown 904. Each of these example IDP dimensions of interest includes a representative number of qualifying households 906. For the sake of example, assume that a threshold value of thirty (30) households must be represented to allow the corresponding IDP dimension to be used when calculating probabilities. As such, all three of the example IDP dimensions associated with the male age 35-54 qualify, and will be used. While the illustrated example of FIG. 9 does not show an evaluation of the female age 35-54, the same process is used.

Figure 10:
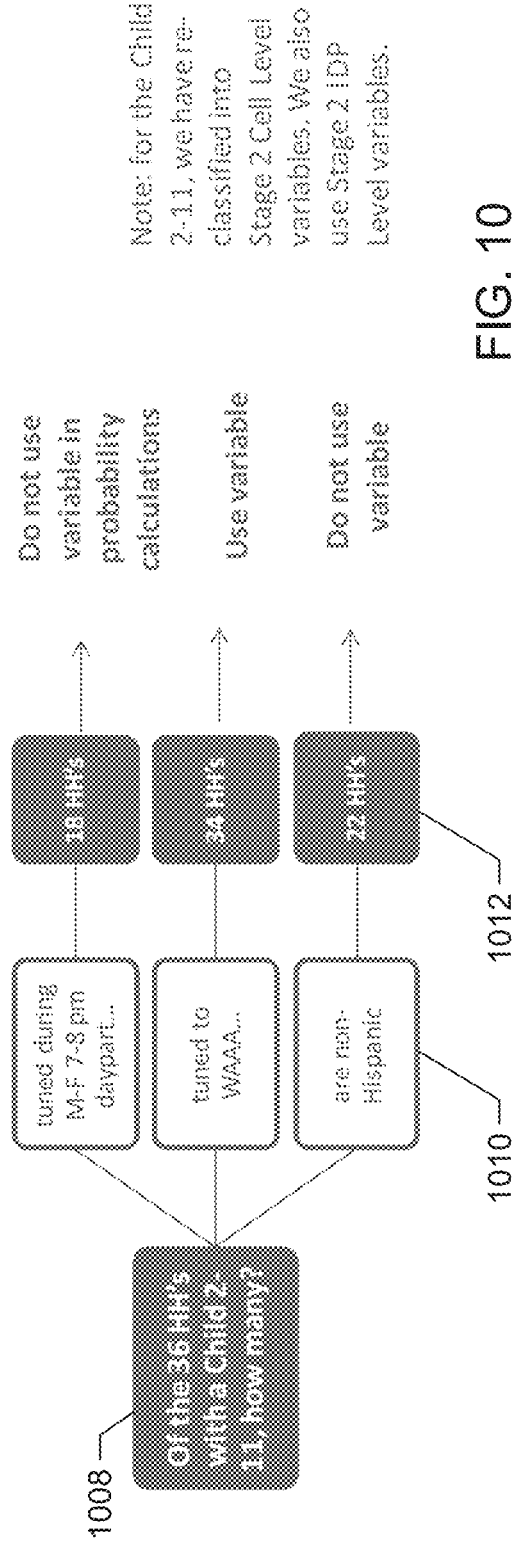

In the illustrated example of FIG. 10, the child age 2-11 is evaluated in view of IDP dimensions corresponding to Stage 2 based on the fact that the child age 2-11 was previously classified using Stage 2 dimensions. From the previously identified quantity of households from Stage 2 having a child age 2-11 (1008), the example IDP selector 212 determines whether each example IDP dimension 1010 includes a representative number of qualifying households 1012. Again, for the sake of example, assume that a threshold value of thirty (30) households must be represented to allow the corresponding IDP dimension to be used when calculating probabilities for the child age 2-11. In this case, the IDP dimension "tuned during M-F 7-8 pm daypart" only included eighteen (18) qualifying households and the IDP dimension "are non-Hispanic" only included twenty-two (22) qualifying households. As such, neither of these two IDP dimensions qualify and will not be used when calculating probabilities, as discussed in further detail below. However, the IDP dimension "tuned to WAAA" included thirty-four (34) qualifying households, which satisfies the example threshold of thirty (30). As such, this IDP dimension will be retained and/or otherwise used when calculating probabilities.

Second Phase—Calculating Probabilities

Now that potential viewers are categorized into respective cell dimensions (intersecting dimensions) and IDP dimensions based on sample size thresholds of qualifying households (both learning households 104 and MM households 106), the example first phase of classifying households is complete. As used herein the term potential viewing refers to household tuning behaviors that have not been confirmed to be associated with a specific household member. For instance, a MM household may log and/or otherwise collect tuning behavior for a particular quarter hour (QH), in which any one of the household members therein could potentially be responsible for consuming and/or otherwise viewing the media during that particular QH. In some examples, the MM households are referred to herein as "tuning households" to reflect that the data collected therein includes, for example, an amount of time (e.g., minutes) of media detected in the household, but without a corresponding uniquely identified member within that household. In such circumstances, panelist members within the tuning household(s) may be referred to as "tuning panelists." Unless and until actual tuning behavior can be confirmed and/or otherwise attributed to a specific person or persons within the home, the household members during that particular QH are deemed potential viewers as distinguished from actual viewers.

Next, and as described above, the example probability engine 220 identifies viewing probabilities for the example learning households 104 with the aid of respective IDP dimensions associated with the qualification criteria. In some examples, the learning households are referred to herein as "viewing households" to reflect that the data collected therein includes, for example, an amount of time (e.g., minutes) of media detected in that household, which includes unique identification of which household member is exposed to and/or otherwise consuming that media. In such circumstances, panelist members within the viewing households may be referred to as "viewing panelists." In operation, the example classification engine 200 selects a demographic of interest (person of interest) associated with one of the previously classified stages (e.g., Stage 1, Stage 2, etc.). For example, in the event males age 35-54 is selected as the demographic of interest, then the example learning household interface 202 retrieves and/or otherwise receives corresponding exposure minutes (viewing minutes) from all households that match the classified cell dimensions (e.g., within Stage 1 dimensions). Additionally, the example learning household interface 202 retrieves and/or otherwise receives corresponding exposure minutes from those households that are associated with all other demographic members within those households, such as an associated female age 35-54 and/or child age 2-11. Again, the exposure minutes retrieved are associated with only those households that were previously identified to satisfy a threshold representative number of households matching the same stage cell dimensions (e.g., the cell dimensions of Stage 1, the cell dimensions of Stage 2, etc.).

The example total probability calculator 222 calculates a total probability in a manner consistent with example Equation (2)

$$Tot.\text{Probability } (j) = \frac{\Sigma \text{ Exposure Minutes for } j}{\Sigma \text{ Potential Exposure Minutes for } j} \quad \text{Equation (2)}$$

In the illustrated example of Equation (2), j reflects one of the dimensions of interest under study, such as, in this example, a male age 35-54. That particular male came from a household that satisfied the threshold number of households that also contain Stage 1 cell dimensions of three (3) household members, two (2) adults, one (1) child, viewing a news genre, a set in a living room, and viewing within the daypart of Monday through Sunday between the hours of 7:00 PM through 11:00 PM. In this example, assume that the males age 35-54 are associated with 1850 exposure minutes, in which that value is the sum for all households satisfying the Stage 1 cell dimensions. Also in this example, assume that other household member persons of interest under analysis (e.g., females age 35-54 and children age 2-11) account for 2250 exposure minutes within those respective households. Stated differently, minutes associated with other household minutes are deemed "potential exposure minutes" because of the possibility that they could have also been viewing at the same time as the male age 35-54.

Applying the example scenario above to example Equation (2) yields a total probability for the male age 35-54 as 0.74. A total odds value may be calculated in a manner consistent with example Equation (3).

$$Tot.\text{Odds } (j) = \frac{\text{Total Probability } (j)}{[1 - \text{Total Probability } (j)]} \quad \text{Equation (3)}$$

In the event probability values and total odds values are to be determined for one or more additional persons of interest within a marketing study, such as the example female age 35-54 and/or the example child age 2-11, then a similar approach is repeated using example Equations (2) and (3) with respective exposure minutes for those persons of interest.

As described above, in an effort to reduce imputation errors, examples disclosed herein also incorporate IDP dimensions associated with each stage. In some examples, the IDP dimensions may reduce/resolve data fluctuations and/or improve data stability, thereby improving computation efficiency by lowering one or more evaluation iterations. For each person of interest, a corresponding one or more IDP dimension marginal probabilities is calculated. Also as described above, some persons of interest may have relatively greater or fewer IDP dimensions to be calculated depending on whether that person of interest is also associated with a threshold number of households that qualify. Continuing with the example person of interest male age 35-54, it was previously determined that IDP dimensions of (a) Monday through Friday 7:00 PM to 8:00 PM daypart, (b) tuned to station WAAA and (c) Non-Hispanic each included at least thirty (30) qualifying households within Stage 1. As such, the example marginal probabilities for each of these persons of interest is calculated based on exposure minutes from those households in which the cell dimensions were previously identified. However, rather than require that each of the IDP dimensions all simultaneously be present within those households, each one of the IDP dimensions is evaluated in an independent manner so that there is one IDP marginal probability calculated for each IDP dimension in a manner consistent with example Equation (4).

$$\text{Marginal Probability } (j, di) = \frac{\Sigma \text{ Exposure Minutes for } (j, di)}{\Sigma \text{ Potential Exposure Minutes for } (j, di)} \quad \text{Equation (4)}$$

In the illustrated example of Equation (4), j reflects one of the dimensions of interest under study, such as, in this example, a male age 35-54. Additionally, di reflects an IDP dimension, such as (a) Monday through Friday 7:00 PM to 8:00 PM daypart, (b) tuned to station WAAA or (c) Non-Hispanic. In this example, assume that for the person of interest males age 35-54, in which a total probability (and corresponding total odds) was previously calculated, account for 600 exposure minutes, and that the other household member persons of interest account for 850 exposure minutes. When applying example Equation (4), a marginal probability for males age 35-54 in connection with the IDP dimension Monday through Friday 7:00 PM to 8:00 PM daypart results in a marginal probability of 0.71. Example Equation (4) may then be reapplied in view of one or more additional available IDP dimensions to calculate additional marginal probability value(s).

Marginal odds associated with each marginal probability calculation may be determined in a manner consistent with example Equation (5).

$$\text{Marginal}(j, di) \text{ Odds} = \frac{\text{Marginal Probability } (j, di)}{[1 - \text{Marginal Probability } (j, di)]} \quad \text{Equation (5)}$$

Additionally, for each IDP dimension, a corresponding odds ratio is calculated in a manner consistent with example Equation (6).

$$\text{Odds Ratio } (j, di) = \frac{\text{Marginal Odds } (j, di)}{\text{Total Odds } (j)} \quad \text{Equation (6)}$$

When all persons of interest have been considered to calculate respective (a) total probabilities (and associated total odds), (b) marginal probabilities (and associated marginal odds) and (c) odds ratios, examples disclosed herein apply and/or otherwise impute those calculated probabilities to households associated with the MM panelists (MM households 106). In particular, the example classification engine 200 identifies MM households 106 that have dimensions that match the example learning households 104. As described above, the example learning households 104 now have corresponding total probability values (associated with cell dimensions), total odds values (associated with cell dimensions), marginal probability values (associated with IDP dimensions) and marginal odds values (associated with cell and IDP dimensions). The aforementioned total probability values, total odds values, marginal probability values and marginal odds values from the example learning households 104 are imputed by the example classification engine 200 to corresponding MM households 106 having the same matching dimensions. For each demographic of interest, the example odds appending engine 228 calculates an adjusted odds value in a manner consistent with example Equation (7).

Adjusted Odds$(j,d)$=Total Odds$(j)$×Odds Ratio$(j,d1)$× Odds Ratio$(j,d2)$× . . . Odds Ratio$(j,dn)$   Equation(7).

In the illustrated example of Equation (7), j reflects a dimension of interest under analysis, such as a male age 35-54, and $d_n$ reflects an IDP dimension of interest under analysis. Additionally, the example appending engine 228 calculates a final probability in a manner consistent with example Equation (8).

$$\text{Final Probability} = \frac{\text{Adjusted Odds } (j, d)}{[1 + \text{Adjusted Odds } (j, d)]} \quad \text{Equation (8)}$$

After the application of example Equations 2-8, final probability values are available for all observations in both the example learning households 104 and the example MM households 106, which ends the second phase. However, probability calculations may be repeated in some examples, such as when a station or station genre changes, when tuning continues to another daypart, cell classification changes, etc.

Third Phase—Most Likely Viewers

As described above, the example third phase uses the final probability values to identify best matches of each TV set within the MM households 106 and learning households 104 so that the viewing behaviors on each TV set from the members of the learning households may be imputed to the corresponding members of the matching MM households 106. In operation, the example MM interface 204 selects one of the MM households 106 and the example classification engine 200 identifies a corresponding classification that was previously associated with that selected MM household. As described above, each person was classified as qualifying for a particular cell and stage, in which each stage includes a particular combination of model dimensions. This phase of the example methodology utilizes a subset of these dimensions as must-match criteria between each MM household/TV set and learning household/TV set to ensure characteristic and behavioral similarity between the matched TV sets within the homes. Additionally, for each TV set within each MM household, this phase of the example methodology finds the best matching learning household/TV set to impute viewers. Further, this phase of the example methodology is carried out by cell such that a best matching learning household/TV set is determined multiple times for any given day. That is, if, for example, a station or station genre changes, or the tuning continues to another daypart, or any other aspect of the data changes such that it is classified into a different cell, then the matching process is carried out again. Therefore, each MM household/TV set can be matched with different learning households/TV sets throughout the day; the best matching, most similar is always selected. Additionally, and as described in further detail below, preferences may be identified for homes within a particular DMA.

For each TV set, example cell, and person ID, the example average probability calculator 246 calculates an average probability value, as shown in FIG. 11. In the illustrated example of FIG. 11, a portion of a most likely viewer (MLV) table 1100 includes a household/set column 1102 (similar to that shown in FIG. 10), a cell combination column 1104, a person ID column 1106 (similar to that shown in FIG. 10), an average probability column 1108, and an MLV rank column 1110. The example cell combination column 1104 illustrates a first combination. For each person within the selected MM household, the example average probability calculator 246 calculates an average probability across all quarter hours within the cell (e.g., the average probability for all quarter hours per household person within the daypart between 7:00-11:00 PM, as defined by the example dimension classification), as shown in the example average probability column 1108. Based on the average probability values, the example rank engine 248 establishes an MLV rank for each person, as shown in the example MLV rank column 1110. While the illustrated example of FIG. 11 includes two example cell combinations for the Smith household, any number of additional households, sets within households (e.g., a living room set, a bedroom set, etc.), and/or cell combinations of interest (e.g., 4:00-7:00 PM daypart) may be added to the example MLV table 1100. While examples disclosed above generate average persons probabilities and rankings associated with classified MM households 106, a similar generation of average persons probabilities and corresponding ranking also occurs in connection with the classified learning households 104. As described in further detail below, these average probabilities and corresponding rankings for each of the learning households 104 and MM households 106 are compared to identify a best match.

Figure 12:
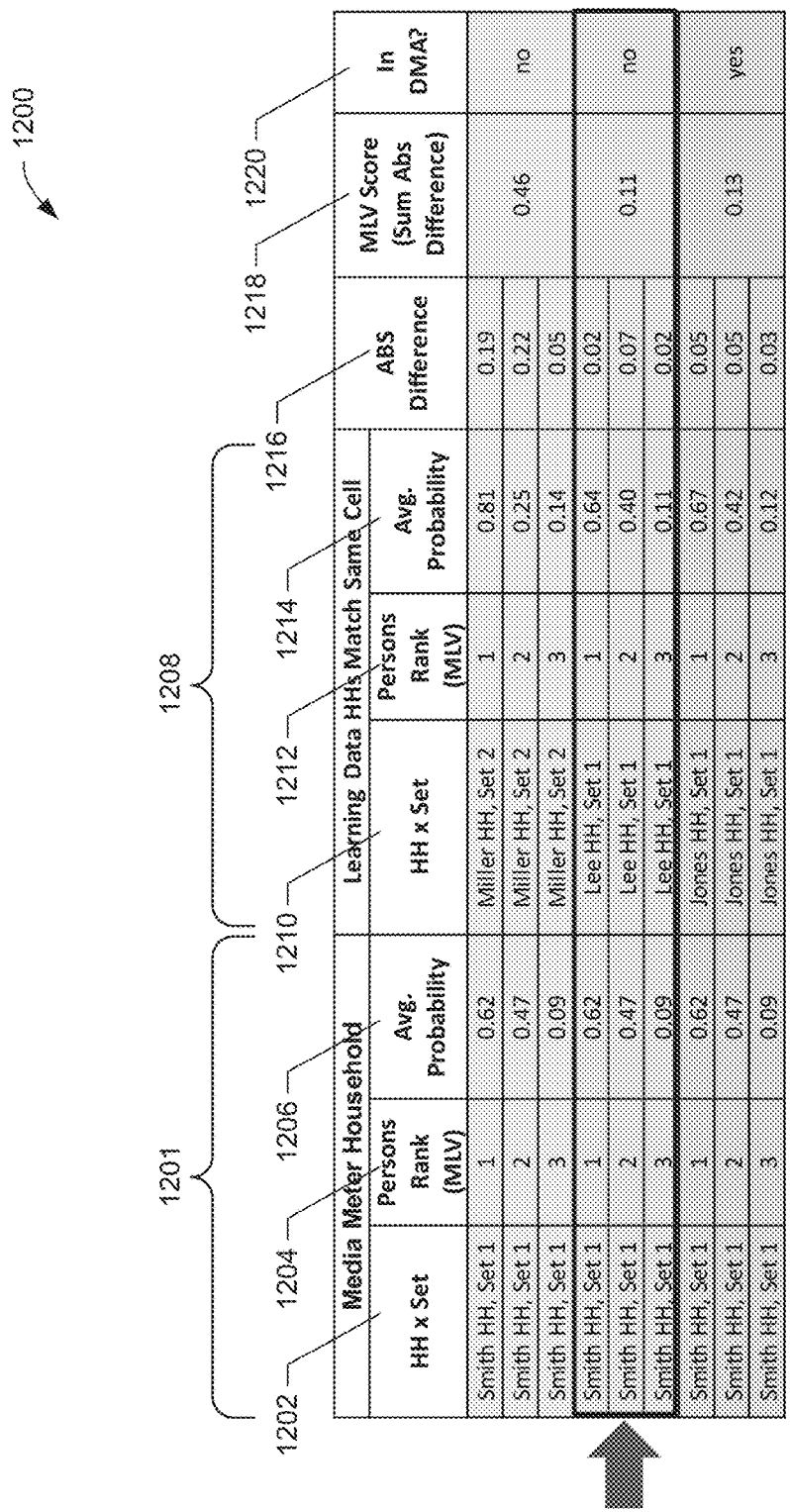
FIG. 12 is an example most likely viewer matching table to identify household matches.

The example MLV engine 240 next matches the ranked MM households to corresponding learning households. In operation, the example MM interface 204 selects one of the MM households 106 and the example learning household interface 202 selects one or more candidate learning households 104 for comparison purposes, as shown in FIG. 12. In the illustrated example of FIG. 12, an MLV matching table 1200 includes data columns associated with MM households 106 to be matched to learning households (1201), which includes a household/set column 1202 (similar to that shown in FIGS. 10 and 11), an MLV rank column 1204 (similar to that shown in FIG. 11), and an average probability column 1206 (similar to that shown in FIG. 11). In the illustrated example of FIG. 12, the average probability column 1206 includes average tuning probability values because such data is associated with MM households (tuning households). Additionally, to identify which one of any number of candidate learning households best matches the candidate MM household under evaluation (e.g., in this example the "Smith household, Set 1"), the example MLV matching table 1200 includes data columns associated with candidate learning households 104 to be matched 1208. In particular, the example MLV matching table 1200 includes a household/set column 1210, an MLV rank column 1212, and an average probability column 1214. In the illustrated example of FIG. 12, the average probability column 1214 includes average viewing probability values because such data is associated with learning households (viewing households).

The example MLV engine 240 calculates an absolute difference between the average probability values for each household person, which is shown in the example absolute difference column 1216. Additionally, for each compared MM household and learning household, the example MLV engine 240 calculates an MLV score based on the sum of the absolute difference values, which is shown in the example MLV score column 1218. Generally speaking, an MLV score value that is relatively lower compared to other MLV score values indicates a greater degree of similarity between the compared persons of MM household and learning household. As such, in the illustrated example of FIG. 12, the most similar household match is between the Smith household (one of the MM households 106) and the Lee household (one of the learning households 104) because it has the lowest relative MLV score value of 0.11.

Figure 13:
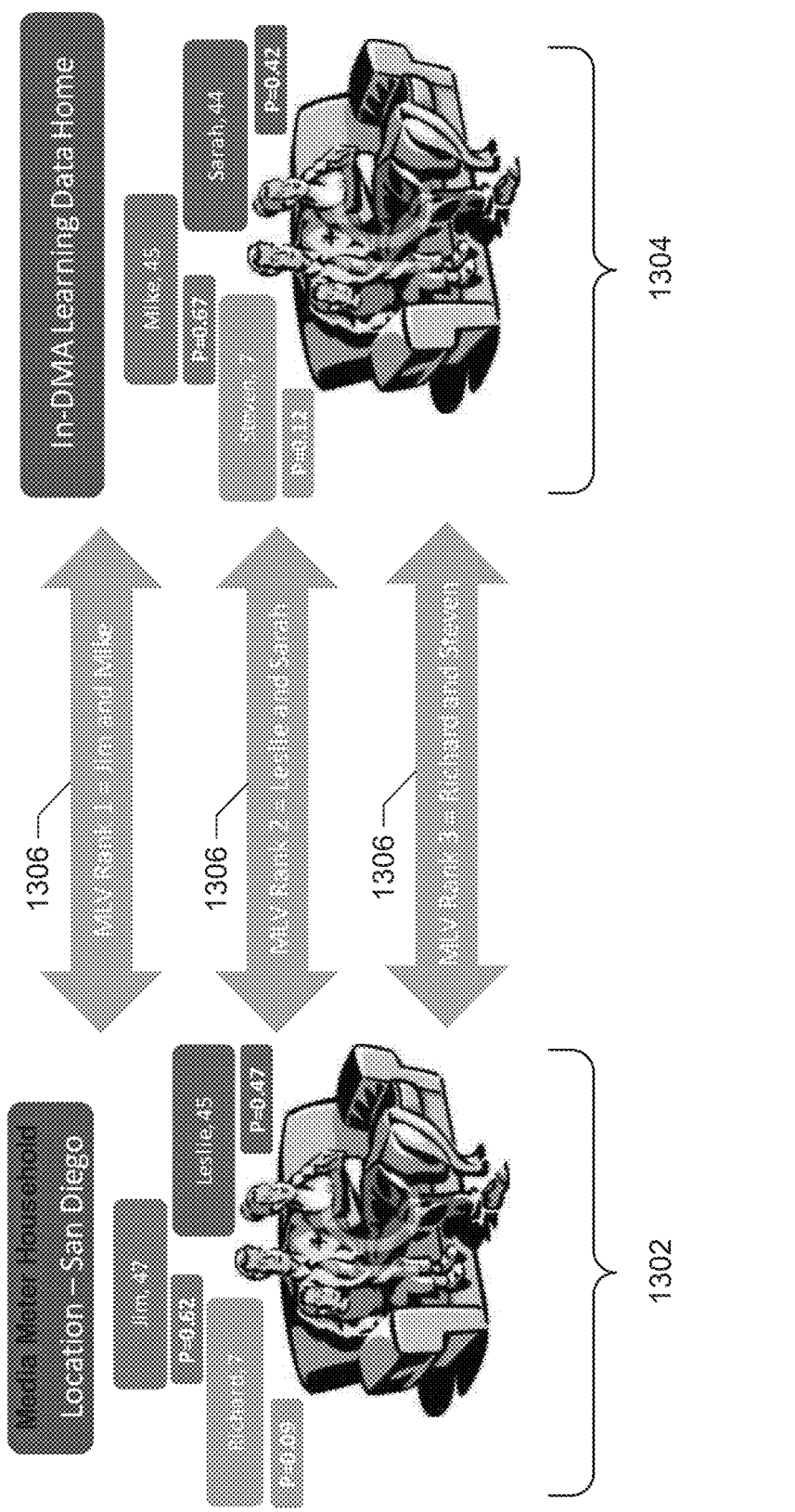
FIGS. 13 and 15 illustrate example household matching.

In some examples, when making a comparison between persons of the MM households and persons of the one or more learning households to identify a closest match based on the MLV score, a greater priority may be assigned to whether such matching learning household(s) are also within the same designated market area (DMA) as the MM household. The example rank engine 248 may identify, for each comparison between a candidate MM household of interest and one or more learning household(s), whether a corresponding learning household is also within the same DMA as the MM household, which is shown in the example DMA column 1220. In the event a matching DMA status is to receive a greater priority than the MLV score, then the example MLV engine 240 will identify a closest match between the Smith household and the Jones household, despite the fact that the MLV score therebetween is 0.13, which is relatively greater than the MLV score between the Smith household and the Lee household (i.e., an MLV score of 0.11). In some examples, if a matching learning household is within a same DMA, but the corresponding MLV score is not a lowest relative value, then the in-DMA household is used only if it is within a threshold value of the overall lowest MLV score. In still other examples, if none of the households is within the DMA of interest (and within a threshold of the overall lowest MLV score), then the home with the lowest MLV score is used. While the illustrated example of FIG. 12 includes comparisons between a single MM household (i.e., the Smith household) and three (3) candidate learning households, examples disclosed herein are not limited thereto. In particular, the calculation of MLV scores and comparisons may occur between additional and/or alternate MM households and corresponding candidate learning households. At this point of the third phase, persons within the MM households are matched to the closest candidate learning households (and persons therein) based on the MLV score and/or the MLV score in view of a DMA priority. Next, the one or more individuals within the MM households and corresponding matching learning households are evaluated so that viewing behavior(s) of the learning household member(s) can be imputed to the most appropriate MM household member(s). In the illustrated example of FIG. 13, an MM home located in San Diego 1302 is found to best match a learning household within that same DMA 1304. Both households include three household members and corresponding probability values. As described above, each household member includes a corresponding MLV rank determined by the example rank engine 248, and tentative associations between those household members with the same MLV rank are deemed to match 1306.

However, because viewing amounts between matched MM households and learning households may differ, the example quarter hours therebetween are misaligned. For example, while a similarity match was identified between a candidate MM household and a candidate learning household, a number of quarter hour data points collected in the example MM household may differ from the number of quarter hour data points collected in the corresponding matching learning household. For instance, between a daypart of 7:00-11:00 PM the example MM households may have collected seven (7) quarter hours of tuning data, while a corresponding learning households may have only collected four (4) quarter hours of viewing data, thereby creating a discrepancy that has traditionally resulted in erroneous imputation predictions and wasteful discarding of non-overlapping data points. Examples disclosed herein reduce an imputation error and preserve data points during one or more imputation efforts between MM households and learning households.

Figure 14:
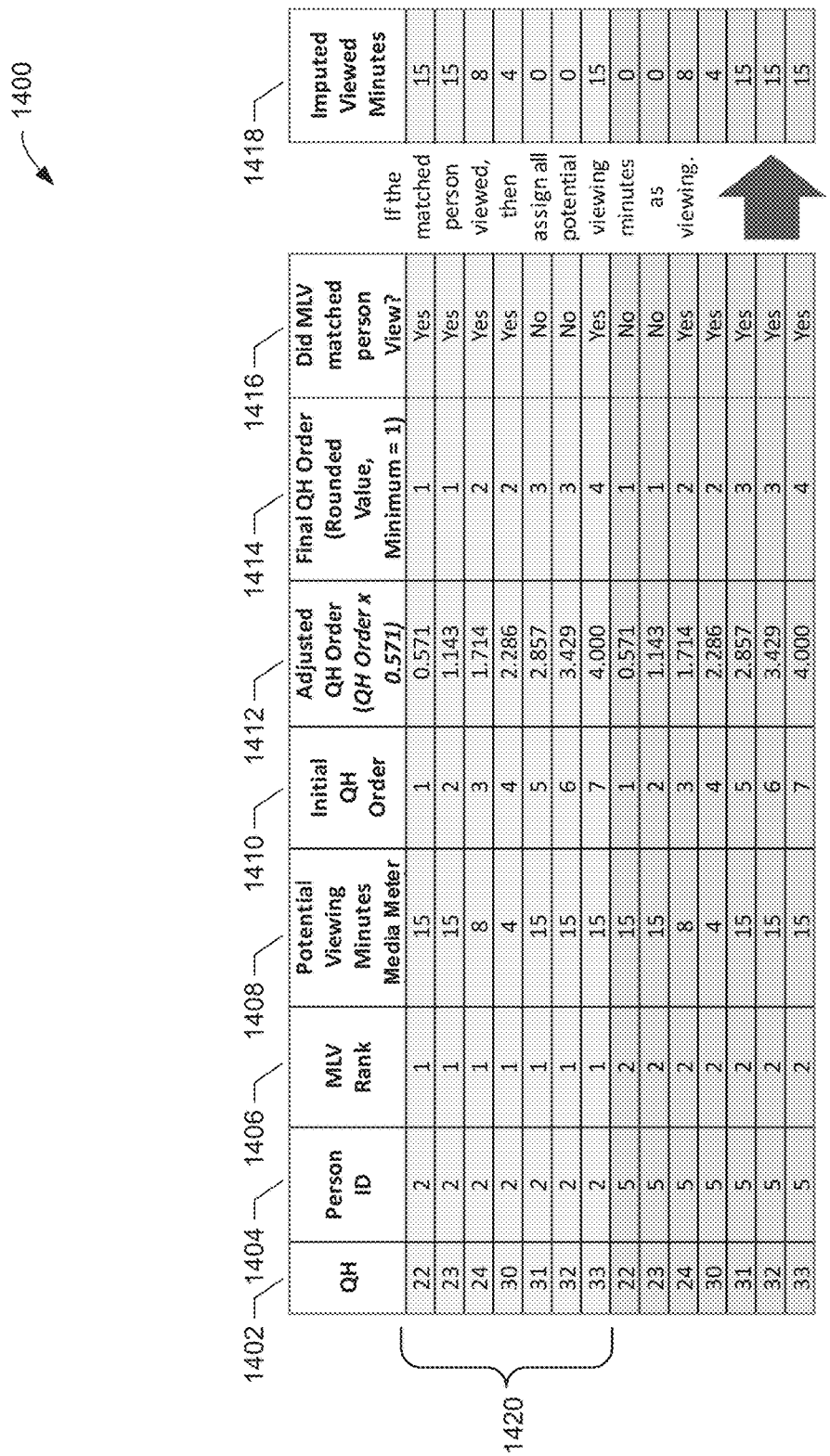
FIG. 14 is an example alignment table to align time periods between tuning households and viewing households.

FIG. 14 illustrates a portion of an example alignment table 1400 that includes an example quarter hour column 1402, an example person ID column 1404, an example MLV rank column 1406, an example potential viewing minutes column 1408, an example initial quarter hour order column 1410, an example adjusted quarter hour column 1412, an example final quarter hour column 1414, an example learning household viewing status column 1416, and an example imputed viewed minutes column 1418.

In the illustrated example of FIG. 14, the quarter hour column 1402 includes quarter hour values associated with available quarter hour potential viewing minutes from a MM household of interest. In the illustrated example of FIG. 14, the person associated with "Person ID 2" has a quantity of seven (7) quarter hour data points 1420. The example minutes aggregator 244 assigns each quarter hour data point 1420 in a temporal order, as shown in the example initial QH order column 1410. Stated differently, the example temporal order values are sequential integer placeholders of each available quarter hour data point from the example MM household. However, the matched learning household only includes a quantity of four quarter hour data points, thereby illustrating a lack of parity between these two households of interest. Rather than drop, delete and/or otherwise simply eliminate quarter hour data points that do not have a corresponding parity match, the example minutes aggregator 244 reduces imputation errors and preserves utility of all available data points by calculating an adjusted quarter hour ratio based on the difference between available MM household quarter hour data points and available learning household quarter hour data points in a manner consistent with example Equation (9).

$$\text{Adjusted } QH = \frac{\text{Available Learning } HH \ QHs}{\text{Available } MM \ HH \ QHs}. \quad \text{Equation (9)}$$

Continuing with the example above, an adjusted QH value of 0.571 results when the learning household includes four (4) available quarter hour data points and the MM households include seven (7) available quarter hour data points. The example minutes aggregator 244 multiplies the adjusted QH ratio by the initial QH order (column 1410) to derive an adjusted QH order (column 1412), which is rounded to result in a final QH order (column 1414). As such, respective ones of the relatively fewer number of learning household data points are expanded to overlap with the relatively greater number of MM household data points. In the event that the matched person from the learning household was viewing during a particular quarter hour, the example MLV engine 240 designates the potential viewing minutes from the MM household as actual viewing minutes, as shown in column 1418. In other words, potential viewing minutes (tuning minutes) associated with the tuning household are imputed and/or otherwise deemed to be viewing minutes when a matching quarter hour in the viewing household exhibits viewing behavior at the same time. While examples above refer to data points associated with a quarter hour time period resolution, such examples are disclosed for illustration and not limitation. While examples disclosed above consider viewing and tuning behaviors from members of respective households, in some examples, short-term visitor viewing is collected from the learning household. As such, examples disclosed above also apply to such visitor viewing, which is carried over to MM households for a similar analysis.

Figure 15:
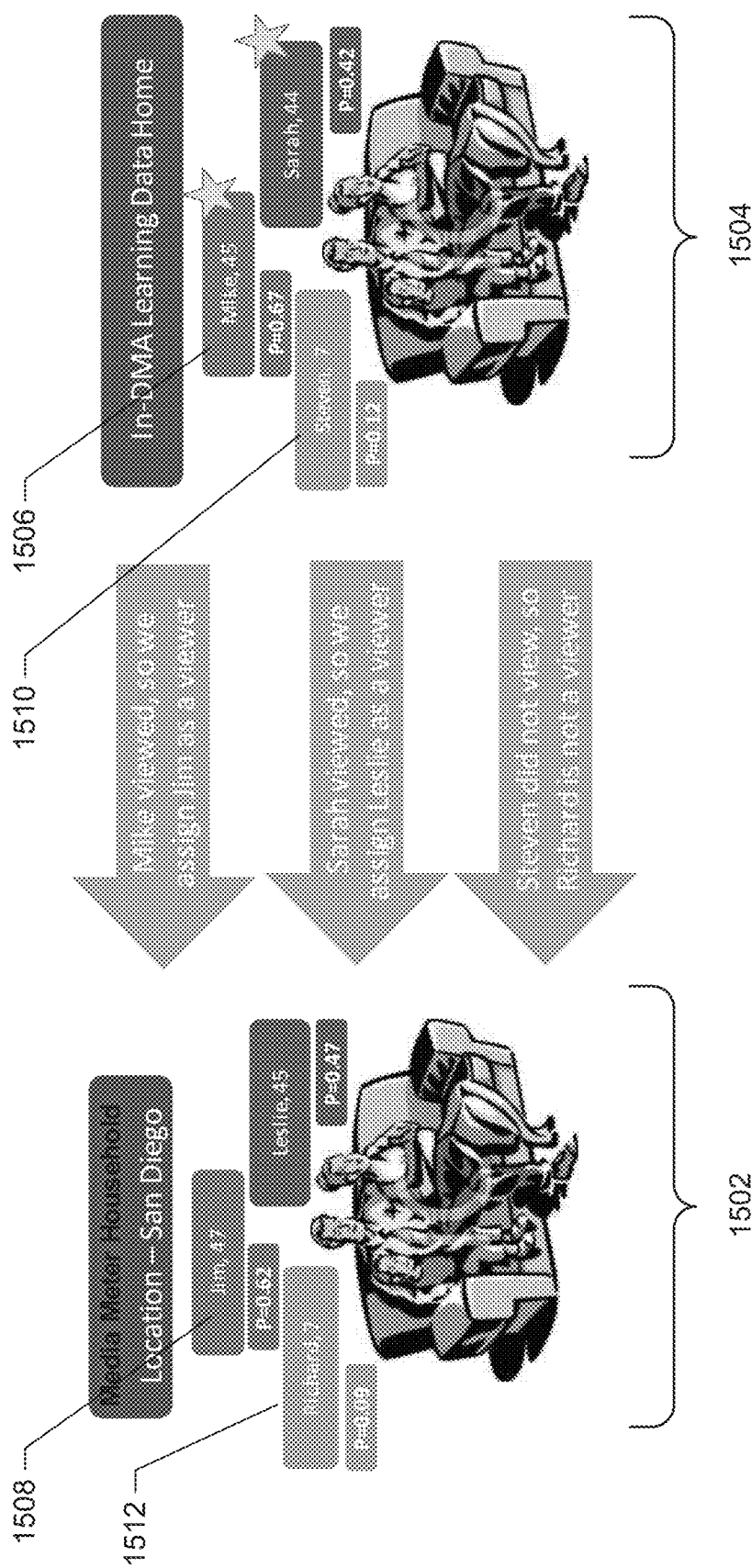

To illustrate, FIG. 15 includes the MM household located in San Diego 1502 and the previously identified matching learning household 1504, as described above in connection with FIG. 13. From the learning household 1504, because the example household member Mike 1506 was viewing during the same quarter hour as the example household member Jim 1508 from the MM household 1502, Jim is imputed as a viewer during that quarter hour and the corresponding potential viewing minutes are deemed to be actual viewing minutes for Jim. On the other hand, because the example household member Steven 1510 from the learning household 1504 was not viewing at the same quarter hour as the matched household member Richard 1512 in the MM household 1502, then Richard is not deemed to be a viewer and any associated potential viewing minutes are not attributed to Richard in the MM household 1502.

While an example manner of implementing the viewer assignment engine 110 of FIGS. 1 and 2 is illustrated in FIG. 2, one or more of the elements, processes and/or devices illustrated in FIG. 2 may be combined, divided, re-arranged, omitted, eliminated and/or implemented in any other way. Further, the example classification engine 200, the example probability engine 220, the example most likely viewer (MLV) engine 240, the example learning household interface 202, the example media meter interface 204, the example weighting engine 206, the example cell generator 208, the example stage selector 210, the example independent distribution probability (IDP) selector 212, the example total probability calculator 222, the example marginal probability calculator 224, the example odds ratio calculator 226, the example odds appending engine 228, the example cell selector 242, the example minutes aggregator 244, the example average probability calculator 246, the example rank engine 248 and/or, more generally, the example viewer assignment engine 110 of FIGS. 1 and 2 may be implemented by hardware, software, firmware and/or any combination of hardware, software and/or firmware. Thus, for example, any of the example classification engine 200, the example probability engine 220, the example MLV engine 240, the example learning household interface 202, the example media meter interface 204, the example weighting engine 206, the example cell generator 208, the example stage selector 210, the example IDP selector 212, the example total probability calculator 222, the example marginal probability calculator 224, the example odds ratio calculator 226, the example odds appending engine 228, the example cell selector 242, the example minutes aggregator 244, the example average probability calculator 246, the example rank engine 248 and/or, more generally, the example viewer assignment engine 110 of FIGS. 1 and 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example classification engine 200, the example probability engine 220, the example MLV engine 240, the example learning household interface 202, the example media meter interface 204, the example weighting engine 206, the example cell generator 208, the example stage selector 210, the example IDP selector 212, the example total probability calculator 222, the example marginal probability calculator 224, the example odds ratio calculator 226, the example odds appending engine 228, the example cell selector 242, the example minutes aggregator 244, the example average probability calculator 246, the example rank engine 248 and/or, more generally, the example viewer assignment engine 110 of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example viewer assignment engine of FIGS. 1 and 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the viewer assignment engine 110 of FIGS. 1 and 2 are shown in FIGS. 16-24. In these examples, the machine readable instructions comprise a program for execution by a processor such as the processor 2412 shown in the example processor platform 2400 discussed below in connection with FIG. 24. The program(s) may be embodied in software stored on a tangible computer readable storage medium such as a CD-ROM, a floppy disk, a hard drive, a digital versatile disk (DVD), a Blu-ray disk, or a memory associated with the processor 2412, but the entire program(s) and/or parts thereof could alternatively be executed by a device other than the processor 2412 and/or embodied in firmware or dedicated hardware. Further, although the example program(s) is/are described with reference to the flowcharts illustrated in FIGS. 16-24, many other methods of implementing the example viewer assignment engine 110 may alternatively be used. For example, the order of execution of the blocks may be changed, and/or some of the blocks described may be changed, eliminated, or combined.

As mentioned above, the example processes of FIGS. 16-24 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 16-24 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 16:
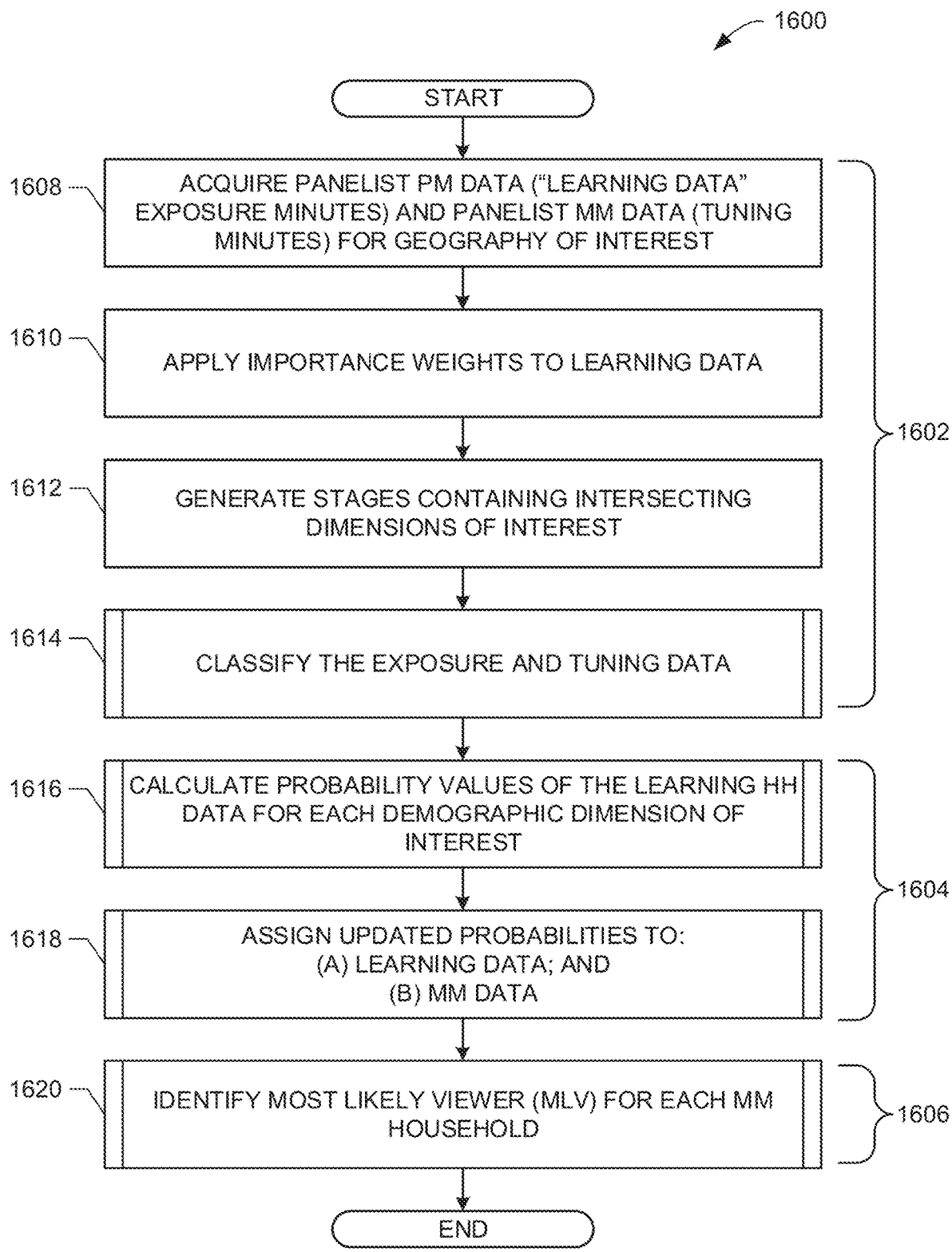
FIGS. 16-23 are flowcharts representative of example machine readable instructions that may be executed to implement the example viewer assignment engine of FIGS. 1 and 2.

The program 1600 of FIG. 16 includes an example first phase that classifies data from learning households 104 and MM households 106 to identify model dimensions contained therein (1602). The example program 1600 of FIG. 16 also includes an example second phase that calculates probabilities for the example learning households 104 in view of IDP values (1604), and includes an example third phase in which the example MLV engine 240 uses the calculated probabilities to identify and/or assign viewing behaviors for household members of the example MM households 106 (1606). The example program 1600 of FIG. 16 begins at block 1608 in which the learning household interface 202 and the MM interface 204 acquire panelist exposure data (sometimes referred to herein as "exposure minutes" or "people meter data"), and panelist media meter (MM) data (sometimes referred to herein as "tuning minutes") for a geography of interest.

As described above, because collected data that is more recent exhibits an accuracy that is better than that of relatively older data, the example weighting engine 206 applies importance weighting values to the data collected from the example learning households 104 and the example MM households 106 (block 1610). In view of the example three phases of FIG. 16, at least one goal includes identifying which learning households best match MM households based on different criteria, such as similarity of household composition, similarity of household characteristics (dimensions), and/or similarity of household probability values. The example cell generator 208 generates, receives and/or otherwise retrieves different stages of intersecting dimensions of interest (block 1612). As described above in connection with FIG. 5, a first stage of dimensions may delineate a particular quantity of dimensions that, if included within a household, defines a household classification when comparing it to one or more other households. In the event a particular household does not satisfy the quantity of dimensions delineated in the example first stage, then the example classification engine 200 evaluates that household in view of another (subsequent, e.g., Stage 2) stage that is relatively less restrictive. The example classification engine 200 classifies exposure and tuning data within the households to be used for later comparisons (block 1614). As described above, and as described in further detail below, the example classification engine 200 considers both intersecting dimensions for the household and members therein, as well as IDP dimensions. Once a particular household and/or members included therein has/have been classified, any future comparisons of the data from those households will be limited to only other households that share the same classification (e.g., Stage 1 households, Stage 2 households, etc.).

In the illustrated example of FIG. 16, the example second phase 1604 of the example program 1600 begins at block 1616, in which the example probability engine 220 calculates probability values of the learning household data for each demographic dimension of interest to derive odds ratios. As described above, and in further detail below, the odds ratios consider both intersecting dimensions of households as well as IDP dimensions, which allow final probability values to be adjusted in a manner that accounts for as many predictive dimensions of imputed viewing behaviors in the MM households as possible, given adequate sample sizes. Additionally, the odds ratios consider both intersecting dimensions of households as well as IDP dimensions to allow final probability values to be adjusted in a manner that reduces overrepresentation or underrepresentation of imputed viewing behaviors in the MM households. The example odds appending engine 228 assigns the final probability values to household members of both the example learning households 104 and the example MM households 106 (block 1618).

In the illustrated example of FIG. 16, the example third phase 1606 of the example program 1600 begins at block 1620, in which the example MLV engine 240 imputes viewers within each MM household 106 using a matched donor-based approach. In this approach, each TV set in each MM household 106 is matched with a characteristically and behaviorally similar learning household/TV set. Individuals within the matched homes are then matched on a person-by-person basis based on their probability ranking within the home (e.g., most likely to least likely). Then, after quarter hours or viewing/potential viewing minutes are aligned between the homes, potential viewers from the MM home are imputed as actual viewers if the corresponding MLV-ranked individual in the matched learning home viewed during that time.

Figure 17:
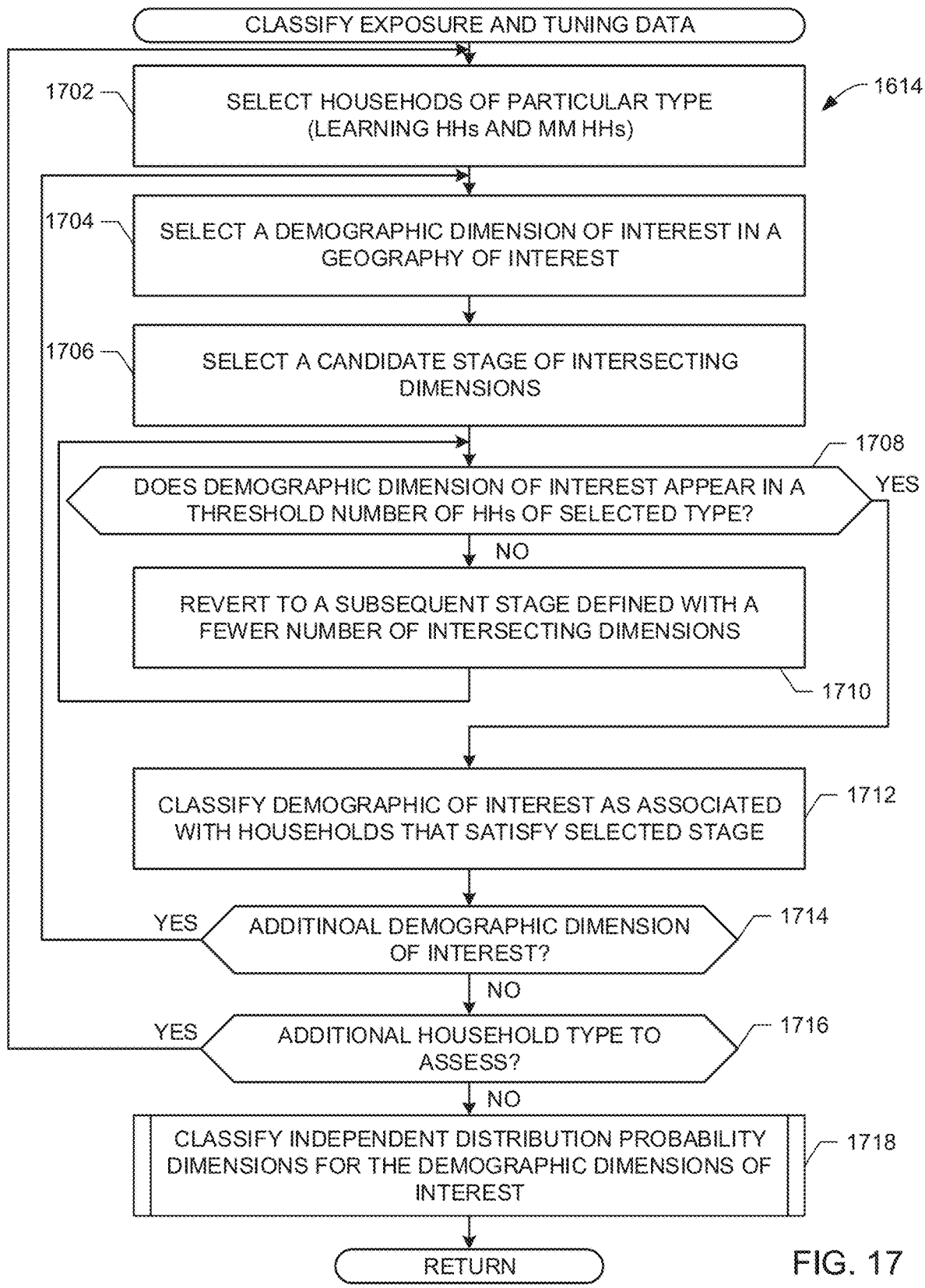
Figure 18:
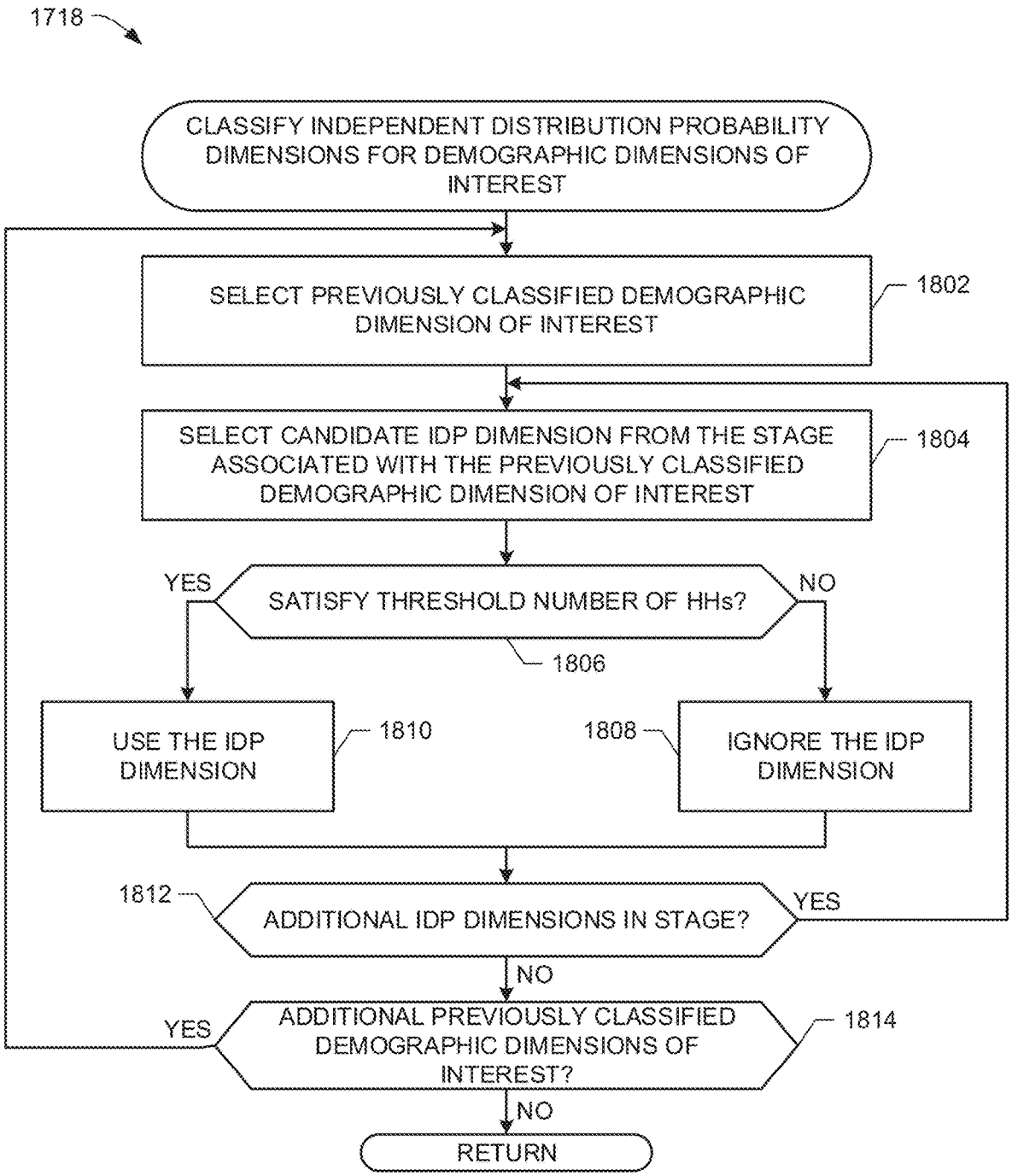

Returning to the example first phase 1602 of FIG. 16, additional detail in connection with classifying the exposure and tuning data of block 1614 is shown in FIG. 17. In the illustrated example of FIG. 17, the example learning household interface 202 or the example MM interface 204 selects one or more households of interest (block 1702). For instance, the example program 1614 of FIG. 17 may iterate any number of times when processing data from MM households, in which the example MM interface 204 is invoked. However, when the example program 1614 of FIG. 17 iterates any number of times when processing data from learning households, then the example learning household interface 202 is invoked by the example classification engine 200. The example cell generator 208 selects a target set of demographic dimension(s) of interest within a geography of interest (block 1704), as described above in connection with FIG. 7. Additionally, the example stage selector 210 selects a candidate stage of intersecting dimensions (block 1706) (e.g., Stage 1), and evaluates whether the target set of demographic dimension(s) satisfies a required number of available households (block 1708). If not, then the example stage selector 210 reverts to a subsequent stage that is defined with relatively fewer intersecting dimensions (block 1710), thereby improving the chances of a greater number of qualifying households. Control returns to block 1708 to determine whether the subsequent stage satisfies a required number of available households and, if so, the example classification engine 200 classifies the demographic of interest as associated with only those households that satisfy the qualifying stage (block 1712).

The example cell generator 208 determines whether one or more additional demographic dimensions of interest are to be evaluated (block 1714). For instance, in the illustrated example of FIG. 7, the demographic dimensions of interest included one male and one female age 35-54, and one child age 2-11, all of which are in the Pacific territory. In the event an alternate combination of demographic dimensions of interest are to be evaluated, control returns to block 1704. Additionally, in the event an additional or alternate household type of interest is to be assessed (e.g., MM households or learning households) (block 1716), then control returns to block 1702. Otherwise, the example IDP selector 212 classifies the IDP dimensions in view of the demographic dimensions of interest (block 1718), as described below in connection with FIG. 18.

As described above, a household and/or members therein can only be associated with a particular stage of cell dimensions when such dimensions intersect (e.g., each dimension is true as a logical "AND" condition). However, examples disclosed herein also evaluate households and members therein in view of IDP dimensions in a manner that is independent of one or more other IDP dimensions. In the illustrated example of FIG. 18, the classification engine 200 selects a previously classified demographic dimension of interest (block 1802), and the IDP selector 212 selects a candidate IDP dimension from the same stage that is associated with that previously classified dimension of interest (block 1804). The example IDP selector 212 determines whether the selected IDP dimension of interest has an associated threshold number of available households (data points) (block 1806) and, if not, that IDP dimension is ignored from further evaluation (block 1808). On the other hand, in the event the selected IDP dimension of interest includes an associated threshold number of available households (block 1806), then that IDP dimension is used and/or otherwise retained for future use when calculating probabilities (block 1810).

The example classification engine 200 determines whether the selected stage includes one or more additional IDP dimensions (block 1812) and, if so, control returns to block 1804. If not, the example classification engine 200 determines whether one or more additional previously classified demographic dimensions of interest are to be evaluated (block 1814) and, if so, control returns to block 1802.

Figure 19:
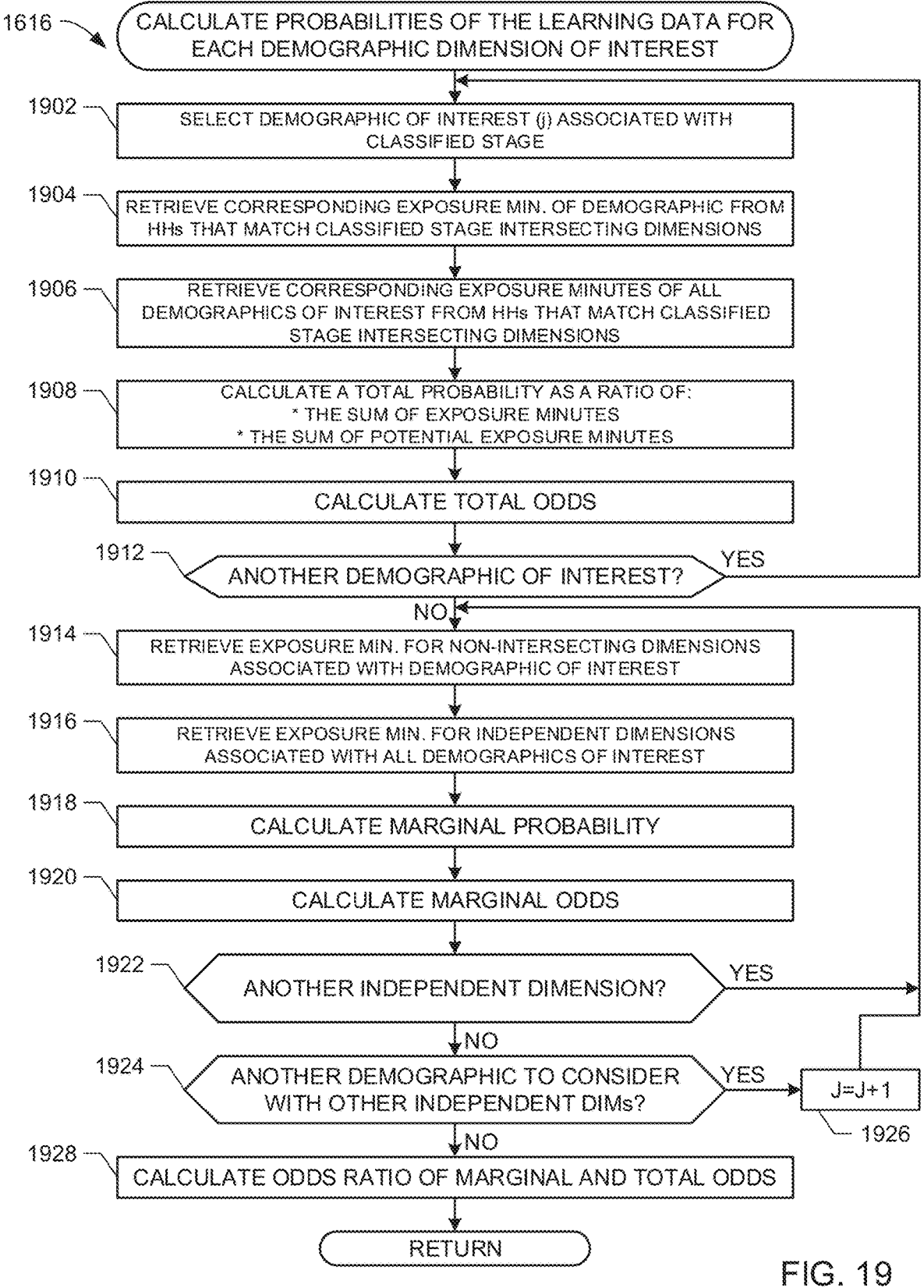

Returning to the example second phase 1604 of FIG. 16, additional detail in connection with calculating probabilities of learning household data of block 1616 is shown in FIG. 19. Generally speaking, the example program 1616 of FIG. 19 calculates (a) total probabilities and (b) total odds for intersecting cell dimensions associated with data from learning households, and calculates (c) marginal probabilities and (d) marginal odds for IDP dimensions associated with data from those learning households. In the illustrated example of FIG. 19, the classification engine 200 selects a demographic of interest, such as a male age 35-54 (block 1902). The example learning household interface 202 retrieves corresponding exposure minutes of the demographic of interest from households that match the previously determined classified stage of intersecting dimensions (block 1904). As described above, while one demographic of interest is selected, each household may have one or more additional household members that may contribute to tuning behaviors. As such, the example learning household interface 202 retrieves corresponding exposure minutes from all other household members as potential viewing minutes (block 1906). As described above in connection with Equation (2), the example total probability calculator 222 calculates a total probability as a ratio of the sum of exposure minutes for the demographic of interest (e.g., the male age 35-54) and the sum of potential viewing minutes from other household members (e.g., the female age 35-54 and the child age 2-11) (block 1908). Additionally, the example total probability calculator 222 calculates a total odds value in a manner consistent with Equation (3) (block 1910).

In the event one or more additional demographics of interest is to be considered (block 1912), then control returns to block 1902. Otherwise, the example learning household interface 202 retrieves exposure minutes of the demographic of interest from households that match the previously determined classified stage of IDP dimensions (block 1914), as well as retrieving exposure minutes from all other household members as potential viewing minutes (block 1916). The example marginal probability calculator 224 calculates a marginal probability as a ratio of the sum of exposure minutes for the demographic of interest and the sum of potential exposure minutes for all other household members (block 1918), as shown above in Equation (4). Additionally, the example marginal probability calculator 224 calculates a marginal odds value in a manner consistent with Equation (5) (block 1920).

In the event the example classification engine 200 identifies one or more additional IDP dimensions of interest are associated with the demographic of interest (block 1922), then control returns to block 1914. If not, then the example classification engine 200 determines whether another demographic of interest is to be evaluated with the IDP dimensions (block 1924). If so, then another demographic of interest is selected (block 1926) and control returns to block 1914. Now that (a) all marginal odds values for each demographic of interest and corresponding IDP dimension are calculated and (b) all total odds values for each demographic of interest are calculated, the example odds ratio calculator 226 calculates an odds ratio in a manner consistent with example Equation (6) (block 1928).

Figure 20:
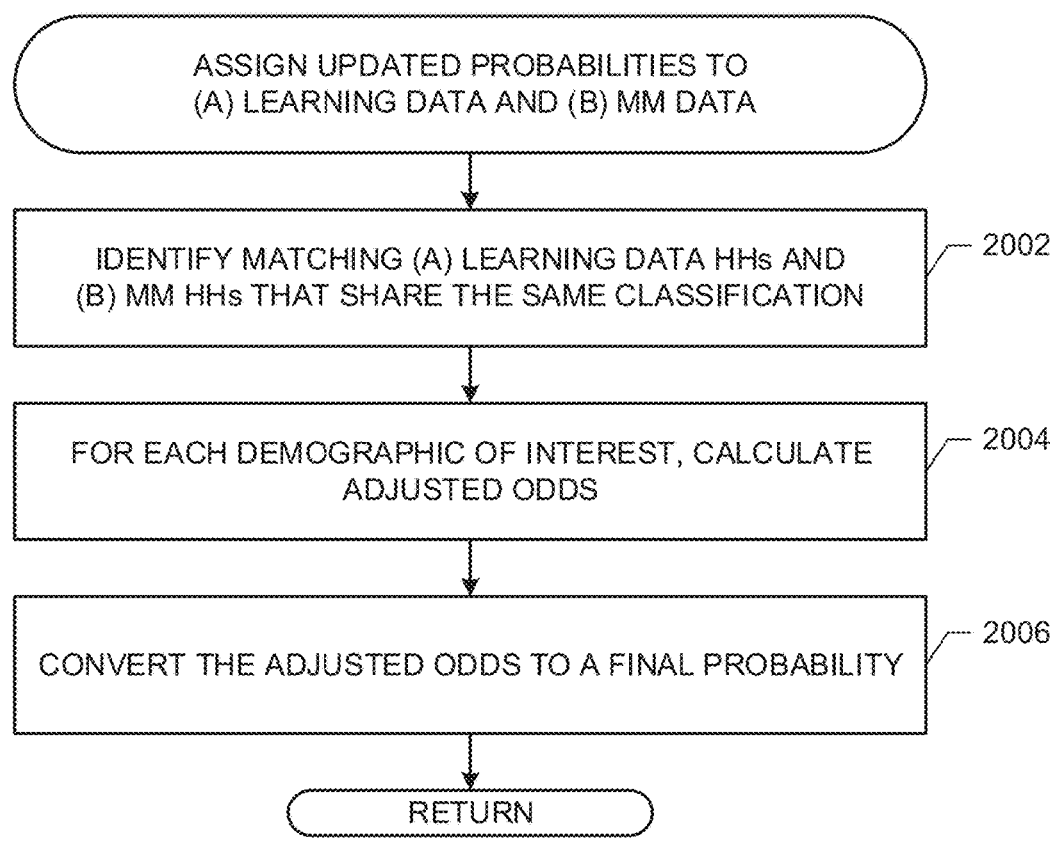

Returning to the example second phase 1604 of FIG. 16, additional detail in connection with assigning updated probabilities of block 1618 is shown in FIG. 20. In the illustrated example of FIG. 20, the example classification engine 200 identifies dimension matches between the classified learning households 104 and corresponding MM households 106 that share the same stage classification (block 2002). For each demographic of interest, the example odds appending engine 228 calculates an adjusted odds value in a manner consistent with Equation (7) (block 2004), and converts the adjusted odds values to a final probability values in a manner consistent with Equation (8) (block 2006). Now that the final probability values are available for each demographic of interest, the second stage ends and those final probability values are used to identify most likely viewers in stage 3.

Figure 21:
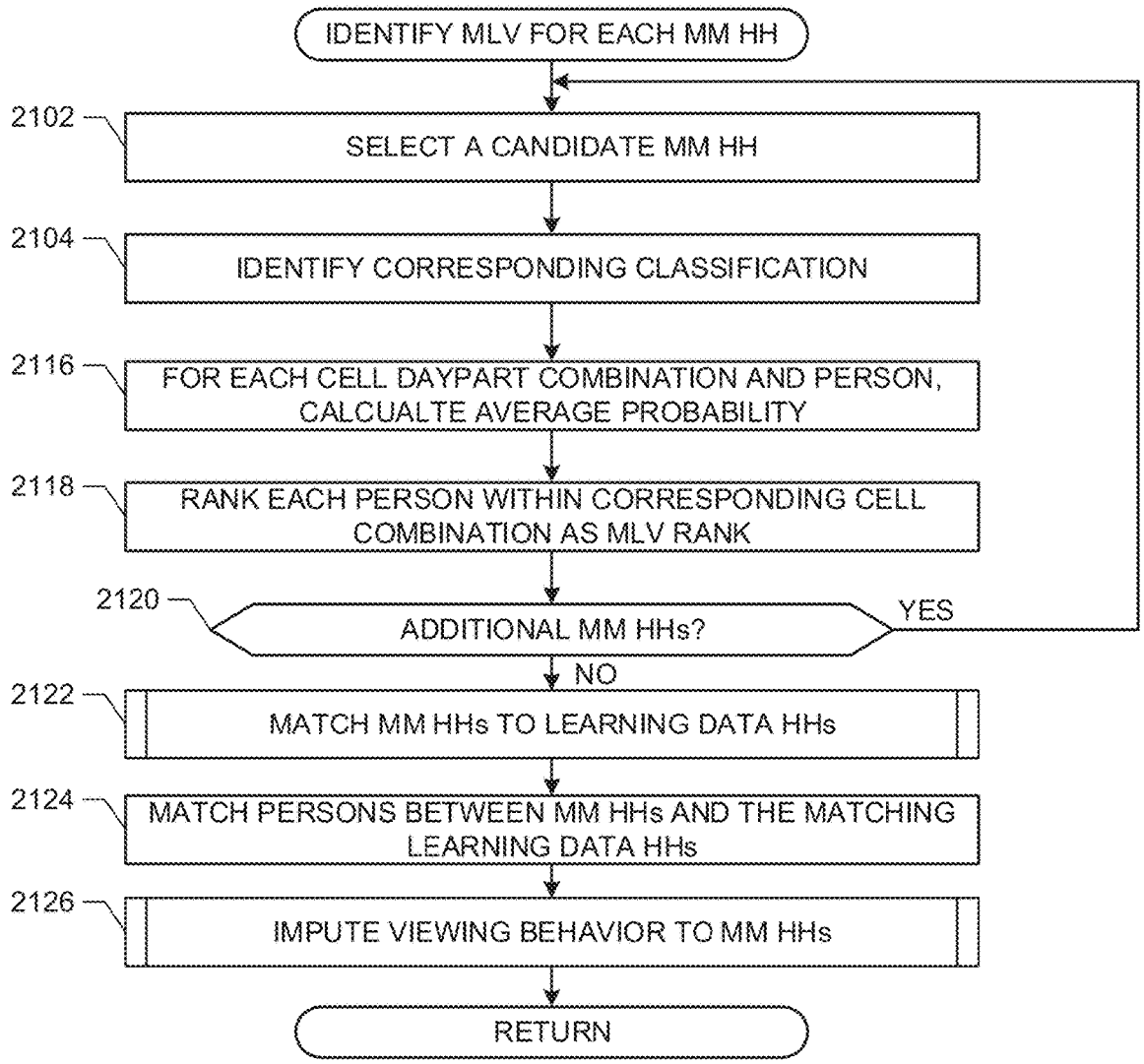

Returning to the example third phase 1606 of FIG. 16, additional detail in connection with identifying the MLV for each member in MM households of block 1620 is shown in FIG. 21. Generally speaking, the third phase evaluates each available MM household to identify a corresponding matching learning household so that behaviors from that matching learning household may be imputed to the MM household. In the illustrated example of FIG. 21, the example MM interface 204 selects a candidate MM household (block 2102), and the example classification engine identifies a corresponding classification associated with that MM household (block 2104) using a subset of the cell-level classification dimensions from the first phase. For example, the selected MM household may be classified as using stage 1 cell dimensions. These stage characteristics are used later when selecting candidate learning households that may be appropriate matches with the selected MM household.

The example average probability calculator 246 calculates an average probability value for each cell combination and corresponding person (household member) (block 2116), averaging the probabilities across each person's potential viewing (MM data) or viewing (learning data) in within the given cell, described above in connection with FIG. 11. Based on the values of the average probabilities for each household member, the example rank engine 248 applies a rank value for each household member from highest to lowest probability (block 2118). In the event the example MM interface 204 determines that one or more additional MM households of interest remain that have not yet calculated average probability values for their respective household members (block 1220), then control returns to block 2102 to select another candidate MM household. Otherwise, the example MLV engine 240 matches the MM households to corresponding learning households (block 2122), matches the household members between the MM households and corresponding learning households (block 2124), and imputes viewing behaviors from the learning households to the MM households (block 2126), as described in further detail below.

Figure 22:
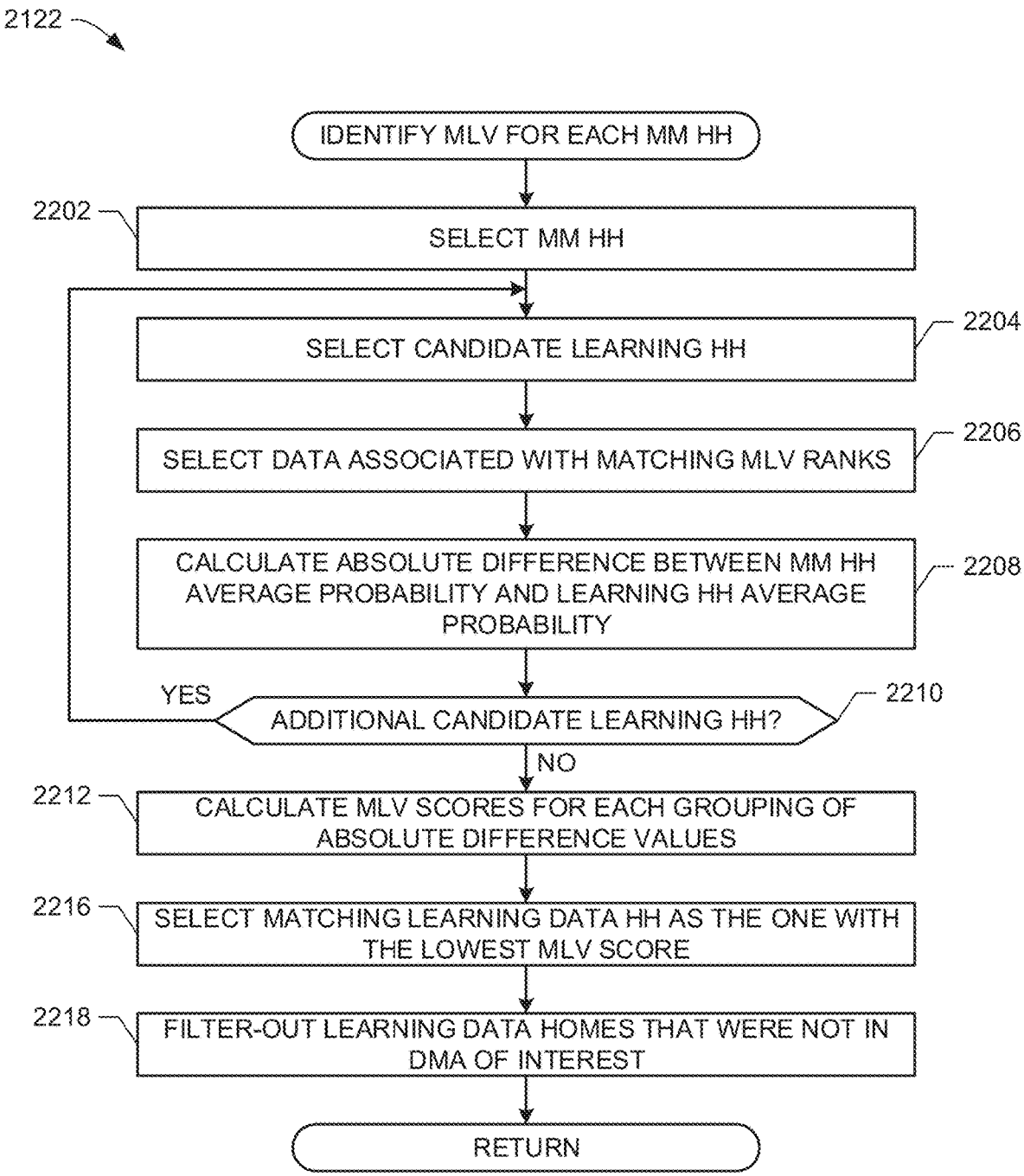

FIG. 22 illustrates additional detail related to matching the MM households to corresponding learning households of block 2122. In the illustrated example of FIG. 22, the example MM interface 204 selects a candidate MM household to match with any number of candidate learning households that have already been narrowed down based on their corresponding classifications from the first phase (block 2202). The example learning household interface 202 selects one of the candidate learning households that could be a potential match for the selected MM household (block 2204), and the example MLV engine 240 selects the data from the candidate learning household and then compares individuals between the matched households having the same MLV rank value (block 2206). The example MLV rank engine 240 calculates an absolute difference between the average probability values of each individual within the MM household and corresponding candidate learning household (block 2208), which can be added to the example MLV matching table 1200 as described above in connection with FIG. 12. If the example learning household interface 202 determines that additional candidate learning households are available for consideration (block 2210), then control returns to block 2204.

The example rank engine 248 calculates MLV scores for each paired MM household and learning household based on the sum of the individuals' absolute difference values therebetween (block 2212). The example rank engine 248 selects a final match of the MM household and best candidate learning household based on the lowest relative MLV score (block 2216). If the best candidate learning household is in the same DMA, or there is an in-DMA learning household with an MLV score within a particular range of the lowest MLV score, then priority is given to the in-DMA home and it is used as the best match. On the other hand, in the event a learning home is in the same DMA as the MM household within the lowest MLV score or a threshold range (e.g., a range deemed acceptable) of the lowest MLV score is not available, then the household with the lowest MLV score is simply used even if it is not in the same DMA as the MM home (block 2218). In either case, the closest households are now matched, and the persons therebetween are also matched based on similar MLV rank values (see columns 1204 and 1212 of FIG. 12).

Figure 23:
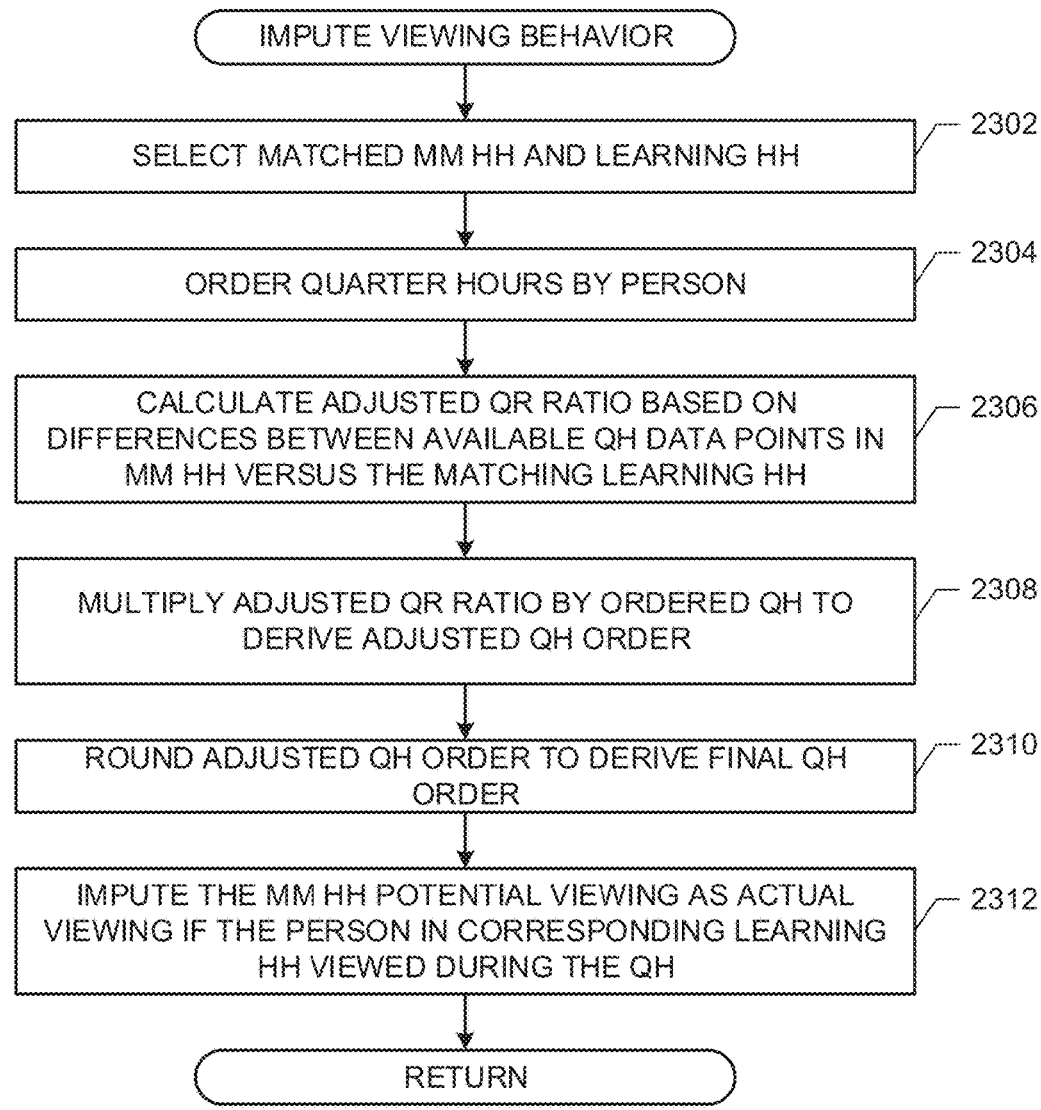

Now that the best match between MM households and corresponding learning households has been determined, and members within those households have been matched, additional detail related to imputing viewing behavior within those matched households is described in further detail in FIG. 23. In other words, while persons within a learning household are matched to persons in the MM household, potential viewing minutes are not automatically deemed actual viewing minutes. Instead, as shown in the illustrated example of FIG. 23, the example rank engine 248 selects a matched MM household and corresponding learning household (block 2302), and temporally orders the collected quarter hour data by person (block 2304), as shown in connection with FIG. 14. The example minutes aggregator 244 calculates an adjusted QH ratio that is based on differences between available QH data points in an MM household versus the matched learning household (block 2306). As described above, differences in available QH data points between matched households may occur when one household includes a greater or lesser number of QH data points than another household during the comparison, thereby resulting in a lack of parity. In the example described in connection with FIG. 14, the example learning household included, during the same daypart, four (4) quarter hour data points, while the example MM household included seven (7) quarter hour data points. As such, the example minutes aggregator 244 calculated the adjusted QH ratio as 0.571.

The example minutes aggregator 244 multiplies the QH ratio by each ordered quarter hour data point value to derive an adjusted QH order (block 2308), and rounds the result to derive a final QH order value (block 2310). To reduce imputation errors that may typically occur when merely discarding data points that do not have exact parity, during a similar quarter hour of interest the example MLV engine 240 determines whether a particular household member within the learning home exhibits viewing behavior and, if so, potential viewing minutes from the corresponding MM household are imputed as actual viewing (block 2312). Further, any short-term visitor viewing from the learning household/TV set is carried over to the MM household/TV set (note that long-term visitors are considered the same way as regular household members).

Figure 24:
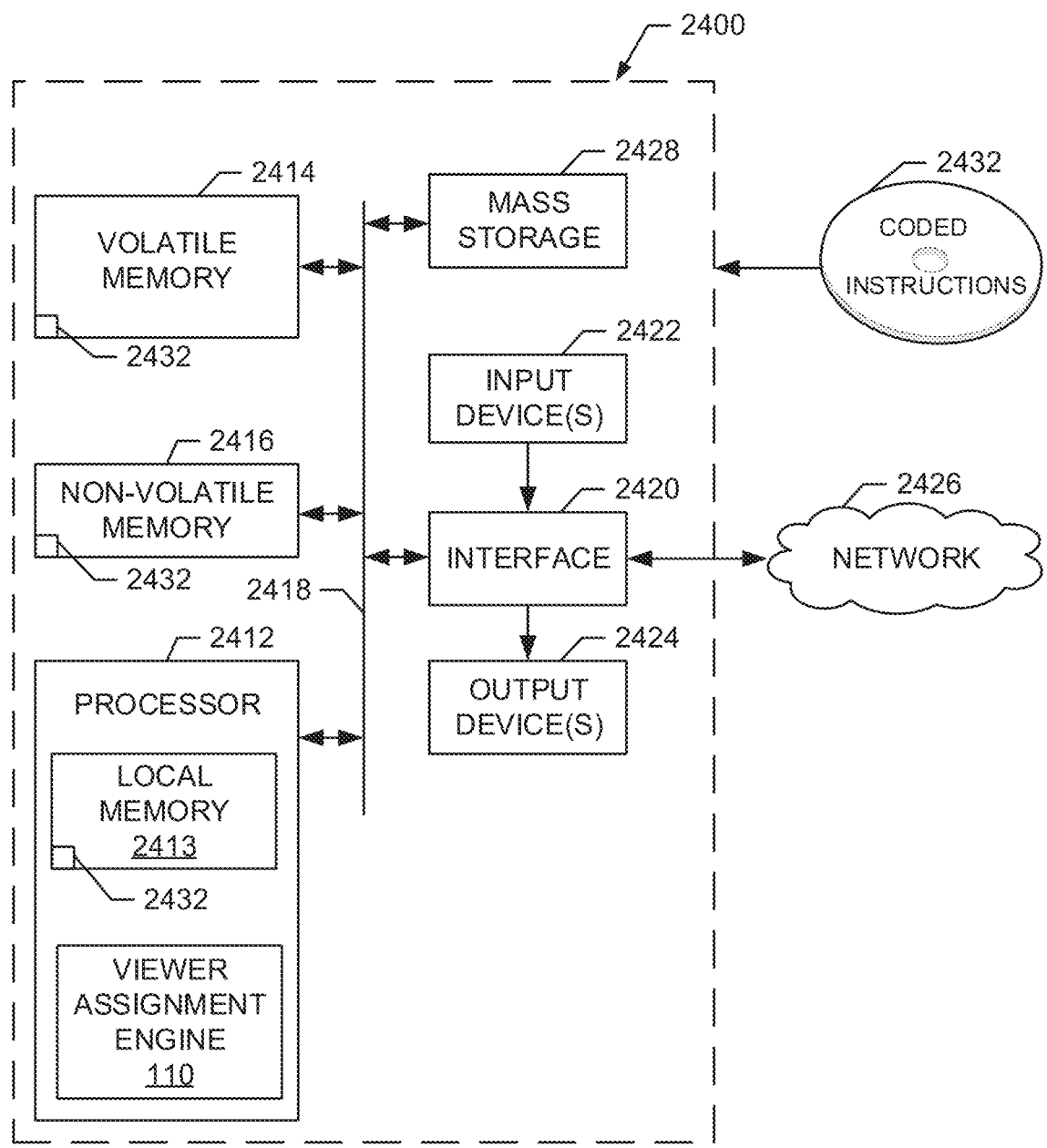
FIG. 24 is a schematic illustration of an example processor platform that may execute the instructions of FIGS. 16-23 to implement the example viewer assignment engine of FIGS. 1 and 2.

FIG. 24 is a block diagram of an example processor platform 2400 capable of executing the instructions of FIGS. 16-24 to implement the apparatus of FIGS. 1 and 2. The processor platform 2400 can be, for example, a server, a personal computer, an Internet appliance, a set top box, or any other type of computing device.

The processor platform 2400 of the illustrated example includes a processor 2412. The processor 2412 of the illustrated example is hardware. For example, the processor 2412 can be implemented by one or more integrated circuits, logic circuits, microprocessors or controllers from any desired family or manufacturer.

The processor 2412 of the illustrated example includes a local memory 2413 (e.g., a cache) and the viewer assignment engine 110. The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2416 may be implemented by flash memory and/or any other desired type of memory device. Access to the main memory 2414, 2416 is controlled by a memory controller.

The processor platform 2400 of the illustrated example also includes an interface circuit 2420. The interface circuit 2420 may be implemented by any type of interface standard, such as an Ethernet interface, a universal serial bus (USB), and/or a PCI express interface.

In the illustrated example, one or more input devices 2422 are connected to the interface circuit 2420. The input device(s) 2422 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 2424 are also connected to the interface circuit 2420 of the illustrated example. The output devices 2424 can be implemented, for example, by display devices (e.g., a light emitting diode (LED), an organic light emitting diode (OLED), a liquid crystal display, a cathode ray tube display (CRT), a touchscreen, and/or speakers). The interface circuit 2420 of the illustrated example, thus, typically includes a graphics driver card, a graphics driver chip or a graphics driver processor.

The interface circuit 2420 of the illustrated example also includes a communication device such as a transmitter, a receiver, a transceiver, a modem and/or network interface card to facilitate exchange of data with external machines (e.g., computing devices of any kind) via a network 2426 (e.g., an Ethernet connection, a digital subscriber line (DSL), a telephone line, coaxial cable, a cellular telephone system, etc.).

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, RAID systems, and digital versatile disk (DVD) drives.

The coded instructions 2432 of FIGS. 16-23 may be stored in the mass storage device 2428, in the volatile memory 2414, in the non-volatile memory 2416, and/or on a removable tangible computer readable storage medium such as a CD or DVD.

From the foregoing, it will be appreciated that the above disclosed methods, apparatus and articles of manufacture permit the identification of unique panelist member media viewing behavior in households that do not include a People Meter. Additionally, examples disclosed herein reduce costs related to personnel and equipment by facilitating a manner of viewing behavior identification with lower cost media metering devices that reduce and/or eliminate a need for professional and/or on-site personnel installation and/or maintenance. Further, examples disclosed herein improve a statistical reliability of imputation via the application of independent distribution probability dimensions, which improve data granularity and predictive confidence. Additional examples disclosed herein reduce waste of and/or otherwise discarding data points between compared households by aligning dissimilar temporal data points when such households do not exhibit time period parity of such data points.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to impute panelist household media behavior, the apparatus comprising:
   memory;
   communication interface circuitry to communicate over a network with a first meter associated with a first household and communicate over the network with a plurality of second meters associated with a plurality of second households;
   computer readable instructions; and
   a processor to execute the computer readable instructions to at least:
      determine first probabilities for first panelists in the first household based on a first number of minutes of first media presented by a first media presentation device monitored by the first meter, the first number of minutes reported by the first meter without information indicative of which ones of the first panelists were exposed to the first media, the first number of minutes obtained from a first network communication received by the communication interface circuitry via the network;

determine second probabilities for second panelists in the plurality of second households based on second numbers of minutes of second media presented by second media presentation devices monitored by the plurality of second meters, the second numbers of minutes reported by the second meters with information indicative of which ones of the second panelists were exposed to the respective second media, the second numbers of minutes obtained from second network communications received by the communication interface circuitry via the network, the plurality of second households corresponding to a group of panelists households statistically representative of a national population;

compare the first probabilities and the second probabilities to identify a candidate household from the plurality of second households to associate with the first household; and impute respective portions of the first number of minutes to corresponding ones of the first panelists when monitored behavior of the candidate household matches monitored behavior of the first household, the imputed portions of the first number of minutes to increase a sample size of household behavior data without increasing the number of households in the plurality of second households.

2. The apparatus as defined in claim 1, wherein the processor is to identify a pool of potential candidate households from among the plurality of second households based on comparison of respective household characteristics of the plurality of second households with household characteristics of the first household.

3. The apparatus as defined in claim 2, wherein the processor is to identify the candidate household from among the pool of potential candidate households based on respective differences between an average value of the first probabilities and corresponding ones of average values of the second probabilities associated with the pool of potential candidate households.

4. The apparatus as defined in claim 2, wherein the processor is to:
determine a size of the pool of the potential candidate households based on a set of specified household characteristics; and
in response to the size of the pool not satisfying a threshold size, decrease a number of specified household characteristics included in the set of specified household characteristics.

5. The apparatus as defined in claim 1, wherein the processor is to determine an adjusted time period ratio when a first number of a first set of time periods is dissimilar to a second number of a second set of time periods, the adjusted time period ratio corresponding to the second number divided by the first number, the first set of time periods associated with the first number of minutes of the first media, the second set of time periods associated with the second number of minutes of the second media.

6. The apparatus as defined in claim 5, wherein the processor is to multiply the adjusted time period ratio by a temporal placeholder associated with the first set of time periods to generate a final time period order value associated with the second set of time periods.

7. The apparatus as defined in claim 6, wherein the processor is to expand the second set of time periods so that the second number of the second set of time periods is to match the first number of the first set of time periods based on the final time period order value.

8. A non-transitory computer readable medium comprising instructions that, when executed, cause a processor to at least:
cause communication with a first meter associated with a first household over a network;
cause communication with a plurality of second meters associated with a plurality of second household over the network;
determine first probabilities for first panelists in the first household based on a first number of minutes of first media presented by a first media presentation device monitored by the first meter, the first number of minutes reported by the first meter without information indicative of which ones of the first panelists were exposed to the first media, the first number of minutes obtained from a first network communication received via the network;
determine second probabilities for second panelists in the plurality of second households based on second numbers of minutes of second media presented by second media presentation devices monitored by the plurality of second meters, the second numbers of minutes reported by the second meters with information indicative of which ones of the second panelists were exposed to the respective second media, the second numbers of minutes received obtained from second network communications received via the network, the plurality of second households corresponding to a group of panelists households statistically representative of a national population;
compare the first probabilities and the second probabilities to identify a candidate household from the plurality of second households to associate with the first household; and
impute respective portions of the first number of minutes to corresponding ones of the first panelists when monitored behavior of the candidate household matches monitored behavior of the first household, the imputed portions of the first number of minutes to increase a sample size of household behavior data without increasing the number of households in the plurality of second households.

9. The non-transitory computer readable medium as defined in claim 8, wherein the instructions further cause the processor to identify a pool of potential candidate households from among the plurality of second households based on comparison of respective household characteristics of the plurality of second households with household characteristics of the first household.

10. The non-transitory computer readable medium as defined in claim 9, wherein the instructions further cause the processor to identify the candidate household from among the pool of potential candidate households based on respective differences between an average value of the first probabilities and corresponding ones of average values of the second probabilities associated with the pool of potential candidate households.

11. The non-transitory computer readable medium as defined in claim 9, wherein the instructions further cause the processor to:
determine a size of the pool of the potential candidate households based on a set of specified household characteristics; and
in response to the size of the pool not satisfying a threshold size, decrease a number of specified household characteristics included in the set of specified household characteristics.

12. The non-transitory computer readable medium as defined in claim 8, wherein the instructions further cause the processor to determine an adjusted time period ratio when a first number of a first set of time periods is dissimilar to a second number of a second set of time periods, the adjusted time period ratio corresponding to the second number divided by the first number, the first set of time periods associated with the first number of minutes of the first media, the second set of time periods associated with the second number of minutes of the second media.

13. The non-transitory computer readable medium as defined in claim 12, wherein the instructions further cause the processor to multiply the adjusted time period ratio by a temporal placeholder associated with the first set of time periods to generate a final time period order value associated with the second set of time periods.

14. The non-transitory computer readable medium as defined in claim 13, wherein the instructions further cause the processor to expand the second set of time periods so that the second number of the second set of time periods is to match the first number of the first set of time periods based on the final time period order value.

15. An apparatus to impute panelist household media behavior, the apparatus comprising:
  means for communicating over a network, the means for communicating to communicate with a first meter associated with a first household and to communicate with a plurality of second meters associated with a plurality of second households;
  means for determining probabilities, the means for determining probabilities to:
    determine first probabilities for first panelists in the first household based on a first number of minutes of first media presented by a first media presentation device monitored by the first meter, the first number of minutes reported by the first meter without information indicative of which ones of the first panelists were exposed to the first media, the first number of minutes obtained from a first network communication received by the means for communicating via the network; and
    determine second probabilities for second panelists in the plurality of second households based on second numbers of minutes of second media presented by second media presentation devices monitored by the plurality of second meters, the second numbers of minutes reported by the second meters with information indicative of which ones of the second panelists were exposed to the respective second media, the second numbers of minutes received obtained from second network communications received by the means for communicating via the network, the plurality of second households corresponding to a group of panelists households statistically representative of a national population; and
  means for matching viewers, the means for matching viewers to:
    compare the first probabilities and the second probabilities to identify a candidate household from the plurality of second households to associate with the first household; and
    impute respective portions of the first number of minutes to corresponding ones of the first panelists when monitored behavior of the candidate household matches monitored behavior of the first household, the imputed portions of the first number of minutes to increase a sample size of household behavior data without increasing the number of households in the plurality of second households.

16. The apparatus as defined in claim 15, wherein the means for matching viewers is to identify a pool of potential candidate households from among the plurality of second households based on comparison of respective household characteristics of the plurality of second households with household characteristics of the first household.

17. The apparatus as defined in claim 16, wherein the means for matching viewers is to identify the candidate household from among the pool of potential candidate households based on respective differences between an average value of the first probabilities and corresponding ones of average values of the second probabilities associated with the pool of potential candidate households.

18. The apparatus as defined in claim 16, further including means for classifying households, the means for classifying households to:
  determine a size of the pool of the potential candidate households based on a set of specified household characteristics; and
  in response to the size of the pool not satisfying a threshold size, decrease a number of specified household characteristics included in the set of specified household characteristics.

19. The apparatus as defined in claim 15, wherein the means for matching viewers is to determine an adjusted time period ratio when a number of a first set of time periods is dissimilar to a number of a second set of time periods, the adjusted time period ratio corresponding to the number of the second set of time periods divided by the number of the first set of time periods.

20. The apparatus as defined in claim 19, wherein the means for matching viewers is to multiply the adjusted time period ratio by a temporal placeholder associated with the first set of time periods to generate a final time period order value associated with the second set of time periods.

21. The apparatus as defined in claim 20, wherein the means for matching viewers is to expand the second set of time periods so that the second number of the second set of time periods is to match the first number of the first set of time periods based on the final time period order value.

* * * * *